United States Patent
Mays et al.

(10) Patent No.: US 10,202,478 B2
(45) Date of Patent: Feb. 12, 2019

(54) MULTIGRAFT COPOLYMER SUPERELASTOMERS BY EMULSION POLYMERIZATION

(71) Applicant: University of Tennessee Research Foundation, Knoxville, TN (US)

(72) Inventors: Jimmy W. Mays, Knoxville, TN (US); Nam-Goo Kang, Knoxville, TN (US); Qiuyu Zhang, Xi'an (CN); Wenwen Wang, Xi'an (CN)

(73) Assignee: University of Tennessee Research Foundation, Knoxville, TN (US)

( * ) Notice: Subject to any disclaimer, the term of this patent is extended or adjusted under 35 U.S.C. 154(b) by 0 days.

(21) Appl. No.: 15/320,530

(22) PCT Filed: Jun. 19, 2015

(86) PCT No.: PCT/US2015/036727
§ 371 (c)(1),
(2) Date: Dec. 20, 2016

(87) PCT Pub. No.: WO2015/196093
PCT Pub. Date: Dec. 23, 2015

(65) Prior Publication Data
US 2017/0183440 A1 Jun. 29, 2017

Related U.S. Application Data

(60) Provisional application No. 62/014,746, filed on Jun. 20, 2014, provisional application No. 62/052,873, filed on Sep. 19, 2014.

(51) Int. Cl.
| | | |
|---|---|---|
| C08F 12/08 | (2006.01) |
| C08F 290/04 | (2006.01) |
| C09J 155/00 | (2006.01) |
| C08F 12/22 | (2006.01) |
| C08F 12/32 | (2006.01) |

(52) U.S. Cl.
CPC .......... C08F 290/044 (2013.01); C08F 12/08 (2013.01); C08F 12/22 (2013.01); C08F 12/32 (2013.01); C09J 155/005 (2013.01)

(58) Field of Classification Search
CPC .......... C08F 12/08; C08F 12/22; C08F 12/32; C08F 290/044; C09J 155/005
See application file for complete search history.

(56) References Cited

U.S. PATENT DOCUMENTS

| | | |
|---|---|---|
| 3,786,116 A | 1/1974 | Milkovich et al. |
| 3,832,423 A | 8/1974 | Milkovich et al. |
| 3,842,059 A * | 10/1974 | Milkovich ............ C08F 290/04 525/285 |
| 4,335,723 A | 1/1982 | Patel |
| 4,481,323 A | 11/1984 | Sterling |
| 4,886,062 A | 12/1989 | Wiktor |
| 5,026,780 A | 6/1991 | Takizawa et al. |
| 5,079,090 A | 1/1992 | Joseph et al. |
| 5,210,147 A | 5/1993 | Southwick et al. |
| 5,741,857 A | 4/1998 | Esneault et al. |
| 5,837,008 A | 11/1998 | Berg |
| 5,843,172 A | 12/1998 | Yan |
| 5,851,217 A | 12/1998 | Wolff et al. |
| 5,873,904 A | 2/1999 | Ragheb et al. |
| 6,344,035 B1 | 2/2002 | Chudzik et al. |
| 6,368,658 B1 | 4/2002 | Schwarz et al. |
| 7,049,373 B2 | 5/2006 | Matyjaszewski et al. |
| 7,163,555 B2 | 1/2007 | Dinh |
| 7,435,255 B1 | 10/2008 | Rao |
| 7,619,036 B2 | 11/2009 | Mays et al. |
| 7,794,491 B2 | 9/2010 | Von Oepen |
| 8,061,533 B2 | 11/2011 | Mays et al. |
| 9,708,434 B2 * | 7/2017 | Mays ................... C08F 279/02 |
| 2002/0103295 A1 | 8/2002 | Eichenauer |
| 2003/0180488 A1 | 9/2003 | Lim et al. |
| 2004/0242791 A1 | 12/2004 | Kaneko et al. |
| 2005/0245645 A1 | 11/2005 | Howie, Jr. |
| 2008/0193818 A1 | 8/2008 | Mays |
| 2008/0194716 A1 | 8/2008 | Sasagawa et al. |
| 2009/0028356 A1 | 1/2009 | Ambrose et al. |

(Continued)

FOREIGN PATENT DOCUMENTS

| | | |
|---|---|---|
| CN | 1495209 A | 5/2004 |
| EP | 0235482 | 9/1987 |

(Continued)

OTHER PUBLICATIONS

ACM-Polyacrylic Rubber downloaded from http://polymerdatabase.com/Elastomers/ACM.html Dec. 20, 2017.*
Liu, J. et al. Langmuir vol. 13 pp. 4988-4994 (1997).*
Ajaz, "Hydroxyl-Terminated Polybutadiene Teleche4lic Polymer (HTPB): Binder for Solid Rocket Propellants," Rubber Chemistry and Technology, pp. 481-506.
Notice of Allowance corresponding to U.S. Appl. No. 13/877,229 dated Apr. 20, 2017.
Notification of Transmittal of the International Search Report and the Written Opinion of the International Searching Authority corresponding to International Application No. PCT/US-17/16236 dated Apr. 14, 2017.
Official Action corresponding to Canadian Patent Application Serial No. 2,813,249 dated May 18, 2017.

(Continued)

Primary Examiner — Irina S Zemel
Assistant Examiner — Jeffrey S Lenihan
(74) Attorney, Agent, or Firm — Jenkins, Wilson, Taylor & Hunt, P.A.

(57) ABSTRACT

Multigraft copolymers having various structures, e.g., comb and centipede structures, can be prepared from emulsion copolymerization of monomers and macromonomers. The emulsion copolymerization can be initiated by a thermally activated radical initiator or a redox initiation system. The multigraft copolymers can have high molecular weight and/or a large number of branch points. Elastomer or adhesive compositions of the copolymers can be prepared. Also described are poly(n-alkyl acrylate-graft-styrene) multigraft copolymers.

30 Claims, 29 Drawing Sheets

(56) References Cited

U.S. PATENT DOCUMENTS

| | | | |
|---|---|---|---|
| 2009/0285974 A1 | 11/2009 | Kerrigan et al. | |
| 2010/0190671 A1 | 7/2010 | Stoehr et al. | |
| 2010/0210745 A1 | 8/2010 | McDaniel et al. | |
| 2014/0161858 A1 | 6/2014 | Mays et al. | |

FOREIGN PATENT DOCUMENTS

| | | | |
|---|---|---|---|
| EP | 2218753 A1 | 8/2010 | |
| GB | 2008140 A | 5/1979 | |
| JP | S 4930462 A | 3/1974 | |
| JP | S 6264814 A | 3/1987 | |
| JP | 2004509182 A | 3/2004 | |
| JP | 2004509214 A | 3/2004 | |
| RU | 2483083 C2 | 5/2013 | |
| SU | 712027 | 1/1980 | |
| WO | WO 2002/022689 A2 | 3/2002 | |
| WO | WO 2002/022755 A2 | 3/2002 | |
| WO | WO 2012/045006 A1 | 4/2012 | |
| WO | WO 2015/196093 | 12/2015 | |
| WO | WO 2017/1369565 A1 | 8/2017 | |

OTHER PUBLICATIONS

Alward et al., "Effect of Arm Number and Arm Molecular Weight on the Solid-State Morphology of Poly(styrene-isoprene) Star Block Copolymers," Macromolecules, vol. 19, pp. 215-224 (1986).
Balsara et al., "Anisotrophy of Lamellar Block Copolymer Grains," Physical Review E. vol. 66 Article #052802 (2002). (4 pages).
Beyer et al., "Graft Copolymers with Regularly Spaced, Tetrafunctional Branch Points: Morphology and Grain Structure," Macromolecules, vol. 33, pp. 2039-2048 (2000).
Beyer et al., "Morphological Behavior of $A_2B_2$ Star Block Copolymers," J. Polymer Sci.: Part B, Polymer Physics, 37, 3392-3400 (1999).
Beyer et al., "Morphological Behavior of $A_5B$ Miktoarm Star Block Copolymers," Macromolecules, 32, 6604,6607 (1999).
Beyer et al., "Morphology of Vergina Star 16-Arm Block Copolymers and Scaling Behavior of Interfacial Area with Graft Point Functionality," Macromolecules, 30, 2373-2376 (1997).
Bi and Fetters, Synthesis and Properties of Block Copolymers. 3. Polystyrene-Polydiene Star Block Copolymers, Macromolecules, vol. 9, pp. 732-742 (1976).
Burgaz et al., "T-Junction Grain Boundaries in Block Copolymer-Homopolymer Blends," Macromolecules, 33, 8739-8745 (2000).
Cameron and Qureshi, "Grafting of Polybutadiene Functionalised with Chlorosilane Groups," Makromol. Chem., Rapid Commun. vol. 2, pp. 287-291 (1981).
Chang et al., "Analysis of Grain Structure in Partially Ordered Block Copolymers by Depolarized Light Scattering and Transmission Electron Microscopy," Macromolecules. vol. 35 pp. 4437-4447 (2002).
Cheong et al., "Synthesis and cross-linking of polyisoprene latexes," Polymer, vol. 45, pp. 769-781 (2004).
Cohn et al., "Designing biodegradable multibloack PCL/PLA thermoplastic elastomers," Biomaterials, vol. 26, pp. 2297-2305 (2005).
Communication of the Extended European Search Report corresponding to European Application No. 11830015.1 dated Jun. 27, 2014.
Communication under Rule 71(3) EPC corresponding to co-pending European Patent Application No. 11 830 015.1 dated Jun. 23, 2015.
Crawford et al., "Structure/property relationships in polystyrene-polyisobutylene-polystyrene block copolymers," Thermochimia acta. pp. 125-134 (2001).
Datta et al., "Methacrylate/acrylate ABA triblock copolymers by atom transfer radical polymerization; their properties and application as a mediator for organically dispersible gold nanoparticles," Polymer, vol. 50, pp. 3259-3268 (2009).

David et al., "Core-Shell Cylinder Morphology in Poly(styrene-b-1,3-cyclohexadiene) Diblock Copolymers," Macromolecules, vol. 32, pp. 3216-3226 (1999).
Decision to Grant a European Patent pursuant to Article 97(1) EPC corresponding to European Patent Application No. 11830015.1, dated Nov. 19, 2015.
Driva et al., "Anionic homo- and copolymerization of double-tailed macromonomers: A route to novel macromolecular architectures," Journal of Polymer Science Part A: Polymer Chemistry. vol. 43, No. 18 pp. 4070-4078 (2005) [Abstract].
Duan et al., "Deformation Behavior of Sphere-Forming Trifunctional Multigraft Copolymer," Macromolecules, vol. 41 pp. 4565-4568 (2008).
Duan et al., "Morphology and Deformation Mechanisms and Tensile Properties of Tetrafunctional Multigraft Copolymers," Macromolecules. vol. 42 pp. 4155-4164 (2009).
Dufour et al., "Polar Three-Arm Star Block Copolymer Thermoplastic Elastomers Based on Polyacrylonitrile," Macromolecules, vol. 41, No. 7, pp. 2451-2458 (2008).
Examination Report corresponding to Singapore Patent Application No. 2013021464 dated Feb. 27, 2015.
Falk et al., "New Thermoplastic Elastomers, Styrene Grafts on Lithiated Polydienes and Their Hydrogenated Counterparts," Rubber Chem. Technol. vol. 46 pp. 1044-1054 (1973).
Feng et al., "Well-defined graft copolymers:from controlled synthesis to multipurpose applications," Chemical Society Reviews, vol. 40, pp. 1282-1295 (2011).
Frick et al., "Methyl Group Dynamics in Glassy Polyisoprene: A neutron Backscattering Investigation," Macromolecules, vol. 27, No. 4, pp. 974-980 (1994).
Gacal et al., "Anthracene- Maleimide-Based Diels- Alder 'Click Chemistry' as a Novel Routre to Graft Copolymers," Macromolecules, vol. 39, pp. 5330-5536 (2006).
Gamlish et al., "Copolymerization of isoprene and hydroxyl containing monomers by controlled radical and emulsion methods," Polymer Chemistry, vol. 3, pp. 1510-1516 (2012).
Gido et al., "Interfacial Curvature in Graft and Diblock Copolymers and Implications for Long-Range Order in Cylindrical Morphologies," Macromolecules, vol. 30, pp. 6771-6782 (1997).
Gido et al., "Lamellar Diblock Copolymer Grain Boundary Morphology. 1. Twist Boundary Characterization," Macromolecules, vol. 26, pp. 4506-4520 (1993).
Gido et al., "Synthesis, Characterization, and Morphology of Model Graft Copolymers with Trifunctional Branch Points," Macromolecules, vol. 29, pp. 7022-7028 (1996).
Gilman et al., "The analysis of organolithium compounds," J. Organomet. Chem., vol. 2, pp. 447-454 (1964).
Hadjichristidis et al., "Anionic Polymerization: High Vacuum Techniques," J. Polym. Sci., Polym. Chem. Ed., vol. 38, pp. 3211-3234 (2000).
Hadjichristidis et al., "Conformation of Poly(isoprene-g-Styrene) in Dilute Solution," Journal of Polymer Science: Polymer Physics Edition. vol. 16, pp. 851-858 (1978).
Hadjichristidis et al., "Macromolecular architectures by living and controlled/living polymerizations," Prog. Polym. Sci, vol. 31, pp. 1068-1132 (2006).
Hadjichristidis et al., "Morphology and miscibility of miktoarm styrene-diene copolymers and terpolymers," Macromolecules. vol. 26 pp. 5812-5815 (1993).
Hawker et al., "'Living' free radical polymerization of macromonomers: preparation of well defined graft copolymers," Macromolecular Chemistry and Physics, vol. 198, pp. 155-166 (1997).
Hong et al., "1,3-Cyclohexadiene Polymers. II. Near-Monodisperse Star and Star-Block Polymers Based on Poly(1,3-cyclohexadiene)," Macromolecules, vol. 34, pp. 2482-2487 (2001).
Hong, K. et al., "1,3-Cyclohexadiene Polymers. I. Anionic Polymerization," Macromolecules, vol. 34, pp. 782-786 (2001).
Hong, K. et al., "1,3-Cyclohexadiene Polymers. III. Synthesis and Characterization of Poly(1,3-cyclohexadiene-block-styrene," Macromolecules, vol. 34, pp. 3540-3547 (2001).
Iatrou et al., "Regular Comb Polystyrenes and Graft Polyisoprene/Polystyrene Copolymers with ouble Branches ("Centipedes"). Qual-

(56) References Cited

OTHER PUBLICATIONS ity of (1,3-Phenylene)bis(3-methyl-1-phenylpentylidene)dilithium Initiator in the Presence of Polar Additives," Macromolecules, vol. 31, pp. 6697-6701 (1998).
Iatrou et al., "Hydrodynamic properties of model 3-miktoarm star copolymers," J. Polym. Sci., Polym. Phys. Ed. vol. 33 pp. 1925-1932 (1995).
Interview Summary corresponding to U.S. Appl. No. 13/877,229 dated Feb. 26, 2016.
Interview Summary corresponding to U.S. Appl. No. 13/877,229 dated Nov. 29, 2016.
Ishimoto, et al., "Biobased polymers: synthesis of graft copolymers and comb polymers using lactic acid macromonomer and properties of the product polymers," ACS Publications, Biomacromolecules, vol. 13, pp. 3757-3768 (2012).
Jeusette et al., "New 'all-acrylate' block copolymers: synthesis and influence of the architecture on the morphology and the mechanical properties," Macromolecules, vol. 40, pp. 1055-1065 (2007).
Ji et al., "Characterization of hydroxyl-end-capped polybutadiene and polystyrene produced by anionic polymerization technique via TLC/MALDI TOF mass spectrometry," Polymer, vol. 43, pp. 7119-7123 (2002).
Jiang et al., "A novel architecture toward third-generation thermoplastic elastomers by a grafting strategy," Macromolecules, vol. 46, pp. 4772-4780 (2013).
Juhari et al., "Star-like poly(n-butyl acrylate)-b-poly($\alpha$-methylene-$\gamma$-butyrolactone) block copolymers for high temperature thermoplastic elastomers applications," Polymer, vol. 51, pp. 4806-4813 (2010).
Knauss et al., "Polystyrene with Dendritic Branching by Convergent Living Anionic Polymerization," Macromolecules, vol. 33, pp. 3557-3568 (2000).
Kongsinlark et al., "Syntheis of nanosized ethylene-propylene rubber latex via polyisoprene hydrogenation," Journal of Applied Polymer Science, vol. 127, pp. 3622-3632 (2013).
Koromilas et al., "Synthesis and self-association in dilute aqueous solution of hydrophobically modified polycations and polyampholytes based on 4-vinylbenzyl chloride," European Polymer Journal, vol. 54, pp. 39-51 (2014).
Lee et al., "$\pi$-Shaped double-graft copolymers: effect of molecular architecture on morphology," Polymer. vol. 39, pp. 4631-4638 (1998).
Lee et al., "Asymmetric Single Graft Block Copolymers: Effect of Molecular Architecture on Morphology," Macromolecules, vol. 30, pp. 3732-3738 (1997).
Lee et al., "H-shaped double graft copolymers: Effect of molecular architecture on morphology," J. Chem. Phys., vol. 107, pp. 6460-6469 (1997).
Li et al., "Linear-, Cyclic-, and Multiblock Amphiphilic Polyelectrolytes as Surfactants in Emulsion Polymerization: Role of Topological Structure," Macromolecules, vol. 46, pp. 2808-2817 (2013).
Liu et al., "Precision synthesis of w-Branch, End-Functionalized Comb Polystyrenes Using living Anionic Polymerization and Thiol-Ene 'Click' Chemistry," Macromolecules, vol. 45, pp. 9233-9242 (2012).
Luo et al., "Polystyrene-block-poly(n-butyl acrylate)-block-polystyrene Triblock Copolymer Thermoplastic elastomer Synthesized via RAFT Emulsion Polymerization," Macromolecules, vol. 43, pp. 7472-7481 (2010).
Lübke et al., "Imprinted polymers prepared with stoichiometric template-monomer complexes: efficient binding of ampicillan from aqueous solutions," Macromolecules, vol. 33, pp. 5098-5105 (2000).
Mamodia et al., "Effect of Microdomain Structure and Process Conditions on the on the Mechanical Behavior of Cylindrical Block Copolymer Systems," Macromolecules, vol. 40, pp. 7320-7328 (2007).
Matyjaszewski et al., "Simple and effective one-pot synthesis of (Meth)Acrylic block copolymers through atom transfer," Journal of Polymer Science Part A: Polymer Chemistry, vol. 38, pp. 2023-2031 (2000).

Mays et al., "Synthesis and Structure—Property Relationships for Regular Multigraft Copolymers," Macromol. Symp. vol. 215 pp. 111-126 (2004).
Mays, J.W., "Synthesis of "simple graft" poly(isoprene-g-styrene) by anionic polymerization," Polymer Bulletin. vol. 23 pp. 247-250 (1990).
Mijovic et al., "Effect of Molecular Architecture on Dynamics of Multigraft Copolymers: Combs, Centipedes, and Barbwires," Macromolecules. vol. 36 pp. 7640-7651 (2003).
Milner, S. T., "Chain Architecture and Asymmetry in Copolymer Microphases," Macromolecules, vol. 27, pp. 2333-2335 (1994).
Minari et al., "Emulsion polymerization of Isoprene. Estimation of the branching exponent with the help of a mathematical model," Journal of Applied Polymer Science, vol. 116, pp. 590-601 (2010).
Minoura and Harada, "Anionic Graft Copolymerization of Diene Polymers with Vinyl Monomers," J. Poly. Sci. Part A-1, vol. 7 pp. 3-14 (1969).
Minoura et al., "Lithiation of Diene Polymers," J. Polym. Sci. Part A-1, vol. 6 pp. 559-573 (1968).
Moineau et al., "synthesis and characterization of poly(methyl methacrylate)-block-poly (n-butyl acrylate)-block-poly(methyl methacrylate) Copolymers by two-step controlled radical polymerization (ATRP) catalyzed by NiBr2(PPh3)2. 1," Macromolecules, vol. 32, pp. 8277-8282 (1999).
Morton et al., "Preparation and properties of monodisperse branched polystyrene," J. Polym. Sci. vol. 57 pp. 471-482 (1962).
Napandensky et al., "Characterization of Highly Sulfonated SIBS Polymer Partially Neutralized with Mg+2 Cations" Army Research Laboratory. (2008).
Neises et al., "Simple method of the estrification of carboxylic acids," Angewandte Chemie International Edition in English, vol. 17, No. 7, pp. 522-524 (1978).
Nese et al., "Synthesis, characterization, and properties of starlike Poly(n-butyl acrylate)-b-poly(methyl methacrylate) block copolymers," Macromolecules, vol. 3, pp. 1227-1235 (2010).
Nicolas et al., "Nanostructure latex particles synthesized by nitroxied-mediated contrlled/living free-radical polymerization in emulsion," Polymer, vol. 48, pp. 7029-7040 (2007).
Nikopoulou et al., "Anionic homo- and copolymerization of styrenic triple-tailed polybutadiene macromonomers," Journal of Polymer Science Part A: Polymer Chemistry. vol. 45, No. 16 pp. 3513-3523 (2007) [Abstract].
Notice of Allowance corresponding to U.S. Appl. No. 13/877,229 dated Jan. 26, 2017.
Notification Concerning Transmittal of International Preliminary Report on Patentability corresponding to International application No. PCT/US2015/036727 dated Dec. 29, 2016.
Notification Concerning Transmittal of International Preliminary Report on Patentability corresponding to International application No. PCT/US2011/054345, dated Apr. 11, 2013.
Notification of Transmittal of the International Search Report and the Written Opinion of the International Searching Authority corresponding to International application No. PCT/US 2015/036727 dated Nov. 26, 2015.
Notification of Transmittal of the International Search Report and Written Opinion corresponding to International application No. PCT/US2011/054345 dated Feb. 14, 2012.
Official Action corresponding to U.S. Appl. No. 13/877,229 dated Aug. 19, 2014.
Official Action corresponding to U.S. Appl. No. 13/877,229 dated Jul. 18, 2016.
Official Action corresponding to U.S. Appl. No. 13/877,229 dated Mar. 4, 2015.
Official Action corresponding to U.S. Appl. No. 13/877,229 dated Nov. 18, 2015.
Pantazis et al., "Anionic Polymerization of Styrenic Macromonomers," Macromolecules. vol. 36 pp. 3783-3785 (2003).
Paraskeva et al., "Synthesis of an exact graft copolymer of isoprene and styrene with two branches," Journal of Polymer Science Part A: Polymer Chemistry, vol. 38, pp. 931-935 (2000).
Park et al., "Utility of Interaction Chromatography for Probing Structural Purity of Model Branched Block Copolymers," Macromolecules. vol. 36 pp. 5834-5838 (2003).

(56) References Cited

OTHER PUBLICATIONS

Pochan et al., "Morphological Transitions in an I2S Simple Graft Block Copolymer: From Folded Sheets to Folded Lace to Randomly Oriented Worms at Equilibrium," Macromolecules. vol. 29 pp. 5099-5105 (1996).
Pochan et al., "Morphologies of Microphase-Separated A2B Simple Graft Copolymers," Macromolecules, vol. 29, pp. 5091-5098 (1996).
Pochan et al., "Morphologies of Microphase-Separated Conformationally Asymmetric Diblock Copolymers," J. Polymer Sci.: Part B, Polymer Physics, vol. 35, pp. 2629-2643 (1997).
Poongavalappil et al., "Study on the influence of electron beam irradiation on the thermal, mechanical, and rheological properties of ethylene-octene copolymer with high comonomer content," Journal of Applied Polymer Science, vol. 128, pp. 3026-3033 (2013).
Pramanik et al., "Organic-inorganic hybrid tinphosphonate material with mesoscopic void spaces: an excellent catalyst for the radical polymerization of styrene," Catalysis Science & Technology, vol. 2, pp. 613-620 (2012).
Prince et al., "Synthetic rubber production," Industrial & Engineering Chemistry, vol. 52, pp. 235-238 (1960).
Quirk et al., "Efficient synthesis of w-(p-Vinylbenzyl)polystyrene by direct functionalization of Poly(styryl)lithium with p-Vinylbenzyl chloride in hydrocarbon solvent with lithium 2,3-dimethyl-3-pentoxide," Macromolecules, vol. 39, pp. 1681-1692 (2006).
Rahman et al., "synthesis and Dilute Solution Properties of Well-Defined H-Shaped Polybutadienes," Macromolecules. vol. 41 pp. 8225-8230 (2008).
Rajatapiti et al., "In-situ Synthesis of PBA-graft-PMMA Copolymers to Be Used as Compatibilizing Agents in PBAlPMMA Composite Latex Particles via the Macromonomer Method," Journal of Macromolecular Science, Part A, vol. 32(8&9), pp. 1445-1460 (1995).
Retsos et al., "Interfacial Tension in Binary Polymer Blends in the Presence of Block Copolymers: Effects of Additive Architecture and Composition," Macromolecules. vol. 37 pp. 524-537 (2004).
Roovers et al., Microheterogeneity in Miscible Blends of 1,2-Polybutadiene and 1,4-Polyisoprene, Macromolecules vol. 25, No. 13, pp. 3454-3461 (1992).
Schlegel et al., "Investigations on mechanical properties of PI-PS multigraft copolymers," European Polymer Journal. vol. 45 pp. 2902-2912 (2009).
Schlegel et al., "Stress softening of multigraft copolymers," Polymer. vol. 50 pp. 6297-6304 (2009).
Singapore Search Report and Written Opinion for co-pending Singapore Patent Application No. 201302146-4 dated Jul. 11, 2014.
Singh et al., "Effect of molecular weight on the mechanical and electrical properties of block copolymer electrolytes," Macromolecules, vol. 40, pp. 4578-4585 (2007).
Spontak et al., "Thermoplastic elastomers:fundamentals and applications," Current Opinion in Colloid & Interface Science, vol. 5, pp. 334-341 (2000).
Staudinger et al., "Interpretation of hysteresis behaviour of PI-PS multigraft copolymers of adapting to the dynamic flocculation model," European Polymer Journal. vol. 44 pp. 3790-3796 (2008).
Staudinger et al., "Mechanical Properties and Hysteresis Behaviour of Multigraft Copolymers," Macromolecular Symposia. vol. 233 pp. 42-50 (2006).
Suppaibulsuk et al., "Synthesis of styrene-g-polyisoprene nanoparticles by emulsion polymerization and its effect on properties of polyisoprene composites," Polymers for Advanced Technologies, vol. 23, pp. 1473-1483 (2012).
Tate et al., "Metallation of Unsaturated Polymers and Formation of Graft Copolymers," Journal of Polymer Science: Part A-1. vol. 9 pp. 139-145 (1971).
Theryo et al., "Tough Polylactide Graft Copolymers," Macromolecules, vol. 43, pp. 7394-7397 (2010).
Thomas et al., "Ordered Packing Arrangements of Spherical Micelles of Diblock Copolymers in Two and Three Dimensions," Macromolecules, vol. 20, pp. 2934-2939 (1987).
Thomas, B. L., "Ordered Bicontinuous Double-Diamond Structure of Star Block Copolymers: A New Equilibrium Microdomain Morphology," Macromolecules, vol. 19, pp. 2197-2202 (1986).
Tsoukatos et al., "Model Linear Block Co-, Ter-, and Quaterpolymers of 1,3-Cyclohexadiene with Styrene, Isoprene, and Butadiene," Macromolecules, vol. 35, pp. 7928-7935 (2002).
Uhrig et al., "Synthesis of Combs, Centipedes, and Barbwires: Poly(isoprene-graft-styrene) Regular Multigraft Copolymers with Trifunctional and hexafunctional Branch Points," Macromolecules, vol. 35, pp. 7182-7190 (2002).
Uhrig et al., "Multigraft copolymer superelastomers: synthesis morphology, and properties," European Polymer Journal, vol. 47, pp. 560-568 (2011).
Uhrig et al., "Synthesis of well-defined multigraft copolymers," Polymer Chemistry, vol. 2, pp. 69-76 (2011).
Wang et al., Synthesis of poly (methyl methacrylate)-b-polystyrene with high molecular weight by DPE seeded emulsion polymerization and its application in proton exchange membrane, Journal of Colloid and Interface Science, vol. 406, pp. 154-164 (2013).
Wang et al., "Synthesis and Characterization of Comb and Centipede Multigraft Copolymers PnBa-g-PS with High Molecular Weight Using Miniemulsion Polymerization" Macromolecules, vol. 47, pp. 7284-7295 (2014).
Wang et al., "Synthesis and Characterization of Graft Copolymers Poly(isoprene-g-styrene) of High Molecular Weight by a Combination of Anionic Polymerization and Emulsion Polymerization,"Ind. Eng., Chem. Res., vol. 54(4), pp. 1292-1300 (Jan. 14, 2015).
Wei et al., "Styrene-Butadiene-Styrene Triblock Copolymer Latex via Reversible Addition-Fragmentation Chain Transfer Miniemulsion Polymerization," Industrial & Engineering Chemistry Research, vol. 51, pp. 15530-15535 (2012).
Weidisch et al., "Tetrafunctional Multigraft Copolymers as Novel Thermoplastic Elastomers," Macromolecules, vol. 34, pp. 6333-6337 (2001).
Winey et al., "Ordered morphologies in binary blends of diblock copolymer and homopolymer and characterization of their intermaterial dividing surfaces," J. Chem. Phys., vol. 95, pp. 9367-9375 (1991).
Wisse et al., "Segmental Orientation in Well-Defined Thermoplastic Elastomers Containing Supramolecular Fillers," Macromolecules, vol. 42, pp. 524-530 (2008).
Wu et al., "Investigation of Thermodynamic Properties of SIS, SEBS, and Naphthenic Oil by Inverse Gas Chromatography," Journal of Elastomers and Plastics, vol. 43, pp. 369-386 (2011).
Xenidou et al., "Morphology of Model Graft Copolymers with Randomly Placed Trifunctional and Tetrafunctional Branch Points," Macromolecules, vol. 31, pp. 7659-7667 (1998).
Xenidou et al., "Synthesis of Model Multigraft Copolymers of Butadiene with Randomly Placed Single and Double Polystyrene Branches," Macromolecules, vol. 31, pp. 5690-5694 (1998).
Yang et al., "I5S Miktoarm Start Block Copolymers: Packing Constraints on Morphology and Discontinuous Chevron Tilt Grain Boundaries," Macromolecules. vol. 34 pp. 9069-9073 (2001).
Yang et al., "Phase Behavior of I2S Single Graft Copolymer/Homopolymer Blends," Macromolecules. vol. 34 pp. 4235-4243 (2001).
Yongxin et al., "Deformation Behavior of Sphere-Forming Trifunctional Multigraft Copolymer," Macromolecules. vol. 41 pp. 4565-4568 (2008).
Yoshizaki et al., "Transport Coefficients of Helical Wormlike Chains. 4. Intrinsic Viscosity of the Touched-Bead Model," Macromolecules, 21, pp. 165-171 (1988).
Zhang et al., "Synthesis and surface properties of PDMS-containing latexes by emulsion polymerization using AIBN as the initiator," European Polymer Journal, vol. 49, pp. 2327-2333 (2013).
Zhu et al., "Effect of Junction Point Functionality on the Lamellar Spacing of Symmetric (PS)n(PI)n Miktoarm Star Block Copolymers," Macromolecules, vol. 36, pp. 5719-5724 (2003).
Zhu et al., "Microphase-Separation of Cyclic Block Copolymers of Styrene and Butadiene and of Their Corresponding Linear Triblock Copolymers," Maromolecules, vol. 36, pp. 148-152 (2003).

(56) References Cited

OTHER PUBLICATIONS

Zhu et al., "Morphologies and Mechanical Properties of a Series of Block-Double-Graft Copolymers and Terpolymers," Macromolecules, vol. 35 pp. 5903-5909 (2002).
Zhu et al., "Morphology and Tensile Properties of Multigraft Copolymers With Regularly Spaced Tri-, Tetra- and Hexa-functional Junction Points," Macromolecules. vol. 39 pp. 4428-4436 (2006).
Notification Concerning Availability of the Publication of the International Application corresponding to international application No. PCT/US2017/016236 dated Aug. 10, 2017.
Office Action corresponding to Korean Patent Application Serial No. 10-2017-7001912 dated May 10, 2018.
Office Action corresponding to Canadian Patent Application Serial No. 2,952, 624 dated May 29, 2018.
Office Action corresponding to Canadian Patent Application Serial No. 2,813,249 dated Jan. 25, 2018.
International Preliminary Report on Patentability corresponding to International application No. PCT/US20174016236 dated Aug. 7, 2018.
Office Action corresponding to Chinese Patent Application Serial No. 201580044271.X dated Aug. 7, 2018.
Office Action corresponding to Japanese Patent Application Serial No. 2016-574111 dated Sep. 3, 2018.
Wang, "The Modern Methods and Technology of Polymer Synthesis," Tongji University Press, pp. 16-17 (Jul. 31, 2013).

\* cited by examiner

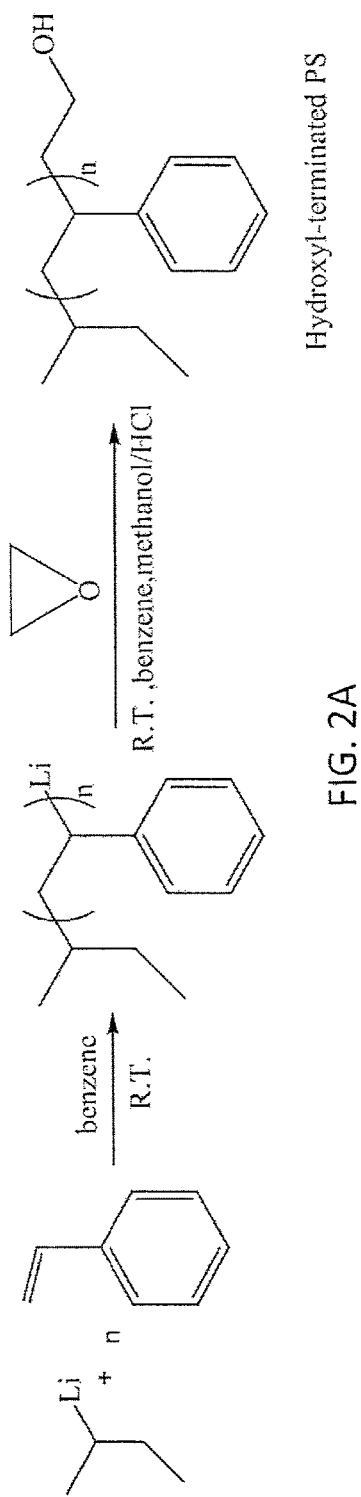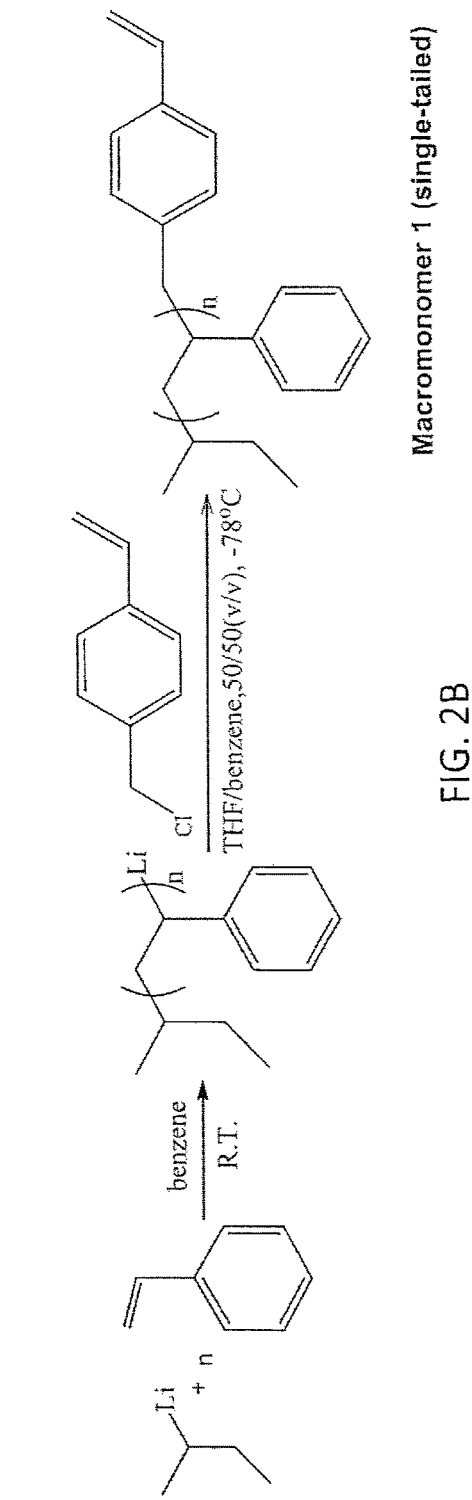
FIG. 2A
FIG. 2B

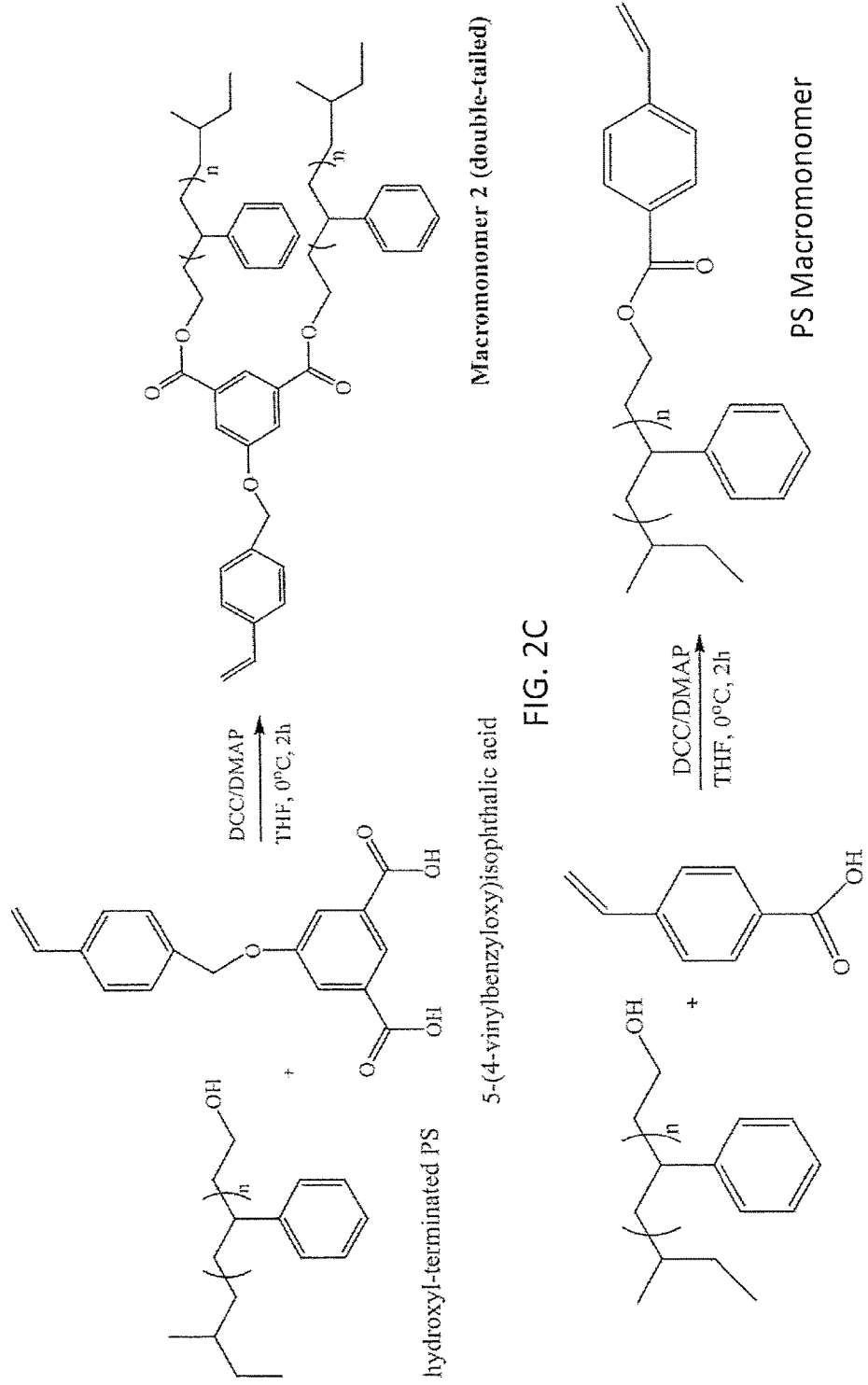

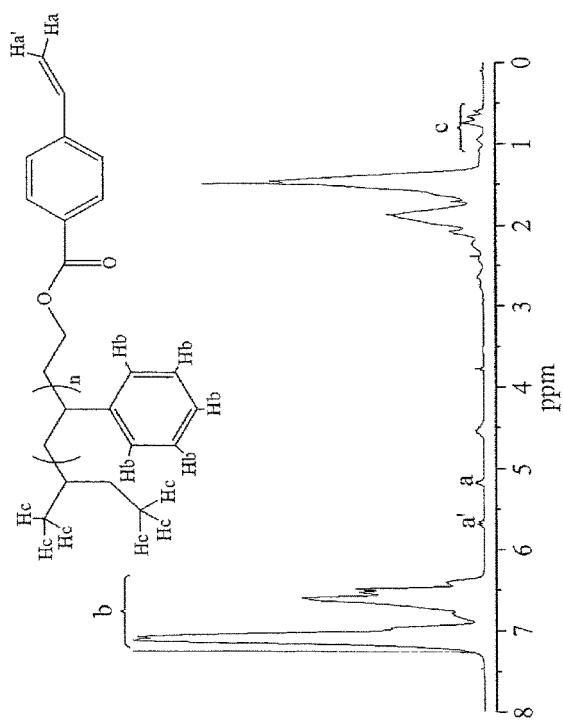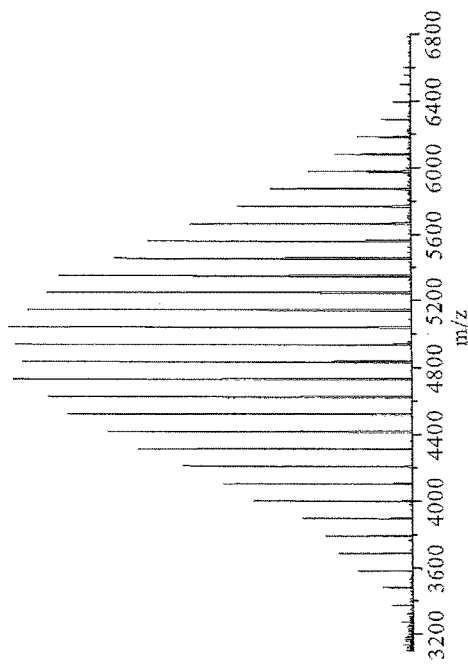
FIG. 4A
FIG. 4B

MULTIGRAFT COPOLYMER SUPERELASTOMERS BY EMULSION POLYMERIZATION

RELATED APPLICATIONS

The presently disclosed subject matter claims the benefit of U.S. Provisional Patent Application Ser. No. 62/014,746, filed Jun. 20, 2014; and U.S. Provisional Patent Application Ser. No. 62/052,873, filed on Sep. 19, 2014, the disclosure of each of which is incorporated herein by reference in its entirety.

GOVERNMENT INTEREST

This invention was made with government support under Award 1237787 awarded by the United States National Science Foundation NSF Partnerships for Innovation Building Innovation Capacity program and under Grant NO. W911NF-11-1-0417 awarded by the United States Army Research Office. The government has certain rights in the invention.

TECHNICAL FIELD

Methods for preparing multigraft copolymers by emulsion copolymerization of macromonomers and monomers are described. The copolymers can have high molecular weight and a large number of side chains. The copolymers can be used as superelastomers. Also described herein are poly(n-alkyl acrylate-g-styrene) multigraft copolymers and compositions thereof.

BACKGROUND

Graft copolymers have attracted attention in many fields over the past few decades. See Hadjichristidis et al., Graft Copolymers, in Encyclopedia of Polymer Science and Technology, ed. A. Seidel, John Wiley & Sons, Hoboken, N.J., 2004, Vol. 6, page 348; and Cowie, Block and Graft Copolymers, in Comprehensive Polymer Science, ed., G. Allen and J. C. Bevington, Pergamon, Oxford, 1989, Vol. 3, p. 33. Compared to block copolymers, graft copolymers can provide additional architectural flexibility, since graft (side chain) density, graft length, and backbone length can be systematically varied. See Hadjichristidis et al., Graft Copolymers, in Encyclopedia of Polymer Science and Technology, ed. A. Seidel, John Wiley & Sons, Hoboken, N.J., 2004, Vol. 6, page 348; Cowie, Block and Graft Copolymers, in Comprehensive Polymer Science, ed., G. Allen and J. C. Bevington, Pergamon, Oxford, 1989, Vol. 3, p. 33; and Hadjichristidis et al., Prog. Polym. Sci., 2006, 31, 1068. By choice of monomers and by controlling the macromolecular composition and architecture, the resulting graft copolymers can find a range of applications, including as water-dispersible nanostructures with the potential to carry drugs and other biological cargo, as nanostructured materials, as photonic materials, and as tough renewable materials. See Hadjichristidis et al., Graft Copolymers, in Encyclopedia of Polymer Science and Technology, ed. A. Seidel, John Wiley & Sons, Hoboken, N.J., 2004, Vol. 6, page 348; Cowie, Block and Graft Copolymers, in Comprehensive Polymer Science, ed., G. Allen and J. C. Bevington, Pergamon, Oxford, 1989, Vol. 3, p. 33; Gamlish et al., Polymer Chemistry, 2012, 3, 1510; Feng et al., Chemical Society Reviews, 2011, 40, 1282; and Theryo et al., Macromolecules, 2010, 43, 7394. However, there remains a need in the art for additional synthetic methods for making multigraft copolymers, including methods that involve less stringent reaction conditions, that are compatible with the use of lower cost initiators, and/or that are compatible with a wider range of dispersing media, including water. There is also a need for addition synthetic methods that can result in the preparation of graft copolymers with high molecular weights and/or a large number of side chains, as well as methods that are more compatible with large scale polymer preparation.

SUMMARY

This Summary lists several embodiments of the presently disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this Summary or not. To avoid excessive repetition, this Summary does not list or suggest all possible combinations of such features.

In some embodiments, the presently disclosed subject matter provides a method of preparing a multigraft copolymer, said method comprising: (a) providing a macromonomer comprising one or more polymeric chains attached to a polymerizable terminal group, wherein the one or more polymeric chains comprise constitutional units from at least a first monomer; (b) preparing an emulsion comprising the macromonomer, a second monomer, and a polymerization initiator; and (c) copolymerizing the macromonomer and the second monomer to form the multigraft copolymer. In some embodiments, providing the macromonomer comprises polymerizing the first monomer via anionic polymerization. In some embodiments, the first monomer is selected from the group comprising a styrene, α-methylstryene, ethene, vinylchloride, vinyl pyridine, and cyclohexadiene.

In some embodiments, providing the macromonomer comprises: (i) providing the first monomer, wherein said first monomer comprises a vinyl group, optionally wherein said first monomer is styrene; (ii) contacting the first monomer with an alkyl lithium reagent or a Grignard reagent in a first solvent at a first temperature to initiate anionic polymerization, thereby providing a carbanion-containing polymeric chain, wherein the first solvent comprises a non-polar organic solvent, optionally benzene, further optionally wherein the first temperature is between about 20 degrees Celsius and about 25 degrees Celsius; and (iii) terminating anionic polymerization by contacting the carbanion-containing polymeric chain with a 4-vinylbenzyl halide, optionally 4-vinyl benzyl chloride, in a second solvent at a second temperature to provide a single chain macromonomer, wherein the second solvent comprises a non-polar organic solvent, optionally wherein the second temperature is about –78 degrees Celsius.

In some embodiments, providing the macromonomer comprises: (i) providing the first monomer, wherein the first monomer comprises a vinyl group, optionally wherein said first monomer is styrene; (ii) contacting the first monomer with an alkyl lithium reagent or a Grignard reagent in a first solvent at a first temperature to initiate anionic polymerization, thereby providing a carbanion-containing polymeric chain, wherein the first solvent comprises a non-polar organic solvent, optionally benzene, further optionally wherein the first temperature is between about 20 degrees Celsius and about 25 degrees Celsius; (iii) terminating the anionic polymerization by contacting the carbanion-containing polymeric chain with an epoxide in a third solvent at a third temperature and a protic solvent, optionally a mixture of an alcohol and a strong acid, to provide a hydroxyl-terminated polymeric chain, optionally wherein the epoxide is ethylene oxide and wherein the third solvent comprises a non-polar organic solvent; and (iv) esterifying the hydroxyl group of the hydroxyl-terminated polymeric chain by one of: (1) contacting the hydroxyl-terminated polymeric chain with a vinyl-substituted carboxylic acid, optionally 4-vinylbenzoic acid, in the presence of a carbodiimide and dimethylaminopyridine (DMAP) in a fourth solvent at a fourth temperature to provide a single-chain macromonomer; or (2) contacting the hydroxyl-terminated polymeric chain with a vinyl-substituted dicarboxylic acid, optionally 5-(4-vinylbenzyloxy)isophthalic acid, in the presence of a carbodiimide and DMAP in a fourth solvent at a fourth temperature to provide a double-chain macromonomer; optionally wherein the fourth solvent is tetrahydrofuran (THF) and the fourth temperature is between about 5 degrees Celsius and about 0 degrees Celsius.

In some embodiments, preparing the emulsion comprises adding the macromonomer and the second monomer to an organic solvent to prepare a homogeneous solution; adding the homogeneous solution to an aqueous solution comprising one or more surfactants to provide a mixture; and agitating the mixture to provide a homogeneous emulsion, wherein preparing the emulsion further comprises adding a polymerization initiator to one or both of the homogeneous solution or the mixture, optionally wherein the polymerization initiator comprises a radical initiator and/or a redox initiator, further optionally wherein the organic solvent is a non-polar organic solvent, such as toluene or hexadecane, and further optionally wherein the agitating is performed via sonication. In some embodiments, the second monomer is selected from isoprene and an alkyl acrylate, optionally n-butyl acrylate.

In some embodiments, the polymerization initiator comprises a radical initiator, optionally azobisisobutyronitrile (AIBN), and copolymerizing the macromonomer and the second monomer comprises heating the emulsion prepared in step (b). In some embodiments, the heating comprises heating the emulsion to a temperature between about 50 degrees Celsius and about 90 degrees Celsius for about eight hours. In some embodiments, the method further comprises drying and/or purifying the multigraft copolymer.

In some embodiments, the presently disclosed subject matter provides a multigraft copolymer prepared by a method comprising: (a) providing a macromonomer comprising one or more polymeric chains attached to a polymerizable terminal group, wherein the one or more polymeric chains comprise constitutional units from at least a first monomer; (b) preparing an emulsion comprising the macromonomer, a second monomer, and a polymerization initiator; and (c) copolymerizing the macromonomer and the second monomer to form the multigraft copolymer. In some embodiments, the multigraft copolymer has a weight-average molecular mass ($M_w$) of at least about 1,000,000 grams per mole (g/mol) or has at least about 15 branch points per molecule.

In some embodiments, the multigraft copolymer comprises a rubbery polymeric main chain and a plurality of glassy or semi-crystalline polymeric side chains, wherein the main chain comprises a plurality of randomly spaced branch points and wherein each of the plurality of glassy or semi-crystalline polymeric side chains is attached to the main chain at one of the plurality of randomly spaced branch points. In some embodiments, the second monomer is n-butyl acrylate and the rubbery polymeric main chain comprises poly(n-butyl acrylate). In some embodiments, the first monomer is styrene and the glassy or semi-crystalline polymeric side chains comprise polystyrene.

In some embodiments, the presently disclosed subject matter provides a thermoplastic elastomer comprising the multigraft copolymer. In some embodiments, the presently disclosed subject matter provides an adhesive comprising the multigraft copolymer.

In some embodiments, the presently disclosed subject matter provides a random multigraft copolymer comprising a poly(alkyl acrylate) main chain and a plurality of glassy or semi-crystalline polymeric side chains, wherein said main chain comprises a plurality of randomly spaced branch points, and wherein each of the plurality of polymeric side chains is attached to the main chain at one of the plurality of randomly spaced branch points. In some embodiments, the copolymer comprises one of a comb or a centipede architecture.

In some embodiments, the copolymer has a weight-average molecular mass ($M_w$) greater than about 500,000 grams per mole (g/mol). In some embodiments, the copolymer has a $M_w$ of about 1,000,000 g/mol or more.

In some embodiments, the copolymer comprises between about 15 and about 43 weight % polystryrene. In some embodiments, the copolymer comprises between about 26 and about 32 weight % polystyrene.

In some embodiments, the copolymer has a glass transition temperature ($T_g$) of between about −13 degrees C. (° C.) and about −42° C., optionally between about −30° C. and about −42° C. In some embodiments, the copolymer has at least about 12 branch points per molecule. In some embodiments, the copolymer has between about 15 and about 22 branch points per molecule.

In some embodiments, the poly(alkyl acrylate) main chain is poly(n-butyl acrylate). In some embodiments, the polymeric side chains comprise polystyrene.

In some embodiments, the presently disclosed subject matter provides a thermoplastic elastomer comprising a random multigraft copolymer comprising a poly(alkyl acrylate) main chain and a plurality of glassy or semi-crystalline polymeric side chains, wherein said main chain comprises a plurality of randomly spaced branch points, and wherein each of the plurality of polymeric side chains is attached to the main chain at one of the plurality of randomly spaced branch points. In some embodiments, the presently disclosed subject matter provides an adhesive comprising a random multigraft copolymer comprising a poly(alkyl acrylate) main chain and a plurality of glassy or semi-crystalline polymeric side chains, wherein said main chain comprises a plurality of randomly spaced branch points, and wherein each of the plurality of polymeric side chains is attached to the main chain at one of the plurality of randomly spaced branch points.

Accordingly, it is an object of the presently disclosed subject matter to provide a method of preparing multigraft copolymers, the copolymers prepared thereby, such as poly (n-butyl acrylate-g-styrene) copolymers, and thermoplastic elastomers and adhesives comprising the copolymers. This and other objects are achieved in whole or in part by the presently disclosed subject matter. Further, an object of the presently disclosed subject matter having been stated above, other objects and advantages of the presently disclosed subject matter will become apparent to those skilled in the art after a study of the following description and Examples.

BRIEF DESCRIPTION OF THE DRAWINGS

FIG. 2A is a schematic drawing showing the synthesis of hydroxyl-terminated polystyrene (PS).

FIG. 2B is a schematic drawing showing a synthesis of a single-tailed polystyrene (PS) macromonomer, i.e., Macromonomer 1, comprising one polymer chain attached to a polymerizable terminal group via a carbon-carbon single bond.

FIG. 2C is a schematic drawing showing the synthesis of a double-tailed polystyrene (PS) macromonomer, i.e., Macromonomer 2, comprising two polymer chains attached to a polymerizable terminal group via ester linkages.

FIG. 2D is a schematic drawing showing a synthesis of a single-tailed polystyrene (PS) macromonomer comprising one polymer chain attached to a polymerizable terminal group via an ester linkage.

FIG. 4A is a proton nuclear magnetic resonance ($^1$H-NMR) spectrum of the polystyrene (PS) macromonomer described for FIG. 2D. Proton assignments are indicated by letters, i.e., a, a', b, and c, over the peaks and in the structure in the upper left hand corner.

FIG. 4B is a matrix-assisted laser desorption/ionization-time of flight (MALDI-TOF) mass spectrum of the polystyrene (PS) macromonomer described for FIG. 2D.

DETAILED DESCRIPTION

Figure 1A:
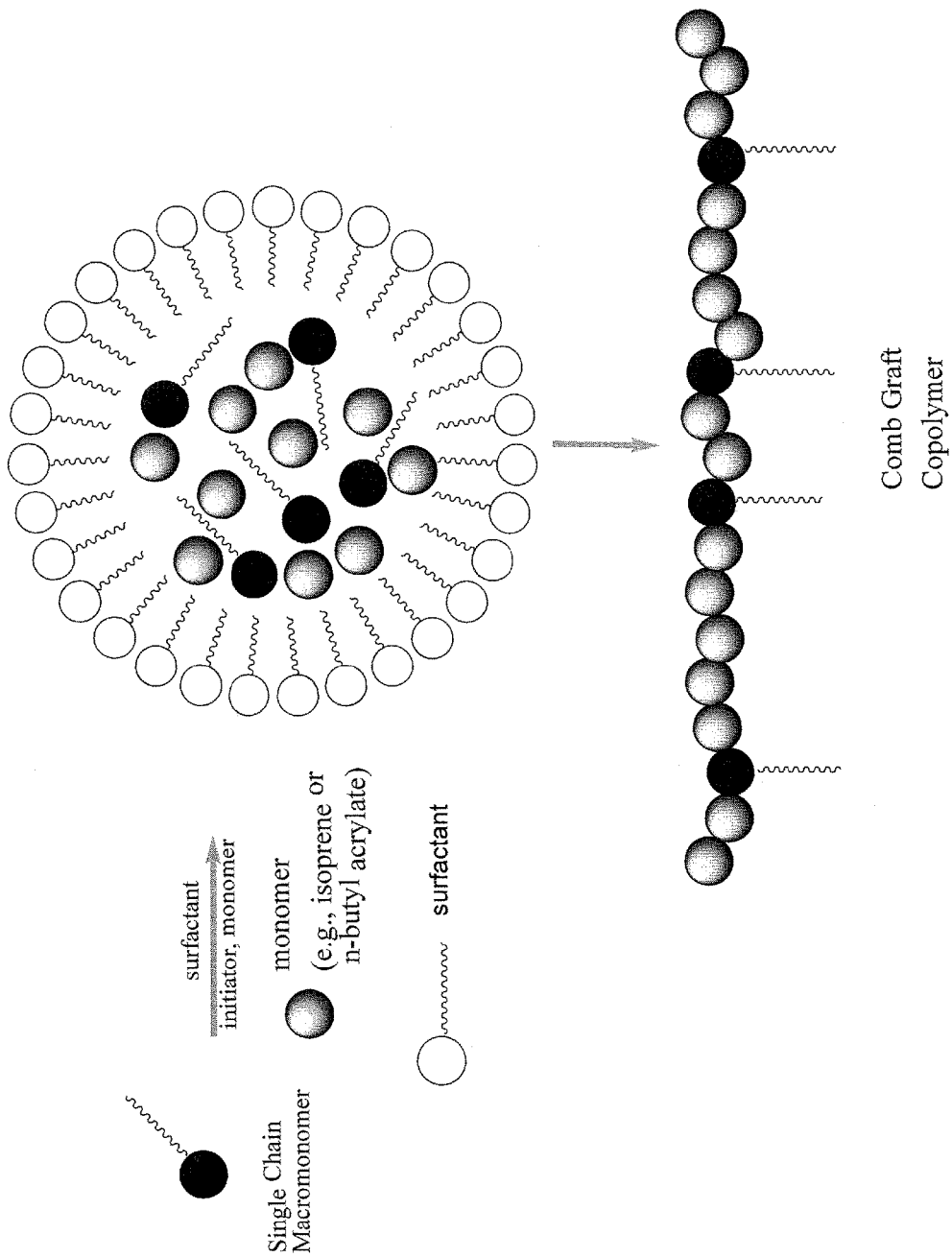
FIG. 1A is a schematic drawing showing a synthesis of a comb multigraft copolymer using emulsion polymerization.

The presently disclosed subject matter will now be described more fully hereinafter with reference to the accompanying Examples and Drawings, in which representative embodiments are shown. The presently disclosed subject matter can, however, be embodied in different forms and should not be construed as limited to the embodiments set forth herein. Rather, these embodiments are provided so that this disclosure will be thorough and complete, and will fully convey the scope of the embodiments to those skilled in the art.

Unless otherwise defined, all technical and scientific terms used herein have the same meaning as commonly understood by one of ordinary skill in the art to which this presently described subject matter belongs. All publications, patent applications, patents, and other references mentioned herein are incorporated by reference in their entirety.

Throughout the specification and claims, a given chemical formula or name shall encompass all optical and stereoisomers, as well as racemic mixtures where such isomers and mixtures exist.

I. Definitions

While the following terms are believed to be well understood by one of ordinary skill in the art, the following definitions are set forth to facilitate explanation of the presently disclosed subject matter.

Following long-standing patent law convention, the terms "a", "an", and "the" refer to "one or more" when used in this application, including the claims. Thus, for example, reference to "a solvent" includes a plurality or mixture of solvents, and so forth.

Unless otherwise indicated, all numbers expressing quantities of size, weight, percentage, temperature or other reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value or to an amount of size, weight, concentration, temperature or percentage is meant to encompass variations of, in some embodiments ±20%, in some embodiments ±10%, in some embodiments ±5%, in some embodiments ±1%, and in some embodiments ±0.1% from the specified amount, as such variations are appropriate to perform the disclosed methods.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "anionic polymerization" refers to an ionic polymerization in which the kinetic chain carriers are anions. Accordingly, an anionic polymerization reaction is a chain reaction in which the growth of the polymer chain proceeds by reaction(s) between a monomer(s) and a reactive site(s) on the polymer chain with regeneration of the reactive site(s) at the end of each growth step. Anionic polymerization typically is used to produce macromolecules from monomers that contain a carbon-carbon double bond, such as styrene and/or butadiene. Such reactions are referred to as anionic vinyl polymerization. For example, anionic polymerization can take place with vinyl monomers that can also comprise electron-withdrawing groups, such as nitrile, carboxyl, phenyl, and vinyl, or with monomers that can stabilize the anions through resonance. These polymerizations are initiated by nucleophilic addition to the double bond of the monomer, wherein the initiator comprises an anion, such as hydroxide, alkoxides, cyanide, or a carbanion. In some embodiments, the carbanion is generated from an organometallic species, such as an alkyl lithium, e.g., butyl lithium, or a Grignard reagent.

As used herein, a "monomer" refers to a molecule that can undergo polymerization, thereby contributing constitutional units, i.e., an atom or group of atoms, to the essential structure of a macromolecule.

As used herein, a "macromolecule" refers to a molecule of high relative molecular mass, the structure of which comprises the multiple repetition of units derived from molecules of low relative molecular mass, e.g., monomers and/or oligomers.

An "oligomer" refers to a molecule of intermediate relative molecular mass, the structure of which comprises a small plurality (e.g., 2, 3, 4, 5, 6, 7, 8, 9, or 10) of repetitive units derived from molecules of lower relative molecular mass.

A "polymer" refers to a substance comprising macromolecules. In some embodiments, the term "polymer" can include both oligomeric molecules and molecules with larger numbers (e.g., >10, >20, >50, >100) of repetitive units. In some embodiments, "polymer" refers to macromolecules with at least 10 repetitive units.

A "copolymer" refers to a polymer derived from more than one species of monomer.

As used herein, "macromonomer" refers to a polymer having at least one functional end group (e.g. a vinyl group) through which polymerization reactions can proceed. Macromonomers are thus macromolecular monomers which can be converted to homo- or copolymers of defined structures. In some embodiments, a macromonomer can comprise more than one (e.g., 2, 3, 4, 5, 6, etc.) polymeric chain attached to one functional (e.g., polymerizable) end group. Macromonomers with two polymeric chains attached to one functional end group can be referred to as "double-tailed" or "double chain" macromonomers. In some embodiments, the macromonomer comprises a single polymeric chain attached to one functional end group. Such macromonomers can be referred to as "single-tailed" or "single chain" macromonomers.

As used herein, a "block macromolecule" refers to a macromolecule that comprises blocks in a linear sequence. A "block" refers to a portion of a macromolecule that has at least one feature that is not present in the adjacent portions of the macromolecule. A "block copolymer" refers to a copolymer in which adjacent blocks are constitutionally different, i.e., each of these blocks comprises constitutional units derived from different characteristic species of monomer or with different composition or sequence distribution of constitutional units.

For example, a diblock copolymer of polybutadiene and polystyrene is referred to as polybutadiene-block-polystyrene. Such a copolymer is referred to generically as an "AB block copolymer." Likewise, a triblock copolymer can be represented as "ABA." Other types of block polymers exist, such as multiblock copolymers of the $(AB)_n$ type, ABC block polymers comprising three different blocks, and star block polymers, which have a central point with three or more arms, each of which is in the form of a block copolymer, usually of the AB type.

As used herein, a "graft macromolecule" or "graft polymer" refers to a macromolecule comprising one or more species of block connected to the main chain as side chains, wherein the side chains comprise constitutional or configurational features that differ from those in the main chain.

A "branch point" (or "junction point") refers to a point on a chain (e.g., a main chain) at which a branch is attached. A "branch," also referred to as a "side chain," "graft," or "pendant chain," is an oligomeric or polymeric offshoot from a macromolecule chain. An oligomeric branch can be termed a "short chain branch," whereas a polymeric branch can be termed a "long chain branch."

A "chain" refers to the whole or part of a macromolecule, an oligomer, or a block comprising a linear or branched sequence of constitutional units between two boundary constitutional units, wherein the two boundary constitutional units can comprise an end group, a branch point, or combinations thereof.

A "main chain" or "backbone" refers to a linear chain from which all other chains are regarded as being pendant.

A "side chain" refers to a linear chain which is attached to a main chain at a branch point.

An "end group" (or "terminal group") refers to a constitutional unit that comprises the extremity of a macromolecule or oligomer and, by definition, is attached to only one constitutional unit of a macromolecule or oligomer.

A "comb macromolecule" refers to a macromolecule comprising a main chain with multiple branch points from each of which one linear side chain emanates.

A "centipede macromolecule" refers to a macromolecule comprising a main chain with multiple branch points, wherein from each branch point two linear side chains emanate.

A "star polymer" refers to a polymer comprising a macromolecule comprising a single branch point from which a plurality of linear chains (or arms) emanate. A star polymer or macromolecule with "n" linear chains emanating from the branch point is referred to as an "n-star polymer." If the linear chains of a star polymer are identical with respect to constitution and degree of polymerization, the macromolecule is referred to as a "regular star macromolecule." If different arms of a star polymer comprise different monomeric units, the macromolecule is referred to as a "variegated star polymer."

A "miktoarm star polymer" refers to a star polymer comprising chemically different (i.e., "mixed") arms, thereby producing a star polymer having the characteristic of chemical asymmetry.

The term "latex" as used herein can refer to a colloidal suspension of polymer particles in a liquid. In some embodiments, the latex can be obtained as the product of an emulsion, mini-emulsion, micro-emulsion or dispersion polymerization.

The term "rubbery" can refer to a polymer having a glass transition temperature ($T_g$) of about 0° C. or less.

The term "glassy" can refer to a polymer having a $T_g$ of about 60° C. or more.

For instance, multigraft copolymers with a "rubbery" backbone, such as polyisoprene (PI) or other polymers having a glass transition temperature ($T_g$) of about 0° C. or less, and "glassy" side chains, such as polystyrene (PS) or other polymers having a $T_g$ of about 60° C. or more, can provide a class of thermoplastic elastomers that can be referred to as "superelastomers."

Superelastomers can have advantageous properties compared to commercial linear thermoplastic elastomers, such as larger elongation at break, lower residual strain, and highly tunable modulus.

As used herein the term "alkyl" can refer to $C_{1-20}$ inclusive, linear (i.e., "straight-chain"), branched, or cyclic, saturated or at least partially and in some cases fully unsaturated (i.e., alkenyl and alkynyl) hydrocarbon chains, including for example, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, and allenyl groups. "Branched" refers to an alkyl group in which a lower alkyl group, such as methyl, ethyl or propyl, is attached to a linear alkyl chain. "Lower alkyl" refers to an alkyl group having 1 to about 8 carbon atoms (i.e., a $C_{1-8}$ alkyl), e.g., 1, 2, 3, 4, 5, 6, 7, or 8 carbon atoms. "Higher alkyl" refers to an alkyl group having about 10 to about 20 carbon atoms, e.g., 10, 11, 12, 13, 14, 15, 16, 17, 18, 19, or 20 carbon atoms. In certain embodiments, "alkyl" refers, in particular, to $C_{1-8}$ straight-chain alkyls. In other embodiments, "alkyl" refers, in particular, to $C_{1-8}$ branched-chain alkyls.

Alkyl groups can optionally be substituted (a "substituted alkyl") with one or more alkyl group substituents, which can be the same or different. The term "alkyl group substituent" includes but is not limited to alkyl, substituted alkyl, halo, arylamino, acyl, hydroxyl, aryloxyl, alkoxyl, alkylthio, arylthio, aralkyloxyl, aralkylthio, carboxyl, alkoxycarbonyl, oxo, and cycloalkyl. In some embodiments, there can be optionally inserted along the alkyl chain one or more oxygen, sulfur or substituted or unsubstituted nitrogen atoms, wherein the nitrogen substituent is hydrogen, lower alkyl (also referred to herein as "alkylaminoalkyl"), or aryl.

Thus, as used herein, the term "substituted alkyl" includes alkyl groups, as defined herein, in which one or more atoms or functional groups of the alkyl group are replaced with another atom or functional group, including for example, alkyl, substituted alkyl, halogen, aryl, substituted aryl, alkoxyl, hydroxyl, nitro, amino, alkylamino, dialkylamino, sulfate, and mercapto.

The term "aryl" is used herein to refer to an aromatic substituent that can be a single aromatic ring, or multiple aromatic rings that are fused together, linked covalently, or linked to a common group, such as, but not limited to, a methylene or ethylene moiety. The common linking group also can be a carbonyl, as in benzophenone, or oxygen, as in diphenylether, or nitrogen, as in diphenylamine. The term "aryl" specifically encompasses heterocyclic aromatic compounds. The aromatic ring(s) can comprise phenyl, naphthyl, biphenyl, diphenylether, diphenylamine and benzophenone, among others. In particular embodiments, the term "aryl" means a cyclic aromatic comprising about 5 to about 10 carbon atoms, e.g., 5, 6, 7, 8, 9, or 10 carbon atoms, and including 5- and 6-membered hydrocarbon and heterocyclic aromatic rings.

The aryl group can be optionally substituted (a "substituted aryl") with one or more aryl group substituents, which can be the same or different, wherein "aryl group substituent" includes alkyl, substituted alkyl, aryl, substituted aryl, aralkyl, hydroxyl, alkoxyl, aryloxyl, aralkyloxyl, carboxyl, acyl, halo, nitro, alkoxycarbonyl, aryloxycarbonyl, aralkoxycarbonyl, acyloxyl, acylamino, aroylamino, carbamoyl, alkylcarbamoyl, dialkylcarbamoyl, arylthio, alkylthio, alkylene, and —NR'R", wherein R' and R" can each be independently hydrogen, alkyl, substituted alkyl, aryl, substituted aryl, and aralkyl.

Thus, as used herein, the term "substituted aryl" includes aryl groups, as defined herein, in which one or more atoms or functional groups of the aryl group are replaced with another atom or functional group, including for example, alkyl, substituted alkyl, halogen, aryl, substituted aryl, alkoxyl, hydroxyl, nitro, amino, alkylamino, dialkylamino, sulfate, and mercapto.

Specific examples of aryl groups include, but are not limited to, cyclopentadienyl, phenyl, furan, thiophene, pyrrole, pyran, pyridine, imidazole, benzimidazole, isothiazole, isoxazole, pyrazole, pyrazine, triazine, pyrimidine, quinoline, isoquinoline, indole, carbazole, and the like.

"Heteroaryl" as used herein refers to an aryl group that contains one or more non-carbon atoms (e.g., O, N, S, Se, etc) in the backbone of a ring structure. Nitrogen-containing heteroaryl moieties include, but are not limited to, pyridine, imidazole, benzimidazole, pyrazole, pyrazine, triazine, pyrimidine, and the like.

"Aralkyl" refers to an -alkyl-aryl group, optionally wherein the alkyl and/or aryl moiety is substituted (e.g., with an alkyl or aryl group substituent).

The terms "halo", "halide", or "halogen" as used herein refer to fluoro, chloro, bromo, and iodo groups.

The term "hydroxyl" refers to the —OH group.

The term "vinyl" refers to the group —CH=CH$_2$.

The terms "carboxylate" and "carboxylic acid" can refer to the groups —C(=O)O$^-$ and —C(=O)OH, respectively or to molecules containing such groups, such as benzoic acid or alkanoic acids (e.g., hexanoic acid, butanoic acid), etc.

The term "alkyl acrylate" refers to a compound having the formula CH$_2$=CHC(=O)OR, wherein R is an alkyl or substituted alkyl group. In some embodiments, "alkyl acrylate" refers to a compound of the formula CH$_2$=CHC(=O) OR, wherein R is a $C_1$-$C_6$ alkyl group.

The term "aprotic solvent" refers to a solvent molecule which can neither accept nor donate a proton. Typical aprotic solvents include, but are not limited to, acetone, acetonitrile, benzene, butanone, butyronitrile, carbon tetrachloride, chlorobenzene, chloroform, 1,2-dichloroethane, dichloromethane (DCM), diethyl ether, dimethylacetamide, N,N-dimethylformamide (DMF), dimethylsulfoxide (DMSO), 1,4-dioxane, ethyl acetate, ethylene glycol dimethyl ether, hexane, N-methylpyrrolidone, pyridine, tetrahydrofuran (THF), and toluene. Certain aprotic solvents are polar solvents. Examples of polar aprotic solvents include, but are not limited to, acetone, acetonitrile, butanone, N,N-dimethylformamide, and dimethylsulfoxide. Certain aprotic solvents are non-polar solvents (e.g., non-polar organic solvents). Examples of nonpolar organic solvents include, but are not limited to, diethyl ether, aliphatic hydrocarbons, such as hexane, aromatic hydrocarbons, such as benzene and toluene, and halogenated hydrocarbons, such as carbon tetrachloride, DCM, and chloroform.

The term "protic solvent" refers to a solvent molecule which contains a hydrogen atom bonded to an electronegative atom, such as an oxygen atom or a nitrogen atom. Typical protic solvents include, but are not limited to, carboxylic acids, such as acetic acid, alcohols, such as methanol and ethanol, amines, amides, and water.

The term "strong acid" refers to an acid that essentially ionizes 100% in an aqueous solution. Strong acids include, but are not limited to, hydrochloric acid, hydrobromic acid, perchloric acid, nitric acid and sulfuric acid.

II. Emulsion Copolymerization Preparation of Graft Copolymers

Thermoplastic elastomers (TPEs) are materials with rubber-like properties. They have various applications in daily life, for example, as elastomers and adhesives. Most commercial TPEs, such as SBS and SIS (S=polystyrene, B=polybutadiene, I=polyisoprene) are linear triblock copolymers synthesized by anionic polymerization. In contrast to conventional rubbers, which achieve their elastic properties by chemical cross-links between macromolecules, TPEs exhibit rubber-like behavior due to the formation of hard physically cross-linked domains in a soft continuous phase. See Holdon et al., Thermplastic Elastomers, Hanser, Munich, 1996; and Spontak and Patel, Current opinion in colloid & interface science, 2000, 5, 333.

Many efforts have been made to develop TPEs with improved elasticity and mechanical properties. See Wisse et al., Macromolecules, 2008, 42, 524; and Cohn and Salomon, Biomaterials, 2005, 26, 2297. A class of TPEs was recently developed based on multigraft copolymers having regularly spaced tri-, tetra- and hexafunctional junction points, in which a rubbery backbone (e.g., polyisoprene) behaves as a continuous matrix with multiple glassy domains from branched segments (e.g., polystyrene) at each junction point. See Beyer et al., Macromolecules, 2000, 33, 2039; Weidisch et al., Macromolecules, 2001, 34, 6333; Mays et al., Macromolecular Symposia, 2004, 215, 111; and Uhriq and Mays, Polymer Chemistry, 2011, 2, 69. The microphase separated morphologies formed by these "comb", "centipede" and "barbwire" architectures were similar to those of conventional linear triblock copolymers, but they exhibit poorer long range order. These multigraft copolymers were synthesized by high vacuum anionic polymerization The presently disclosed subject matter is based, in part, on free radical polymerization. A free radical polymerization-based synthesis of random multigraft copolymers can offer several advantages. For instance, free radical polymerization is applicable to a wider range of monomers than anionic polymerization. Radical polymerization can be performed under less stringent reaction conditions, using lower cost initiators, and using a wider choice of dispersing media, including water. In addition, emulsion free-radical polymerization can be well-suited to the synthesis of polymers and copolymers of high molecular weight.

Figure 1B:
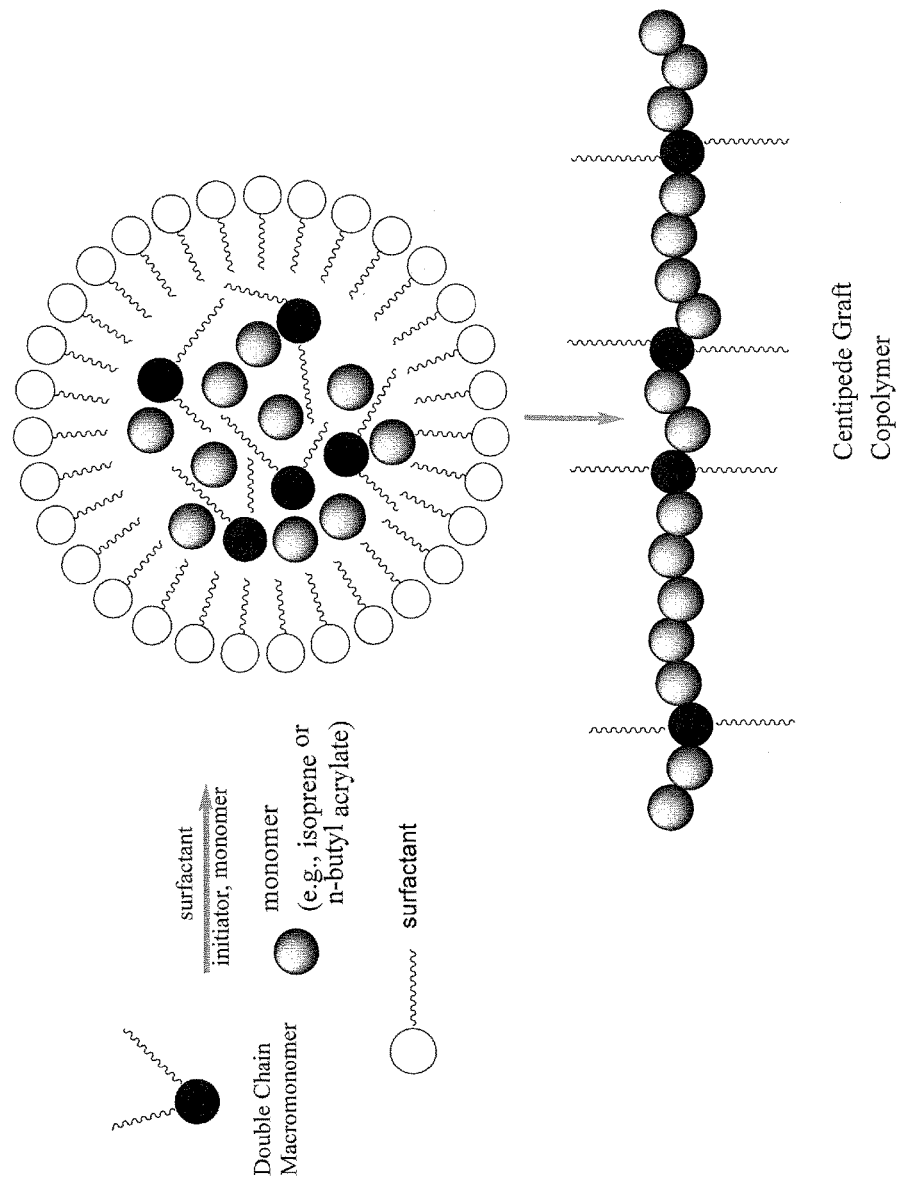
FIG. 1B is a schematic drawing showing a synthesis of a centipede multigraft copolymer using emulsion polymerization.

In some embodiments, the presently disclosed subject matter provides a method of preparing multigraft copolymers (e.g., random multigraft copolymers) using emulsion copolymerization (e.g., free radical mini-emulsion copolymerization) of monomers and macromonomers. See FIGS. 1A and 1B. Thus, in some embodiments, the presently disclosed method relates to the use of the "grafting through" strategy of preparing graft copolymers in combination with emulsion copolymerization. In some embodiments, the presently disclosed subject matter provides a method of preparing a multigraft copolymer. In some embodiments, the method comprises: (a) providing a macromonomer comprising one or more polymeric chains attached to a polymerizable terminal group, wherein the one or more polymeric chains comprise constitutional units from at least a first monomer; (b) preparing an emulsion comprising the macromonomer, a second monomer, and a polymerization initiator; and (c) copolymerizing the macromonomer and the second monomer to form the multigraft copolymer.

The macromonomer can be provided by polymerizing at least a first monomer and terminating one end of the resulting polymer with a polymerizable terminal group. In some embodiments, the macromonomer is provided by polymerizing at least a first monomer via anionic polymerization. In some embodiments, the first monomer comprises a vinyl group. Suitable first monomers include, but are not limited to, styrenes, α-methylstryrene, alkenes (e.g., ethene (also known as ethylene)), dienes (e.g., butadiene, cyclohexadiene, etc.), vinylhalides, and vinyl pyridine. The first monomer can also include groups that can stabilize a negative charge, e.g., via charge delocalization, such as, but not limited to, an aromatic group, an aldehyde, or a conjugated double bond. In some embodiments, the first monomer is styrene.

In some embodiments, the macromonomer can have one, two, three, four, five, six or more polymeric chains. In some embodiments, the macromonomer has one polymeric chain (i.e., is a "single-tailed" macromonomer). In some embodiments, the macromonomer has two polymeric chains (i.e., is a "double-tailed" macromonomer).

In some embodiments, providing the macromonomer comprises: (i) providing the first monomer, wherein said first monomer comprises a vinyl group; (ii) contacting the first monomer with an alkyl lithium reagent or a Grignard reagent in a first solvent at a first temperature to initiate anionic polymerization, thereby providing a carbanion-containing polymeric chain; and (iii) terminating anionic polymerization by contacting the carbanion-containing polymeric chain with a vinyl-substituted aryl halide, such as a 4-vinylbenzyl halide, in a second solvent at a second temperature to provide a single chain (single-tailed) macromonomer. In some embodiments, the first monomer is contacted with an alkyl lithium reagent, such as sec-butyl lithium or another alkyl lithium. The first solvent can be any suitable non-polar organic solvent, such as, but not limited to benzene. In some embodiments, the first temperature is about room temperature (e.g., between about 20° C. and about 25° C.). In some embodiments, the 4-vinylbenzyl halide is 4-vinylbenzyl chloride. The second solvent can also be any suitable non-polar solvent, such as, but not limited to benzene, tetrahydrofuran (THF) or a mixture thereof. In some embodiments, the second temperature is lower than the first temperature. For example, the second temperature can be about 5° C. or lower. In some embodiments, the second temperature is about −78° C.

In some embodiments, providing the macromonomer comprises preparing a hydroxyl-terminated polymeric chain and esterifying one or more hydroxyl-terminated polymeric chains by esterification with a compound comprising both a polymerizable group and one or more carboxylic acid groups. Esterification can be performed, for example, using a carbodiimide, such as, but not limited to dicyclohexylcarbodiimide (DCC) or diisopropylcarbodiimide (DIC), and dimethylaminopyridine (DMAP), i.e., Steglich esterification. Accordingly, in some embodiments, providing the macromonomer comprises: (i) providing the first monomer, wherein the first monomer comprises a vinyl group; (ii) contacting the first monomer with an alkyl lithium reagent or a Grignard reagent in a first solvent at a first temperature to initiate anionic polymerization, thereby providing a carbanion-containing polymeric chain; and (iii) terminating the anionic polymerization by contacting the carbanion-containing polymeric chain with (a) an epoxide in a third solvent at a third temperature and (b) a protic solvent (e.g., an alcohol), optionally further comprising a strong acid, to provide a hydroxyl-terminated polymeric chain. The first solvent can be any suitable non-polar solvent, such as, but not limited to benzene. In some embodiments, the first monomer is contacted with an alkyl lithium, such as sec-butyl lithium or another suitable alkyl lithium. In some embodiments, the first temperature is about room temperature (e.g., between about 20° C. and about 25° C.). In some embodiments, the epoxide is ethylene oxide. In some embodiments, the third solvent is a non-polar organic solvent (e.g., benzene). In some embodiments, the protic solvent is an alcohol (e.g., methanol or ethanol). In some embodiments, the protic solvent further comprises a strong acid, such as HCl, to complete protonation of the hydroxyl group.

In some embodiments, the hydroxyl group of the hydroxyl-terminated polymeric chain can be esterified either by (1) contacting the hydroxyl-terminated polymeric chain with a vinyl-substituted carboxylic acid in the presence of a carbodiimide and dimethylaminopyridine (DMAP) in a fourth solvent at a fourth temperature to provide a single-chain macromonomer; or (2) contacting the hydroxyl-terminated polymeric chain with a vinyl substituted dicarboxylic acid, in the presence of a carbodiimide and DMAP in a fourth solvent at a fourth temperature to provide a double-chain macromonomer. In some embodiments, the fourth solvent can be any suitable non-polar solvent, such as, but not limited to tetrahydrofuran (THF).

In some embodiments, the fourth temperature is between about 5° C. and about −10° C. In some embodiments, the fourth temperature is about 0° C. In some embodiments, the vinyl-substituted carboxylic acid is a vinyl-substituted aryl carboxylic acid, e.g., 4-vinylbenzoic acid. In some embodiments, the vinyl-substituted dicarboxylic acid is a vinyl-substituted aryl dicarboxylic acid, e.g., 5-(4-vinylbenzyloxy)isophthalic acid.

The macromonomers can be relatively monodisperse. For example, the macromonomers can have a polydispersity index (PDI) of less than about 1.2 or less than about 1.1. In some embodiments, the PDI of the macromonomer is between about 1 and about 1.1.

In addition to the macromonomer, second monomer and polymerization initiator, the emulsion can also contain two immiscible liquids (e.g., an organic solvent and an aqueous solution) and one or more surfactants. Anionic, neutral or cationic surfactants can be used. In some embodiments, the emulsion can also include one or more co-surfactants, non-surfactant stabilizers (e.g., a water soluble polymer, such as polyvinyl alcohol), buffering agents, chain transfer agents, inert salts, and/or preservatives. In one or more embodiments, the polymerization is initiated by a thermally activatable initiator and/or a redox initiator.

Suitable thermally activatable radical initiators can include, for example, those of the peroxy and azo type. These include, but are not limited to, hydrogen peroxide, peracetic acid, t-butyl hydroperoxide, di-t-butyl peroxide, dibenzoyl peroxide, benzoyl hydroperoxide, 2,4-dichlorobenzoyl peroxide, 2,5-dimethyl-2,5-bis(hydroperoxy)hexane, perbenzoic acid, t-butyl peroxypivalate, t-butyl peracetate, dilauroyl peroxide, dicapryloyl peroxide, distearoyl peroxide, dibenzoyl peroxide, diisopropyl peroxydicarbonate, dodecyl peroxydicarbonate, dieicosyl peroxydicarbonate, di-t-butyl perbenzoate, azobisisobutyronitrile (AIBN), 2,2'-azobis-2,4-dimethylvaleronitrile, ammonium persulfate, potassium persulfate, sodium persulfate and sodium perphosphate.

Redox initiators can involve the use of a plurality of initiator components. For instance, redox initiation typically involves the use of an oxidizing agent (or agents) and a reducing agent, at least one of which is soluble in water. Suitable oxidizing agents include, for example, persulfate salts and hydroperoxides. Suitable reducing agents include, but are not limited to, glucose and sulfites. In some embodiments, redox initiation includes the use of a redox catalyst, such as an iron compound. A suitable redox initiator can include a combination of cumene hydroperoxide, iron sulfate, ethylenediaminetetraacetic acid (EDTA), and sodium formaldehyde sulfoxylate (SFS). In some embodiments, the initiator is AIBN. In some embodiments, the initiator is a combination of cumene hydroperoxide, iron sulfate, EDTA sodium salt, and SFS.

In some embodiments, the emulsion includes an anionic and/or nonionic surfactant. Anionic surfactants include, but are not limited to, sodium lauryl sulfate, sodium tridecyl ether sulfate, dioctylsulfosuccinate sodium salt and sodium salts of alkylaryl polyether sulfonates (e.g., sodium dodecylbenzene sulfonate, SDBS). Nonionic surfactants include, but are not limited to, alkylaryl polyether alcohols and ethylene oxide-propylene oxide copolymers. In some embodiments, the surfactant is SDBS.

In some embodiments, preparing the emulsion comprises adding the macromonomer and the second monomer to an organic solvent to prepare a homogeneous solution; adding the homogeneous solution to an aqueous solution comprising one or more surfactants to provide a mixture; and agitating the mixture to provide a homogeneous emulsion, wherein preparing the emulsion further comprises adding a polymerization initiator (or initiator component) to one or both of the homogeneous solution or the mixture. In some embodiments, the organic solvent is a non-polar organic solvent, such as an aromatic solvent or an alkane (e.g., toluene or hexadecane). The agitating can be performed by any suitable approach, e.g., sonication, high-pressure homogenizer, manual or robotic shaking, etc. In some embodiments, the homogeneous emulsion comprises stable nanoparticles of the dispersed phase (e.g., the organic phase). The nanoparticles can have a diameter of between about 50 nanometers and about 1 micron, or between about 50 nanometers and about 500 nanometers.

Any suitable monomer can be used as the second monomer. In some embodiments, the second monomer comprises a vinyl group. In some embodiments, the second monomer is an alkene, diene, vinyl halide, or vinyl ester (e.g., an alkyl acrylate). In some embodiments, the second monomer is isoprene or an alkyl acrylate (e.g., n-butyl acrylate).

In some embodiments, copolymerizing the macromonomer and the second monomer comprises heating the emulsion. The heating can be to between about 40° C. and about 100° C. (e.g., about 40, 45, 50, 55, 60, 65, 70, 75, 80, 85, 90, 95 or about 100° C.). In some embodiments, the heating is to between about 50° C. and about 90° C. In some embodiments, the heating is to about 60° C. or to about 80° C.

The copolymerizing can continue for any desired length of time (e.g., to provide a desired copolymer weight or monomer conversion level). In some embodiments, samples of copolymer can be taken during the polymerization to allow for characterization of the remaining monomers and the copolymers by absolute molecular weight methods such as osmometry, matrix assisted laser desorption ionization time-of-flight mass spectrometry (MALDI-TOF-MS), and light scattering, as well as by gel permeation chromatography (GPC), nuclear magnetic resonance (NMR) spectrometry, and infrared (IR) spectrometry. In some embodiments, the copolymerization can continue for between about 1 hour and about 24 hours (e.g., 1, 2, 3, 4, 5, 6, 7, 8, 9, 10, 11, 12, 13, 14, 15, 16, 17, 18, 19, 20, 21, 22, 23, or 24 hours). In some embodiments, the copolymerization can continue for between about 6 hours and about 12 hours. In some embodiments, the copolymerization can continue for about 8 hours. Copolymerization can be stopped by demulsification, such as by adding a salt (e.g., sodium chloride) to break the emulsion.

In some embodiments, the copolymers can be dissolved in an organic solvent (e.g., THF) and precipitated into an alcohol (e.g. methanol). If desired, the copolymer can be dried. The drying can be done under vacuum, with or without heating (e.g., to about 30° C., 35° C. or 40° C.). In some embodiments, the copolymers can be purified, e.g. to remove any remaining macromonomer. Purification can be performed by any suitable technique, such as, but not limited to, via fractionation. Thus, in some embodiments, the presently disclosed methods can further include drying and/or purifying the copolymers.

In some embodiments, the prepared copolymers can have a latex particle size of about 250 nm or less. In some embodiments, the particle size can be between about 30 nm and about 150 nm (e.g., about 30, 40, 50, 60, 70, 80, 90, 100, 110, 120, 130, 140, or about 150 nm). In some embodiments, the particle size is between about 50 nm and about 120 nm.

III. Compositions Comprising Multigraft Copolymers

In some embodiments, the multigraft copolymers prepared according to the presently disclosed methods can have relatively high molecular weight and/or a relatively high number of grafts, e.g., as compared to multigraft copolymers prepared using anionic polymerization. In some embodiments, the presently disclosed methods can provide copolymers with a weight-average molecular weight (Mw) that is greater than about 850,000 g/mol. In some embodiments, the Mw is about 1,000,000, about 1,100,000 or about 1,200,000 g/mol or greater. In some embodiments, the presently disclosed methods can provide copolymers with at least about 15 branch points per molecule (e.g., about 15, 16, 17, 18, 19, 20, 21, or 22 branch points per molecule).

In some embodiments, the presently disclosed methods can be used to prepare multigraft copolymers having elastic or adhesive properties. Thus, in some embodiments, the methods are used to prepare a multigraft copolymer that comprises a rubbery polymeric backbone and a plurality of glassy polymeric grafts, each attached at one of a plurality of randomly placed branch points on the polymeric backbone. The multigraft copolymer can comprise, for example a trifunctional comb architecture, in which a single graft is attached at each branch point, a tetrafunctional centipede architecture, in which two grafts are attached at each branch point, or a hexafunctional barbwire architecture, in which four grafts are attached at each branch point.

As used herein, "rubbery" refers to a polymer that has a glass transition temperature of about 0° C. or less (e.g., about 0, −10, −20, −30, −40, −50, −60, −70, −90, −100° C. or less). In some embodiments, the rubbery polymer backbone can comprise one of the polymers including, but not limited to, polyisoprene, hydrogenated polyisoprene, polybutadiene, hydrogenated polybutadiene, polyisobutylene, butyl rubber, poly(butadiene-co-acrylonitrile), a silicone rubber (e.g., polydimethylsiloxane or another siloxane polymer), acrylic rubber, polychloroprene, ethylene propylene copolymer, ethylene/acrylic elastomer, urethane rubber, and combinations thereof. Thus, in some embodiments, the second monomer can be selected from monomers suitable for preparing such rubbery backbones (e.g, monomers including one or more of the group comprising isoprene, butadiene, isobutylene, acrylonitrile, an alkyl acrylate, dimethyldihalosilane, chloroprene, ethylene, and propylene).

As used herein, "glassy" refers to a polymer that has a glass transition temperature of about 60° C. or more (e.g., about 60, 70, 80, 90, or 100° C. or more). As used herein "glassy" can include semi-crystalline polymers (e.g., having a melting point of about 60° C. or greater). In some embodiments, the glassy polymer grafts can comprise a polymer selected from, but not limited to, polystyrene, hydrogenated polystyrene, poly(α-methylstyrene) or another glassy styrenic polymer hydrogenated derivative thereof, polyethylene, urethane hard domain, polyester, polymethylmethacrylate or another glassy acrylic polymer, polyvinyl chloride, poly(vinyl pyridine), polycarbonate, nylon, polyethylene teraphthalate, polycyclohexadiene, hydrogenated polycyclohexadiene, and combinations thereof. Thus, the first monomer can be selected from suitable monomers for the preparation of such glassy polymers.

In some embodiments, the weight percentage of the glassy grafts is between about 5 weight % and about 50 weight % (e.g., about 5, 10, 15, 20, 25, 30, 35, 40, 45, or 50 weight %) of the copolymer. In some embodiments, the weight % of the glassy grafts is between about 9 weight % and about 43 weight %. In some embodiments, the weight % of the glassy grafts is between about 9 weight % and about 32 weight %. In some embodiments, the weight % of the glassy grafts is between about 5 weight % and about 15 weight % or less.

In some embodiments, the glassy segments comprise polystyrene. In some embodiments, the rubbery backbone is polyisoprene or poly(n-butyl acrylate). In some embodiments, the first monomer is styrene and the second monomer is n-butyl acrylate. In some embodiments, the first monomer is styrene and the second monomer is isoprene.

In view of the mechanical properties of the presently disclosed materials, compositions comprising the materials can be provided for use in a wide variety of areas, both as high-tech and commodity thermoplastics. In particular, it is believed that the random multigraft copolymers disclosed herein can be prepared readily in large amounts and at relatively low cost, while still providing materials having high tensile strength, high elasticity, and high strain at break.

Accordingly, in some embodiments, the presently disclosed subject matter provides a thermoplastic elastomer composition comprising a random multigraft copolymer comprising a copolymer prepared using emulsion polymerization via a method as disclosed herein and comprising a rubbery polymeric backbone and a plurality of glassy polymeric grafts, wherein each of the plurality of glassy polymeric grafts is attached to the rubbery polymeric backbone at one of a plurality of randomly spaced branch points. The composition can also include at least one additional component, such as, but not limited to, an organic filler, an inorganic filler, a wax, a plasticizer, a tackifier, an antioxidant, a stabilizer (e.g., a thermal or UV stabilizer), a decorative agent, a biocide, a flame retardant, an anti-static agent, a therapeutic agent, a processing aid, such as a lubricant or a mold-release agent, and combinations thereof. More particular additives that can be used are described, for example, in U.S. Patent Application Publication No. 2014/0161858, herein incorporated by reference in its entirety. The type and amount of an additive or additives can be chosen based on the properties desired for the final end use of the composition. The additive or additives can be present in an amount that is less than about 50% by volume or by weight of the composition as a whole. Alternatively, the multigraft copolymer can comprise less than about 50% of the composition as a whole.

The presently disclosed compositions can obtained by mixing and homogenizing the components by the usual methods of plastics technology, and the sequence of adding the components can be varied. Examples of suitable mixing equipment are continuous or batch kneaders, compounding rolls, plastographs, Banbury mixers, co-rotating or counter rotating single- or twin-screw extruders, or other mixers which will provide essentially homogeneous mixtures. In some embodiments, the presently disclosed compositions are prepared by blending together the components including the multigraft copolymer and other additive or additives as desired at between about 23° C. to about 100° C., forming a paste like mixture, and further heating said mixture uniformly (e.g., to about 150° C., or to about 200° C. or more) until a homogeneous molten blend is obtained. Any heated vessel equipped with a stirrer can be used, including those equipped with components to pressure and/or vacuum.

The thermoplastic properties of the presently disclosed copolymers and compositions lend themselves to the fabrication of a variety of articles, via molding and other methods of fabrication known in the art, including, but not limited to injection molding, compression molding, extrusion, and calendaring. Accordingly, in some embodiments, the presently disclosed subject matter provides a fabricated article comprising a random multigraft copolymer. The fabricated articles can be for example an automotive interior or exterior part (e.g. an air bag or air bag door, a seat covering (such as artificial leather upholstery), bumpers, decorative molding pieces, etc.); shoe soles or other shoe parts; elastic waistbands; diaper or sanitary napkin backings or attachments; adhesive tapes, membranes, toys (or parts for toys), balloons, bags, tubing, roofing tiles, medical devices, and electronic wiring coatings or other electronic device components. For example, U.S. Patent Application Publication No. 2009/0028356, herein incorporated by reference in its entirety, describes the use of elastomeric polymers as an expandable bubble portion in an audio device. In some embodiments, the compositions can be used to provide elastic or flexible moldings for "soft-touch" applications, such as grips, handles, antislip surfaces, gaskets, switches, housings with sealing lips, control knobs, flexographic printing plates, hoses, profiles, medical items, hygiene items, such as toothbrushes, materials for insulating or sheathing cables, sound-deadening elements, folding bellows, rolls or roll coatings, and carpet backings.

In some embodiments, the article is a medical device. Medical devices can include, but are not limited to, infusion kits, dialysis units, breathing masks, catheter tubing, intravenous (iv) bags or tubing therefore, blood bags, syringes, prosthetics, implants or implant coverings (e.g. orthopedic implants, stents or other endoprostheses, or coverings for pacemakers or cochlear implants). In some embodiments, the article is a balloon catheter or a stent. For example, the article can comprise a balloon catheter wherein at least the inflatable portion of the balloon catheter comprises the presently disclosed thermoplastic elastomer composition. Catheters can include any tubing (e.g., flexible or "soft" tubing) that can be inserted into a body cavity, duct, or vessel to inject or to drain fluids. The body cavity, duct, or vessel can be for example, the urethra, the bladder, a blood vessel (e.g., a vein or artery), a biliary duct, the kidney, the heart, the uterus, a fallopian tube, the epidural space, the subarchnoid space, etc. The balloon catheter can be inserted into the body to deliver a stent. For example, the stent can be placed over the balloon portion of the catheter for insertion into the body. When placed inside the body at the desired location (e.g., in a blocked artery), the balloon can be inflated, thereby expanding the stent. The balloon can then be deflated and the catheter removed, leaving the stent in position within the body.

Stents can have one or more branch points. For example, stents can be y-shaped, including a central main tube portion that at one end is separated into two tubes. Stents can be fabricated from metal, polymers, or combinations thereof. For example, the stent can include a wire mesh, a metal coil or coils, or metal rings covered by and/or connected with the presently disclosed composition. Alternatively, the stent can comprise the presently disclosed composition alone or as a covering for another polymeric material.

The stent can be coated with a drug-eluting coating or the thermoplastic elastomeric composition can include a therapeutic additive which can elute from the composition upon placement in the body or upon exposure to particular conditions (e.g., heat, pH, enzymes, etc.). For example, the multigraft copolymer can be blended with a biodegradable polymer having an encapsulated or otherwise complexed drug.

In some embodiments, the presently disclosed compositions are provided for use as adhesive materials. The adhesive can be a pressure sensitive adhesive or a hot melt adhesive and can be used, for example, to adhere plastics to other plastics or to other materials (e.g., paper, wood, metal, glass, etc.). The adhesive composition can include a tackifier. The adhesive can further comprise one or more other additives, such as, but not limited to, waxes, plasticizers, anti-oxidants, UV-stabilizers, decorative agents, biocides, flame retardants, anti-static agents, and fillers. The adhesive can be formulated to provide either temporary or permanent adhesion.

The presently disclosed adhesive compositions can be used, for example, to act as a releasable adhesive for holding gift cards or other plastic cards onto paper or other backings for temporary display or presentation purposes. The presently disclosed adhesive compositions can also be provided in the form of adhesive tapes, comprising one or more releasable backing components that can be easily removed just prior to use of the adhesive. The compositions can further be provided as adhesive backings on other materials, e.g., labels, stamps, automotive trim, bandages or other wound care items, drug patches, diapers, etc. In some embodiments, the adhesive compositions can be provided in the form of spheres, bars or rods suitable for use as hot-melt adhesives, in the home, e.g., for various arts or crafts projects, or in industry, e.g., for the construction of cardboard boxes or for the fabrication of sporting equipment or toys.

The presently disclosed compositions are also useful as elastic or flexible coating layers over other objects, particularly for "soft-touch" applications. "Soft touch" applications include those, for instance, for which one or more of a soft texture, shock absorption, ergonomic comfort, slip resistance, and flexibility, are desirable.

Thus, in some embodiments, the presently disclosed subject matter provides a coated object comprising a coating layer comprising a random graft copolymer prepared according to the presently disclosed methods, wherein the random multigraft copolymer comprises a rubbery polymeric backbone and a plurality of glassy polymeric grafts, wherein each of the plurality of glassy polymeric grafts is attached to the rubbery polymeric backbone at one of a plurality of randomly spaced branch points, wherein the coating layer covers at least a portion of a surface of a wood, ceramic, glass, carbon fiber, metal, metallic, leather, fabric, stone, or plastic object. In some embodiments, the object is selected from the group comprising an article of clothing (e.g., a shoe or a portion of a shoe, such as a shoe sole, for orthopedic, athletic, or children's shoes or for work boots), an eating or cooking utensil (e.g., baby spoons or other infant feeding tools where a soft mouth feel might be needed, knives, tongs, vegetable peelers, etc), tools (e.g., hammers, wrenches, screwdrivers, saws, etc.), medical implants (e.g. stents, pacemakers, cochlear implants), medical/surgical tools (e.g., retractors, scalpels, clamps, etc.) and wiring and electronic devices (e.g. electronic wiring or fiber optic wiring, materials in ear buds).

In some embodiments, the presently disclosed subject matter provides a random multigraft copolymer comprising a poly(alkyl acrylate) main chain and a plurality of glassy or semi-crystalline polymeric side chains, wherein said main chain comprises a plurality of randomly spaced branch points, and wherein each of the plurality of polymeric side chains is attached to the main chain at one of the plurality of randomly spaced branch points. In some embodiments, the copolymer comprises one of a comb or a centipede architecture.

The poly(alkyl acrylate) main chain can comprise, for example, poly(methyl acrylate), poly(ethyl acrylate), poly(propyl acrylate), poly(butyl acrylate), poly(pentyl acrylate) or poly(hexyl acrylate). In some embodiments, the poly(alkyl acrylate) main chain comprises poly(n-butyl acrylate).

In some embodiments, the copolymer has a weight-average molecular mass ($M_w$) greater than about 500,000 grams per mole (g/mol) (e.g., about 550,000, about 600,000, about 700,000, about 800,000, about 900,000, about 1,000,000 g/mol, about 1,100,000, about 1,200,000, or about 1,300,000 g/mol or greater). In some embodiments, the $M_w$ is about 750,000 g/mol or greater. In some embodiments, the $M_w$ is about 1,000,000 g/mol or more.

In some embodiments, the glassy or semi-crystalline polymeric side chains comprise polystyrene. In some embodiments, the copolymer comprises between about 5 and about 50 weight % polystyrene. In some embodiments, the copolymer comprises between about 15 and about 43 weight % polystyrene (e.g., about 15, 16, 17, 18, 19, 20, 21, 22, 23, 24, 25, 26, 27, 28, 29, 30, 31, 32, 33, 34, 35, 36, 37, 38, 39, 40, 41, 42, or 43 weight % polystyrene). In some embodiments, the copolymer comprises between about 15 and about 30 weight % polystyrene. In some embodiments, the copolymer comprises between about 26 and about 32 weight % polystyrene.

In some embodiments, the copolymer has a polydispersity index (PDI) that is about 3 or less. In some embodiments, the PDI is between about 2 and about 3. In some embodiments, the copolymer has a glass transition temperature ($T_g$) of between about −13° C. and about −42° C. In some embodiments, the Tg is between about −35 and about −42° C. (e.g., about −35, −36, −37, −38, −39, −40, −41, or −42° C.).

The random multigraft copolymer can have any number of branch points. In some embodiments, the copolymer has at least about 3 branch points per molecule. In some embodiments, the copolymer has at least about 5, at least about 7, at least about 10, or at least about 12 branch points per molecule. In some embodiments, the copolymer has between about 15 and about 22 branch points per molecule (e.g., about 15, 16, 17, 18, 19, 20, 21, or 22 branch points per molecule).

In some embodiments, the presently discloses subject matter provides a thermoplastic elastomer or an adhesive comprising a random multigraft copolymer comprising a poly(alkyl acrylate) main chain and a plurality of glassy or semi-crystalline polymeric side chains, wherein said main chain comprises a plurality of randomly spaced branch points, and wherein each of the plurality of polymeric side chains is attached to the main chain at one of the plurality of randomly spaced branch points. In some embodiments, the elastomer or adhesive can also comprise one or more additional additives. In some embodiments, the copolymer is a poly(n-butyl acrylate-g-styrene) multigraft copolymer.

IV. Morphology and Mechanical Properties

Variations in the molecular architecture of graft copolymers can be manipulated to control their nano-scale structure (morphology) and their ability to form long-range order during self-assembly. To provide a desired performance, the size, shape and symmetry, and overall volume fraction of different types of domains can be controlled independently. This independent control is not possible with conventional linear AB diblock copolymers and ABA triblock copolymers for which the nanophase separated morphology which forms (e.g., spheres, cylinders, cubic bicontinuous gyroid, or lamella) is tied directly to the relative volume fractions of the two block materials. Previous characterization data on complex graft copolymer architectures with multiple grafting points has been fit into the framework of a theoretical morphology diagram calculated by Milner, S. T., *Macromolecules*, 27, 2333 (1994).

Morphological characterization of the multigraft copolymers can utilize real-space, transmission electron microscope (TEM) imaging and reciprocal-space small angle scattering (SAXS and/or SANS) techniques.

Other things being equal (e.g., "glassy" polymer volume fraction and average number of grafts per molecule), in some embodiments of the presently disclosed subject matter, increasing junction point functionality increases material strength and elasticity. Additionally, for a fixed glassy polymer volume fraction and junction point functionality, in some embodiments of the presently disclosed subject matter, increasing the number of junction points per copolymer increases the strength, strain at break, and elasticity. In a representative comparison, the copolymers of the presently disclosed subject matter can compared to the strength, elasticity and strain at break performance of commercial thermoplastic elastomers, such as KRATON™ and STYROFLEX™ materials (Kraton Polymers, Houston, Tex., United States of America and BASF, Ludwigshafen, Germany, respectively) via tensile tests that utilize a scaled down ASTM standard "dog bone."

If desired, in addition to tensile tests at room temperature, tensile performance at elevated temperatures can be evaluated, to determine material properties under conditions of any particular proposed use. Dynamical mechanical, creep, and fatigue performance of these materials at room and elevated temperatures can also be evaluated. Thermogravimetric analysis (TGA) can be used to investigate the chemical stability of the materials at elevated temperatures.

EXAMPLES

The following examples are included to further illustrate various embodiments of the presently disclosed subject matter. However, those of ordinary skill in the art should, in light of the present disclosure, appreciate that many changes can be made in the specific embodiments which are disclosed and still obtain a like or similar result without departing from the spirit and scope of the presently disclosed subject matter.

Example 1

General Materials and Methods

Synthesis: Chemical reagents and solvents were obtained from Aldrich (Milwaukee, Wis., United States of America)

or Sigma-Aldrich (St. Louis, Mo., United States of America) unless otherwise noted. Sec-butyllithium (1.4 M in cyclohexane) was used as received after double titration with allyl bromide to verify its concentration. Benzene (≥99.9%) and styrene (≥99%) were purified to the standards required for anionic polymerization. See Hadjichristidis et al., Journal of Polymer Science Part A: Polymer Chemistry, 2000, 38, 3211. Methanol (≥99.9%) was degassed on the vacuum line before distilling into ampules followed by flame sealing. Ethylene oxide (≥99.5%) was purified by allowing it to stand over sodium-potassium alloy for 30 min after drying over calcium hydride. Other reagents in the syntheses were purified as per standard all glass high vacuum anionic polymerization techniques. 4-(dimethylamio)pyridine (DMAP, ≥99%) and N, N'-dicyclohexylcarbodiimide (DCC, Acros Organics, Themo Fisher Scientific, Geel, Belgium; 99%) were both used as received. Sodium dodecylbezenesulfonate (SDBS, technical grade) was used as received. 2,2-azodiisobutyronitrile (AIBN, 90%) was recrystallized from methanol before being used. 4-Vinylbenzoic acid (97%) was used as received. 5-(4-vinylbenzyloxy) isophthalic acid was synthesized as described in Lübke et al. (Macromolecules, 2000, 33, 5098). The redox initiation system, cumene hydroperoxide ($C_9H_{12}O_2$, 80%), the reducing agent sodium formaldehyde sulfoxylate (SFS, $CH_3NaO_3S.2H_2O$, ≥98%), Iron (II) sulfate heptahydrate ($FeSO_4.7H_2O$, ≥99%) and ethylenediaminetetraacetic acid disodium salt dihydrate (EDTA-$Na_2$, $C_{10}H_{14}N_2Na_2O_8.2H_2O$, 99%) were used as received. Deionized water (DI water) and other reagents were used as received. A stock solution of 100 mL was prepared from 0.0621 g $FeSO_4.7H_2O$, 0.1365 g EDTA-$Na_2$ and deionized water. The ratio of $FeSO_4.7H_2O$ and EDTA-$Na_2$ was that suggested by Prince and Spitz. See Prince and Spitz, Industrial & Engineering Chemistry, 1960, 52, 235. Anionic polymerizations were carried out in sealed, all-glass apparati using standard high-vacuum techniques. See Hadjichristidis et al., Journal of Polymer Science Part A: Polymer Chemistry, 2000, 38, 3211; and Uhrig and Mays, Journal of Polymer Science Part A: Polymer Chemistry, 2005, 43, 6179.

Characterization: Size exclusion chromatography (SEC) was carried out at 40° C. using an EcoSEC GPC system (Tosoh Biosciences LLC, King of Prussia, Pa., United States of America) with a RI-8320 detector and two TSK gel super Multipore HZM columns. A six-point calibration was obtained using polystyrene standards (molecular weight range: $2.6 \times 10^2$-$7.06 \times 10^5$ Da) and was used to obtain molecular weight characteristics and polydispersity indices (PDI). THF was used as the mobile phase at a flow rate of 0.35 mL/min.

$^1$H- and $^{13}$C nuclear magnetic resonance (NMR) spectra were obtained on a Varian Mercury 500 instrument (Varian Inc., Palo Alto, Calif., United States of America). Samples were dissolved in deuterated chloroform ($CDCl_3$).

The Matrix-Assisted Laser Desorption/Ionization-Time of Flight (MALDI-TOF) mass spectra were recorded using a Bruker Autoflex II model smart-beam instrument (Brucker, Billerica, Mass., United States of America) equipped with a nitrogen laser (337 nm). Samples were dissolved in THF, dithranol was used as the matrix, and sodium trifluoroacetate was used as the cation source.

The latex particle size was measured at 25° C. using dynamic light scattering (DLS) on a PD Expert System (Precision Detectors Inc., Bellingham, Mass., United States of America). A laser of 683 nm wavelength was used as the light source, and light scattered by the sample was detected at 95°. Each sample was scanned 120 times, and the mean particle size was determined by averaging values from at least 10 different experiments.

Thermal stability of the multigraft copolymers was examined using thermogravimetric analysis (TGA) on a Discovery analyzer (TA Instruments, New Castle, Del., United States of America). Briefly, 15-20 mg of sample was placed on platinum pans before equilibrating at 30° C. The temperature was then ramped to 650° C. at 10° C./min. All TGA work was done under a nitrogen atmosphere.

A TA Instruments Q2000 differential scanning calorimeter (TA Instruments, New Castle, Del., United States of America) was used to investigate thermal transitions of the copolymers. Analysis was performed under a nitrogen purge at a heating rate of 10° C./min from −80° C. to 150° C. The glass transition temperature ($T_g$) was determined from the second heating in order to erase the thermal history. $T_g$ is reported as the temperature of the midpoint of the heat capacity change determined from the baseline tangents using Universal Analysis software (TA Instruments; New Castle, Del., United States of America).

Thin film morphologies were examined using a PicoSPM II atomic force microscope AFM (Molecular Imaging, Santa Clara, Calif., United States of America) instrument in tapping mode. Samples were prepared from a 1 wt % solution using toluene as solvent by spin coating onto small glass wafers. The observed surface structures were analyzed using WSxM 5.0 Develop 5.3 scanning probe microscopy software.

Solid samples were analyzed on a parallel plate RDA II rheometer (Rheometrics Inc, Piscataway, N.J., United States of America). Polymer disks of 8 mm diameter and 0.5 to 2 mm thickness were chosen for this analysis. These samples were analyzed by strain-fixed dynamic rheology with a frequency sweep from 0.1 to 100 Hz at room temperature.

Example 2

Synthesis of Polystyrene Macromonomers

The synthesis of living polystyrene and hydroxyl-terminated polystyrene was performed as previously reported and as shown in FIG. 2A. See Paraskeva and Hadjichristidis, Journal of Polymer Science Part A: Polymer Chemistry, 2000, 38, 931; and Ji et al., Polymer, 2002, 43, 7119. The number average molecular weight (Mn) of living polystyrene was designed to be about 6000 g/mol. Chain end hydroxylation was performed by reacting the living anions with ethylene oxide followed by acidification. Briefly, sec-butyllithium (20 mL, 1.2 mmol, 0.06 M) was added to the A part of an all-glass reactor which consisted of two connected reaction flasks. Reactor A was equipped with a styrene ampule (6.6 g, 63.462 mmol), and the other reactor (reactor B) was equipped with an ampule containing ethylene oxide/benzene and an ampule with methanol/HCl. Benzene (60 mL) was distilled into the reactor on the vacuum line. The reactor was then separated from the vacuum line by flame-sealing, and the styrene ampule break-seal was broken. After 24 hours at room temperature, the break-seal of ethylene oxide/benzene was broken in reactor B. Poly(styryl)lithium in reactor A was slowly transferred into the ethylene oxide/benzene solution in reactor B. At last, the break-seal of methanol/HCl was broken and the solution was poured into the reactor B. Solvent was then removed by distillation under reduced pressure, toluene was added, and the resulting solution was precipitated into cold methanol (10 times solution volume) three times. The sample was dried in a vacuum oven overnight to afford a white powder.

Single-tailed macromonomer was synthesized as shown in FIG. 2B by high-vacuum anionic polymerization according to a previously reported procedure. See Liu et al., Macromolecules, 2012, 45, 9233. Double-tailed macromonomer was synthesized from the hydroxyl-terminated polystyrene using a Steglich esterification reaction in the presence of DCC and DMAP. See FIG. 2C. An alternative version of the single-tailed macromonomer was also synthesized using a Steglich esterification of the hydroxyl-terminated polystyrene and 4-vinylbenzoic acid. See FIG. 2D.

Briefly, to prepare the double tailed macromonomer, 2.98 g of hydroxyl-terminated polystyrene was dispersed in 40 mL THF. 5-(4-vinylbenzyloxy)isophthalic acid (0.28 g, 1.89 mmol) and DMAP (0.15 g, 1.23 mmol) were added to the polystyrene solution. DCC (0.23 g, 1.12 mmol) was added to the reaction mixture at 0° C. and then stirred for 2 hours at 0° C. The mixture was stirred for one hour with excess distilled water. The precipitate was filtered and washed with excess distilled water and diethyl ether until the pH value reached 7.0. The final products were isolated and dried under vacuum for 24 hours.

Further details regarding the characterization of the macromolecules are described below in Examples 3 and 4.

Example 3

Synthesis of Poly(Isoprene-g-Styrene) Multigraft Copolymers

Figure 3:
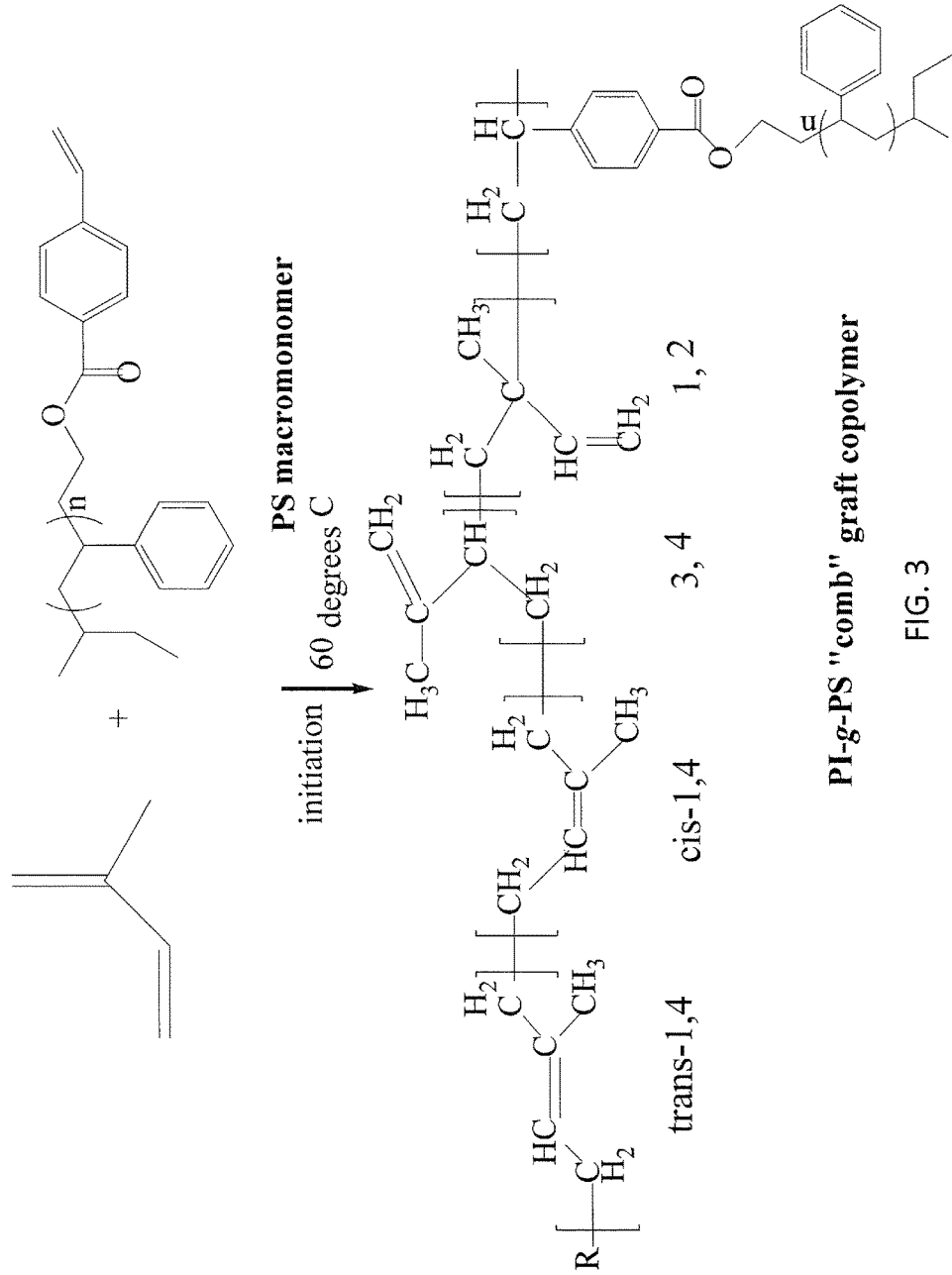
FIG. 3 is a schematic drawing showing a synthesis of a poly(isoprene-graft-styrene) (PI-g-PS) comb multigraft copolymer from a polystryrene (PS) macromonomer and isoprene using free radical emulsion copolymerization according to an embodiment of the presently disclosed subject matter.

Synthesis of a graft copolymer using isoprene as the monomer for the main chain was performed as shown in FIG. 3. Briefly, the alternative PS macromonomer shown in FIG. 2D, isoprene, and toluene, in amounts as indicated in Table 1, below, were mixed together to form a homogeneous solution under sonication while cooling with an ice bath, and then the initiator AIBN (or cumene hydroperoxide for the redox initiation system) were added into the solution. The mixture was poured into a vial containing the SDBS aqueous solution, and the vial was placed into the sonicator while cooling with the ice bath for pre-emulsification. After five minutes, the emulsion was transferred to a glass flask equipped with a magnetic stirrer, reflux condenser, and nitrogen inlet. After five minutes of nitrogen purging, the flask was sealed and put into a thermostatted oil bath at 60° C. to initiate the polymerization. For the redox initiation system, EDTA-$Na_2$ and $FeSO_4.7H_2O$ stock solution with SFS were added into flask under nitrogen after the emulsion was transferred. The polymerization was stopped by cooling after eight hours and the copolymer was obtained by breaking the emulsion using sodium chloride. The copolymer was purified by dissolution into THF three times and precipitation into methanol. It was then dried under vacuum at 30° C. for 24 hours. The graft copolymers were further purified by fractionation to remove some unreacted macromonomer. Conversion (Cony) of isoprene was measured by gravimetric method and latex particle diameter was measured by DLS.

TABLE 1

Reagents for poly(isoprene-graft-styrene) multigraft copolymers.

| | Sample | |
|---|---|---|
| Reagent | PI-g-PS10 | PI-g-PS29 |
| SDBS (g) | 0.081 | 0.080 |
| DI water (g) | 6.08 | 6.05 |
| Isoprene (g) | 1.003 | 1.06 |
| PS macromonomer (g) | 0.201 | 0.206 |
| toluene (g) | 0.6046 | 0.6018 |
| AIBN | — | 0.0252 |
| EDTA-$Na_2$ and $FeSO_4•7H_2O$ Stock solution (mL) | 1 | — |
| Cumene hydroperoxide (g) | 0.0139 | — |
| SFS (g) | 0.0068 | — |
| Conv (isoprene) (%) | 56 | 29 |
| Latex particle diameter (nm) | 54 | 77 |

Figure 6:
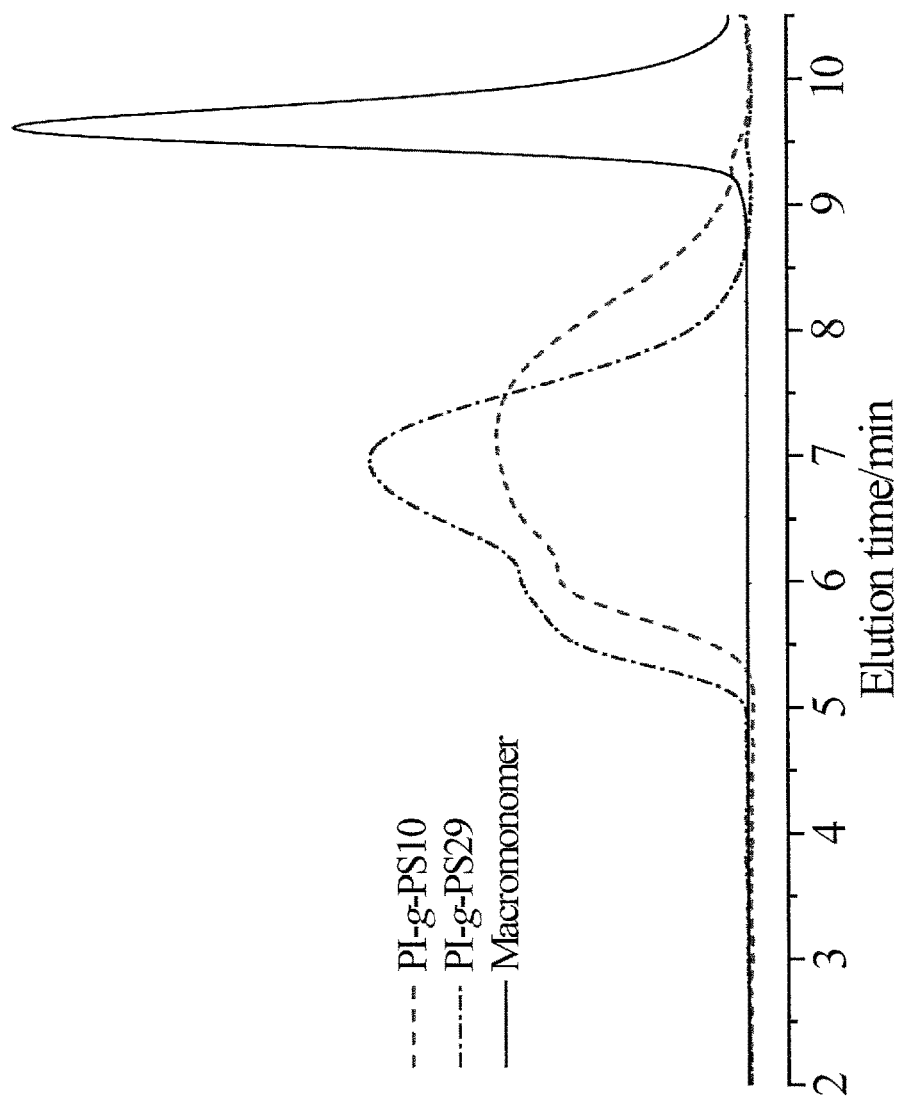
FIG. 6 is a graph showing the size exclusion chromatography (SEC) traces for the polystyrene (PS) macromonomer described for FIG. 2D (solid line), a poly(isoprene-graft-styrene) (PI-g-PS) multigraft copolymer comprising about 10 weight percentage PS (PI-g-PS10, dashed line), and a PI-g-PS copolymer comprising about 29 weight percentage PS (PI-g-PS29, dashed and dotted line).

Discussion: The PS macromonomer prepared as shown in FIG. 2D was used to prepare the PI-g-PS copolymers. The macromonomer has a sec-butyl group at the α-end and a polymerizable styryl group at the ω-end. The structure and purity of the macromonomer were characterized by a combination of SEC, $^1$H NMR and MALDI-TOF-MS. FIG. 6 shows the SEC curve of the PS macromonomer, which exhibits a symmetric and monomodal distribution. The analysis of the chromatogram yielded $M_n$ of 5100 g/mol with PDI=1.08. The $^1$H NMR spectrum of the PS macromonomer (see FIG. 4A) showed the characteristic peaks for vinyl protons from the styryl group (Ha and Ha', 2H, δ5.2 and 5.7 ppm) and methyl protons from the sec-butyl initiator fragment (Hc, 6H, δ0.5-0.8 ppm). Moreover, the characteristic peaks of phenyl protons (Hb, 5H, δ6.2-7.2 ppm) were also observed. FIG. 4B shows the MALDI-TOF spectrum of the PS macromonomer used in preparing the PI-g-PS copolymers, and confirms the uniformity and well-defined nature of the material. Mn and PDI values of 4900 g/mol and 1.02, respectively, were calculated from the MALDI-TOF MS spectrum.

Figure 5A:
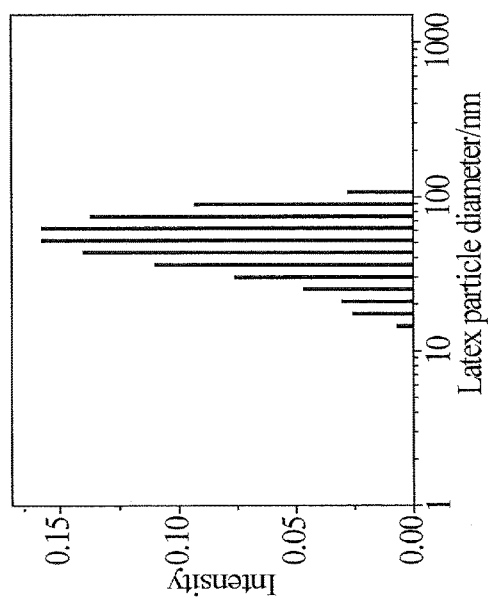
FIG. 5A is a graph showing the latex particle size distribution of a poly(isoprene-graft-styrene) (PI-g-PS) multigraft copolymer prepared as shown in FIG. 3 and comprising about 10 weight percentage (%) polystyrene as measured by dynamic light scattering (DLS).
Figure 5B:
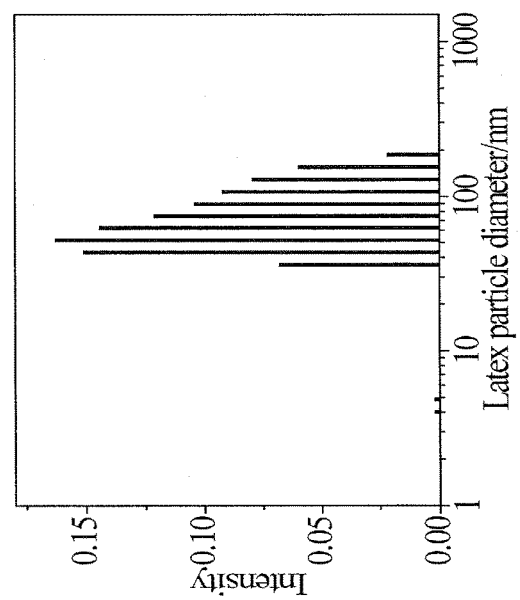
FIG. 5B is a graph showing the latex particle size distribution of a poly(isoprene-graft-styrene) (PI-g-PS) multigraft copolymer prepared as shown in FIG. 3 and comprising about 29 weight percentage (%) polystyrene as measured by dynamic light scattering (DLS).

The size and size distribution of graft PI-g-PS copolymer latex particles initiated by AIBN and redox initiation were characterized by DLS. See FIGS. 5A and 5B and Table 2. As shown in FIGS. 5A and 5B, the latex particles had average diameters of 50 to 80 nm, with narrow size distributions, indicating that the emulsion latex incorporating the macromonomer was stable enough for the emulsion polymerization to proceed successfully.

TABLE 2

Average molecular weights and compositions of PS macromonomer and PI-g-PS copolymers.

| Sample | Mn (g/mol) | Mw (g/mol) | PDI | PS wt % |
|---|---|---|---|---|
| PS macromonomer | 5100 | 5510 | 1.08 | 100 |
| PI-g-PS10 | 66100 | 520000 | 7.9 | 9.8 |
| PI-g-PS29 | 182000 | 1160000 | 6.3 | 28.9 |

The molecular weights and molecular weight distributions of the PI-g-PS graft copolymers were investigated by SEC. Chromatograms are shown in FIG. 6. As shown in FIG. 6, the SEC curves of graft copolymers after fractionation are unimodal and the peaks are shifted to much higher molecular weights as compared to that of the macromonomer. Thus, it appears that unpolymerized macromonomer can be removed from the product by fractionation, and that copolymerization can occur in the emulsion system. The apparent number-average and weight-average molecular weights and PDIs based on the polystyrene calibration curve are presented in Table 2. The molecular weight of PI-g-PS29 synthesized by AIBN initiation was much higher than that of PI-g-PS10 initiated by redox reaction. In addition, the PDI of PI-g-PS29 was lower than that of PI-g-PS10, although it is not clear that PDI is an important parameter in determining the elastomeric properties of these materials.

Figure 7A:
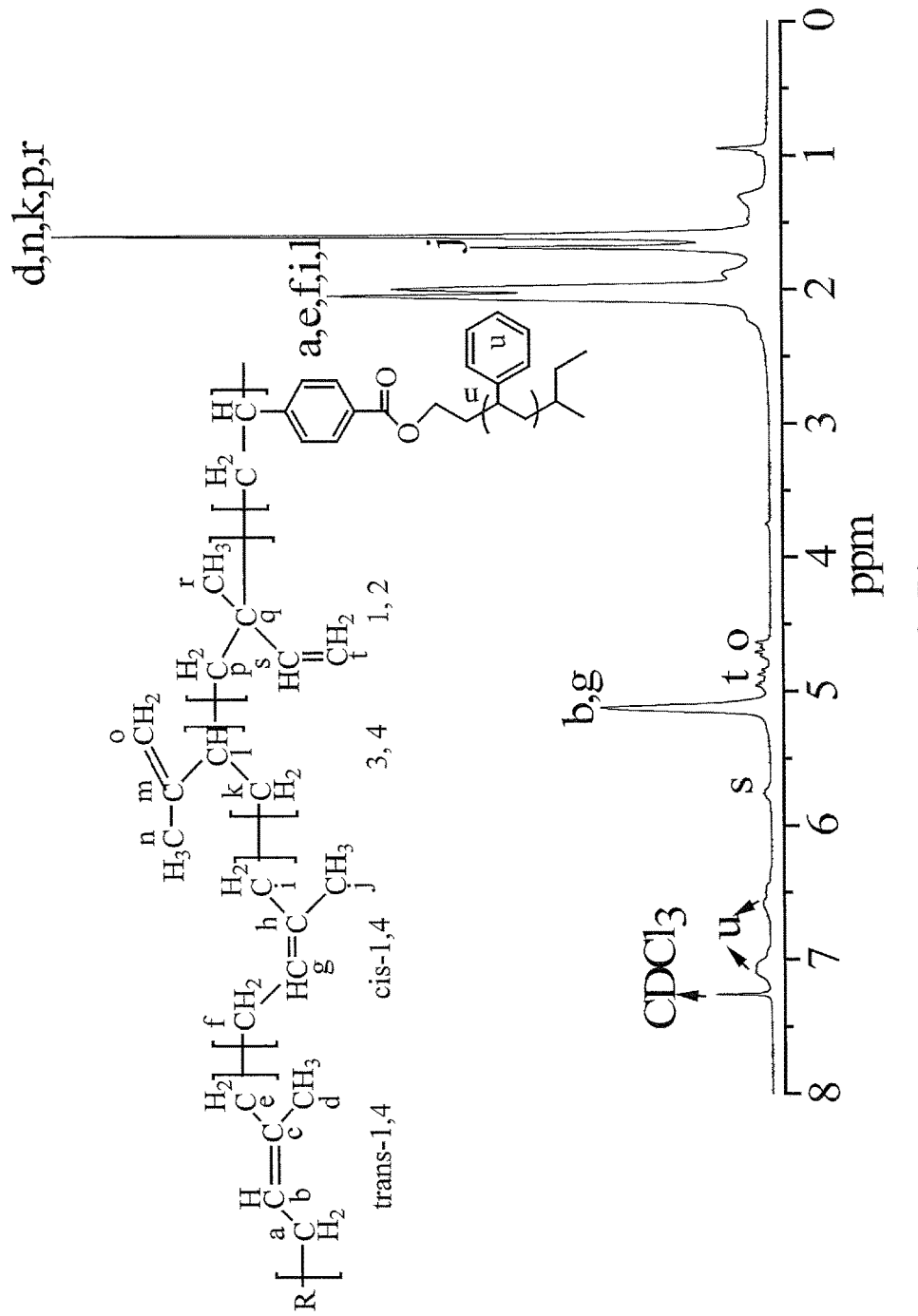
FIG. 7A is a proton nuclear magnetic resonance ($^1$H-NMR) spectrum of a poly(isoprene-graft-styrene) (PI-g-PS) multigraft copolymer having about 10 weight percentage polystyrene. The chemical structure of the copolymer is shown in the upper left hand corner. The copolymer is dissolved in deuterated chloroform ($CDCl_3$). Proton assignments are indicated by the lower case letters.
Figure 7B:
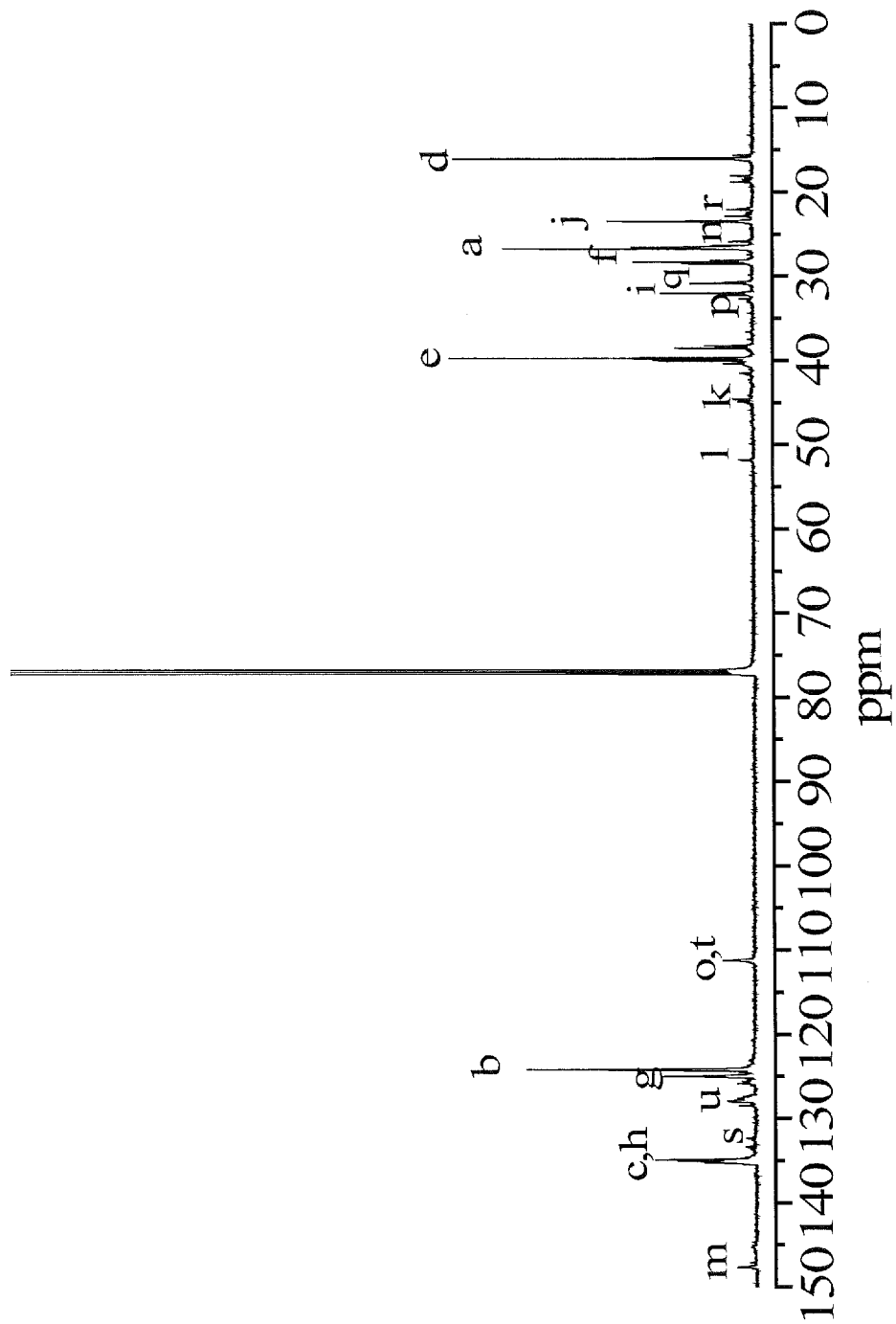
FIG. 7B is a carbon thirteen nuclear magnetic resonance ($^{13}$C-NMR) spectrum of a poly(isoprene-graft-styrene) (PI-g-PS) multigraft copolymer having about 10 weight percentage polystyrene. The copolymer is dissolved in deuterated chloroform ($CDCl_3$). Carbon assignments are indicated by letters over the peaks referencing carbon atoms in the chemical structure shown in FIG. 7A.

$^1$H-NMR (FIG. 7A) and $^{13}$C-NMR (FIG. 7B) spectra also indicated copolymerization of isoprene and macromonomer. In the $^1$H-NMR spectra, sharp chemical shifts of methyl protons from trans-1,4 (dH), cis-1, 4 (jH), 3,4-addition (nH) and 1,2-addition (rH) polyisoprene are observed at 1.58 ppm and 1.68 ppm. Peaks at 5.71-5.8 ppm (sH) from 1,2-addition are also seen. Methylene protons of trans-1,4 (aH, eH), cis-1,4 (fH, iH) and methine protons of 3,4-addition (lH) are observed at 1.91-2.19 ppm. Moreover, the peaks of phenyl protons (uH) at 6.2-7.2 ppm are seen, which indicates, combined with the SEC data, that copolymerization of macromonomer with isoprene occurred and the graft copolymer was obtained. The compositions of graft copolymers indicated in the PS weight % column of Table 2 were calculated from $^1$H-NMR according to the integral area of polystyrene and polyisoprene protons. The $^{13}$C-NMR spectrum also demonstrated that PI with high 1,4-microstructure was obtained because of strong and sharp peaks at 27.0 ppm, 124.4 ppm, 16.1 ppm and 39.7 ppm.

Figure 8:
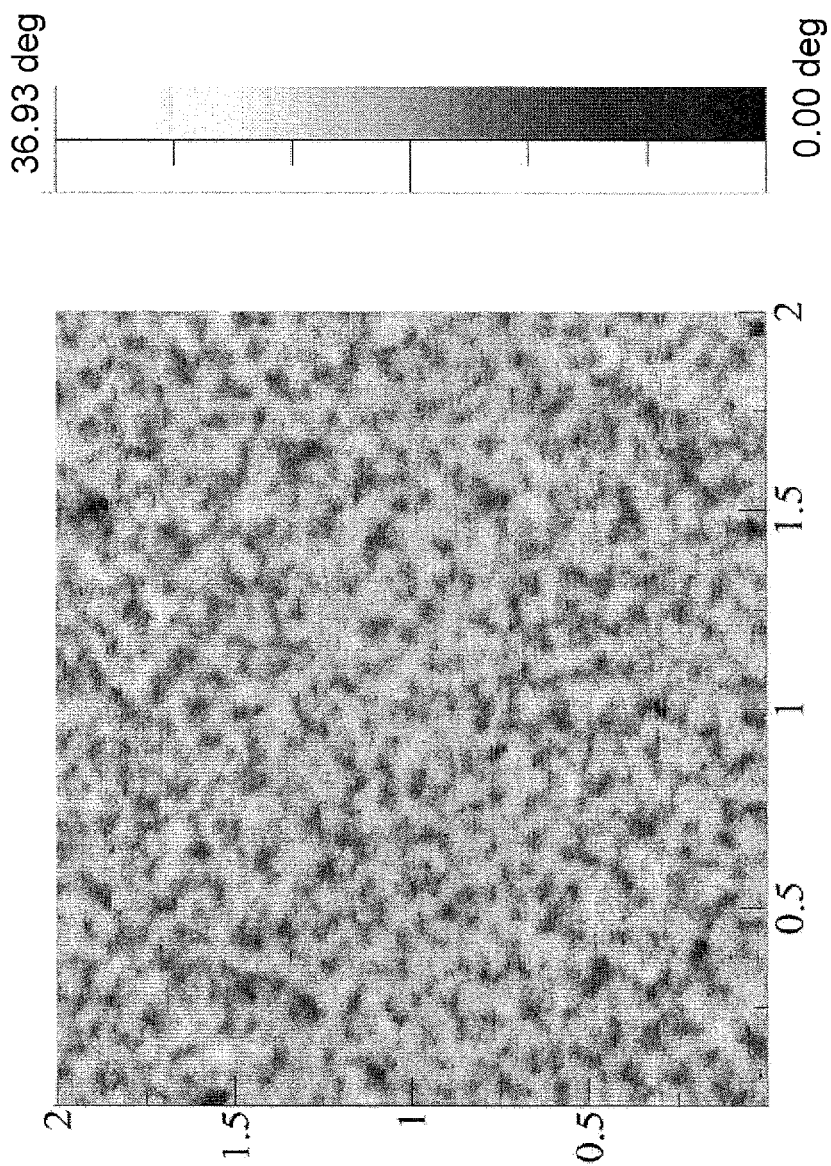
FIG. 8 is an atomic force microscopy (AFM) phase image of a thin film of poly(isoprene-graft-styrene) multigraft copolymer having about 29 weight percentage (%) polystyrene. The phase image is of an area of 2 microns by 2 microns. The scale bar to the right of the phase image indicates the different hardness of the material according to the darkness of the image.

The microphase separation of graft copolymer PI-g-PS29 was observed by AFM. See FIG. 8. From the phase image, regions having different hardness are seen, indicating that microphase separation of the graft copolymer occurs. The morphology is disordered, which can be related with a relatively broad molecular weight distribution. See Wei et al., Industrial & Engineering Chemistry Research, 2012, 51, 15530. However, in prior work with well-defined multigraft copolymers having very narrow PDIs, poor or no long range order was also observed, even for samples subjected to extensive thermal annealing, particularly as the number of branch points was increased. See Mays et al., Macromolecular Symposia, 2004, 215, 111; Uhrig et al., European Polymer Journal, 2011, 47, 560; Zhu et al., Macromolecules, 2006, 39, 4428; Staudinger et al., Macromolecular Symposia, 2006, 233, 42; and Weidisch et al., Macromolecules, 2001, 34, 6333. Thus, without being bound to any one theory, the result can also reflect the strong barriers to repetitive motions necessary for reorientation of the chains because of the high molecular weight, branched nature of these materials.

Figure 9:
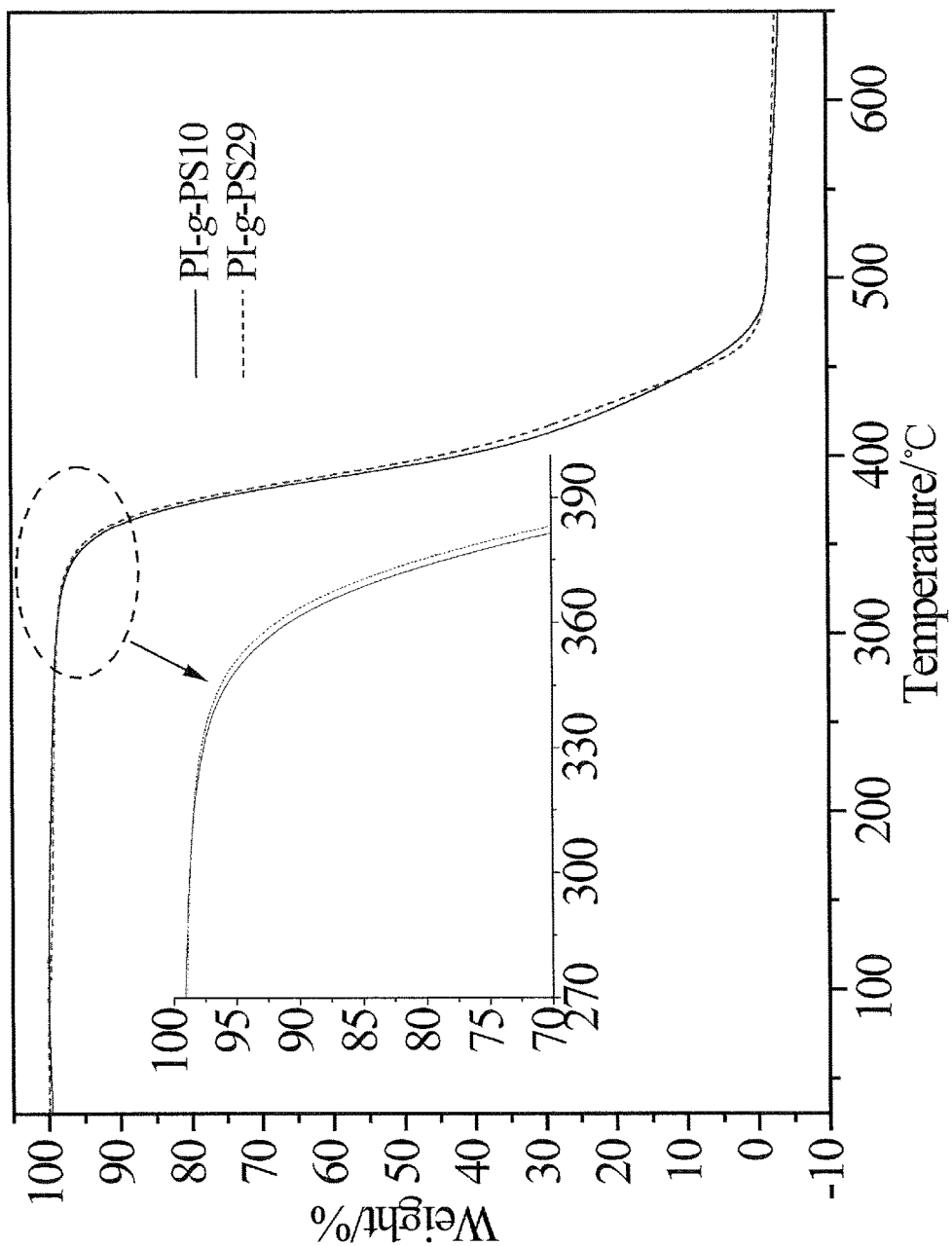
FIG. 9 is a graph showing the thermogravimetric analysis (TGA) thermograms for poly(isoprene-graft-styrene) (PI-g-PS) multigraft copolymers having about 10 weight percentage (%) or about 29 weight % polystyrene (PS). The thermogram for the copolymer with about 10 weight % PS, i.e., PI-g-PS10, is shown by the solid line, while the thermogram for the copolymer with about 29 weight % PS, i.e., PI-g-PS29, is shown by the dotted line. The inset in the upper left hand corner shows the sections of the thermograms between 270 degrees Celsius and 390 degrees Celsius.
Figure 10:
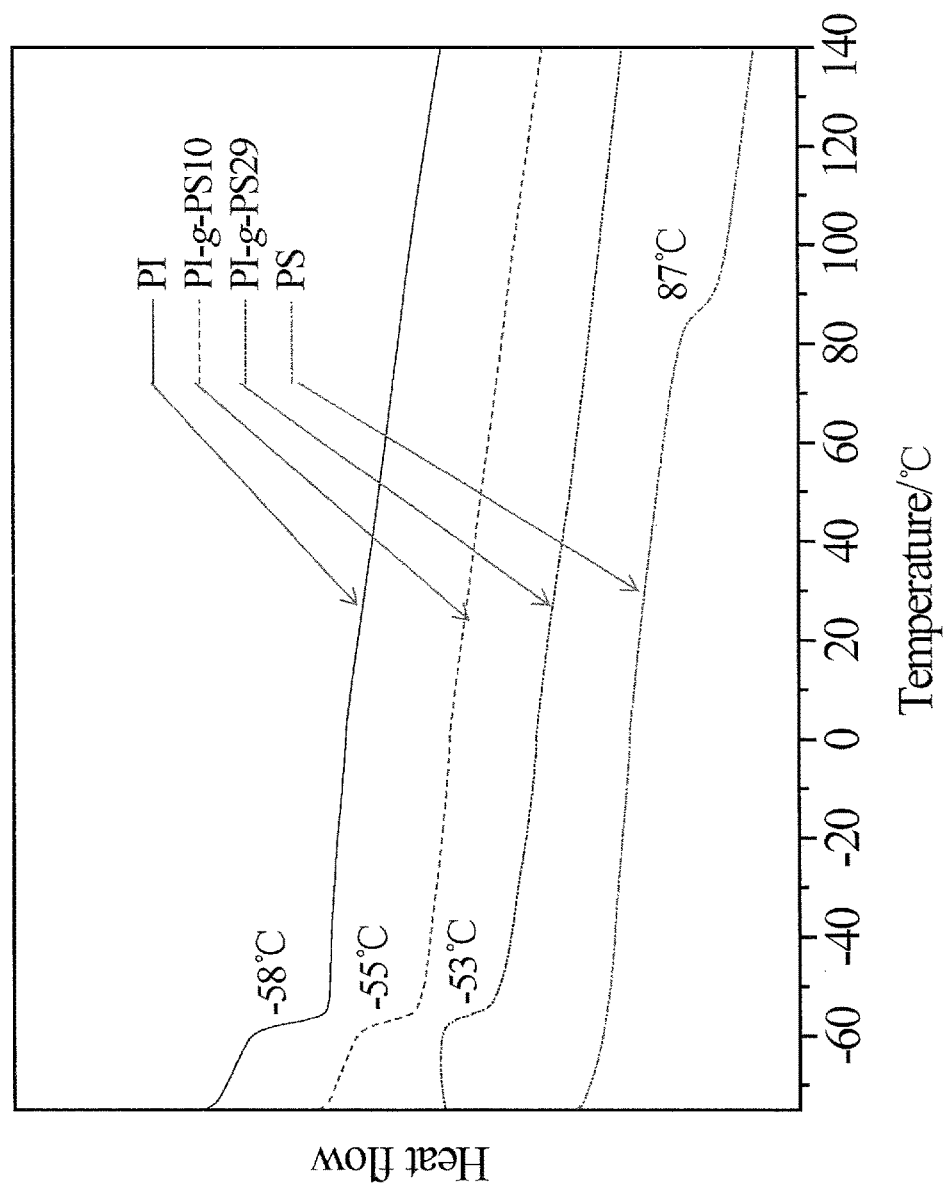
FIG. 10 is a graph showing the differential scanning calorimetry (DSC) thermograms for a polyisoprene (PI) homopolymer (solid line), a poly(isoprene-graft-styrene) (PI-g-PS) multigraft copolymer having about 10 weight percentage (%) polystyrene (PI-g-PS10, dotted line), a PI-g-PS multigraft copolymer having about 29 weight % polystyrene (PI-g-PS29, upper dotted and dashed line), and polystyrene (PS) macromonomer (lower dotted and dashed line).

The thermal properties of the graft copolymers were evaluated using TGA and DSC. FIG. 9 shows the TGA thermograms. The decomposition temperatures of 5% weight loss ($T_{5d}$) were 348° C. and 350° C. for PI-g-PS10 and PI-g-PS29, respectively. DSC was utilized to measure the $T_g$s of the graft copolymers. See FIG. 10. For comparison, the $T_g$s of PI homopolymer synthesized by emulsion polymerization and PS macromonomer were also measured. The $T_g$s of PI and PS are –58° C. and 8° C., respectively. The low $T_g$ value for PI reflects its high 1,4-microstructure and is identical to the value of –58° C. measured using DSC for anionically synthesized polyisoprene. See Fick and Fetters, Macromolecules, 1994, 27, 974. The $T_g$ value of the PS macromonomer is lower than the value for high molecular weight PS of about 100° C., reflecting its lower molecular weight. The DSC curves for PI-g-PS10 and PI-g-PS29 exhibited only a single $T_g$ close to the $T_g$ of PI homopolymer. No clear $T_g$ for PS is observed. Without being bound to any one theory, it is believed this is because the transition for PS is not sharp, occurring over a wide temperature range. See Mijovic et al., Macromolecules, 1994, 27, 974.

Figure 11:
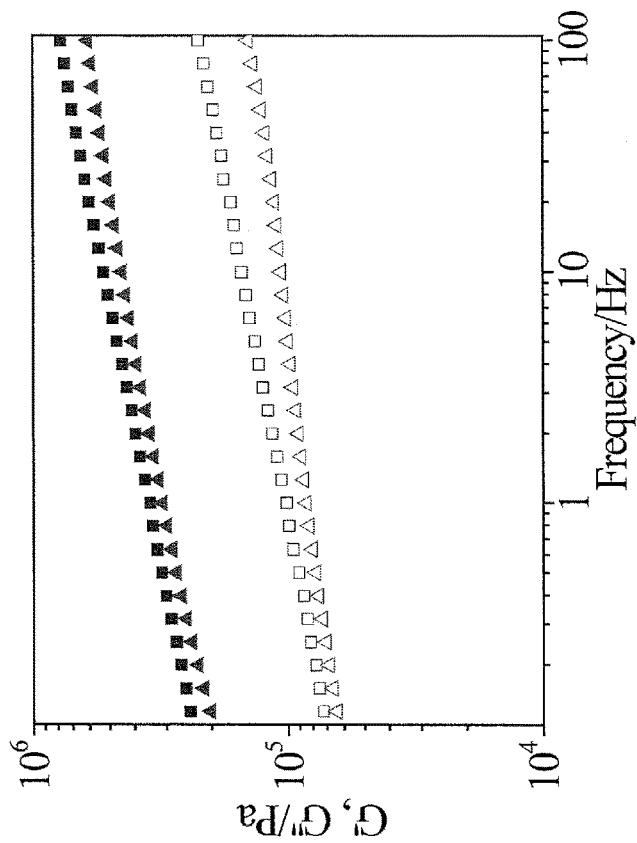
FIG. 11 is a graph showing the storage modulus (G', filled symbols) and loss modulus (G", open symbols) in pascals (Pa) for poly(isoprene-graft-styrene) (PI-g-PS) multigraft copolymer having about 10 weight percentage (%) polystyrene (PI-g-PS10, filled and open squares) and for PI-g-PS multigraft copolymer having about 29 weight % polystyrene (PI-g-PS29, filled and open triangles) as a function of frequency (in Hertz, Hz).

Based on physical handling, both copolymer samples were highly elastic. Preliminary rheological measurements were carried out on these materials. FIG. 11 shows the frequency dependence of rheological properties (storage modulus G' and loss modulus G") of PI-g-PS10 and PI-g-PS29. From FIG. 11, it can be seen that G' is an order of magnitude larger than G" over the frequency range probed for each sample. Therefore, the graft copolymers appear to exhibit elastic properties at room temperature. See Singh et al., Macromolecules, 2007, 40, 4578. Furthermore, G' increases with increasing frequency. Without being bound to any one theory, this can be attributed to time being adequate for entangled chains to relax, which reduces the modulus, at low frequency. However, the entangled polymer chains have less time for reorientation at higher frequency, resulting in higher G' values. Moreover, the storage modulus (G') of PI-g-PS29 is lower than that of PI-g-PS10, which means that the PI-g-PS29 exhibits better elastic properties and larger elongation at break if loaded with the same stress. The molecular weight of PI-g-PS29 is higher than that of PI-g-PS10, and the weight fraction of polystyrene in PI-g-PS29 is also higher than that of PI-g-PS10. Higher molecular weight results in more chain entanglements, which can be beneficial to the mechanical properties of elastomeric materials. Further, the content of PS controls the morphology and thus the nature of the physical cross-linking domains in microphase separated multigraft copolymers. See Duan et al., Macromolecules, 2008, 41, 4565.

Figure 12:
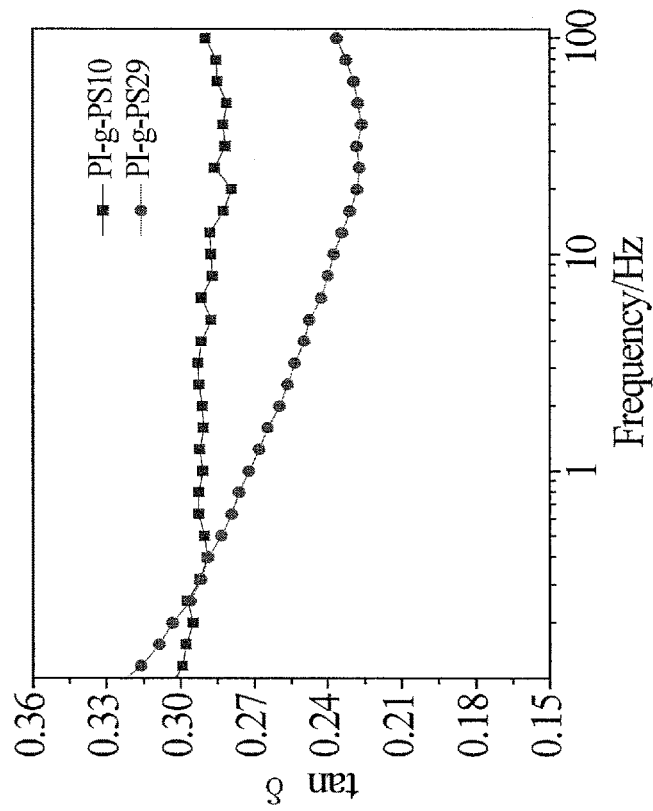
FIG. 12 is a graph of tan δ versus frequency (in Hertz, Hz) for poly(isoprene-graft-styrene (PI-g-PS) multigraft copolymer having about 10 weight percentage (%) polystyrene (PI-g-PS10, filled squares) and for PI-g-PS multigraft copolymer having about 29 weight % polystyrene (PI-g-PS29, filled circles) as a function of frequency (in Hertz, Hz).

FIG. 12 illustrates the results of tan δ versus frequency, and PI-g-PS29 exhibits lower tan δ values at most frequencies, a sign of superior elasticity. See Poongavalappil et al., Journal of Applied Polymer Science, 2013, 128, 3026.

In summary, poly(isoprene-g-styrene) multigraft copolymers having high molecular weights and different weight fractions of PS were synthesized by copolymerizing a PS macromonomer with isoprene via emulsion copolymerization initiated by either AIBN or by redox initiation. The polystyrene macromonomer was synthesized via high vacuum anionic polymerization, and the SEC and MALDI-TOF results show that the macromonomer was well-defined. DLS indicates that stable emulsions can be obtained either by AIBN initiation or by redox initiation. AIBN initiation appears to be better for synthesizing graft copolymers with higher molecular weight and lower PDI according to the SEC results. Microphase separation was observed by AFM, but DSC only detected the $T_g$ of the PI backbone, in agreement with prior results on poly(isoprene-g-styrene) multigraft copolymers. From the rheological properties of graft copolymers, it appears that the graft copolymer with PS weight content of 29 wt % and high molecular weight at Mn=182000 g/mol has attributes of a thermoplastic elastomer. Accordingly, emulsion copolymerization of glassy macromonomers with co-monomers that yield rubbery backbones can be a low cost and green alternative to solution-based anionic polymerization for the synthesis of thermoplastic elastomer materials.

Example 4

Figure 13A:
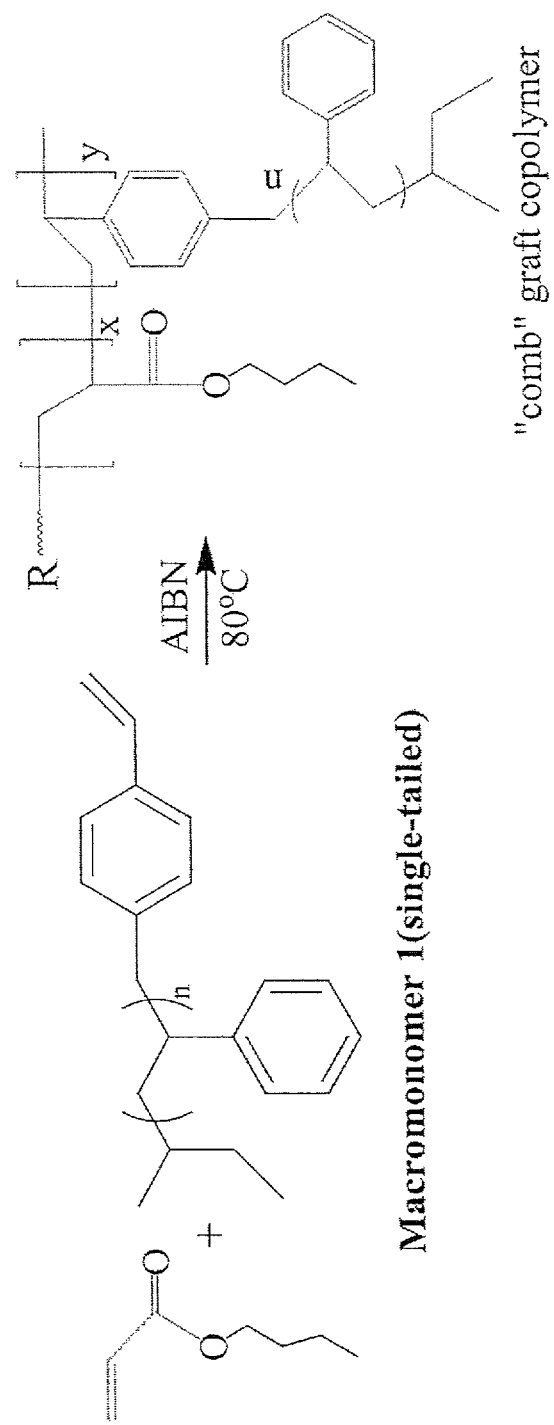
FIG. 13A is a schematic drawing showing a synthesis for a poly(n-butyl acrylate-graft-styrene) (PnBA-g-PS) comb multigraft copolymer from a single-tailed polystyrene (PS) macromonomer (Macromonomer 1) and n-butyl acrylate (nBA) using free radical emulsion copolymerization according to an embodiment of the presently disclosed subject matter.
Figure 13B:
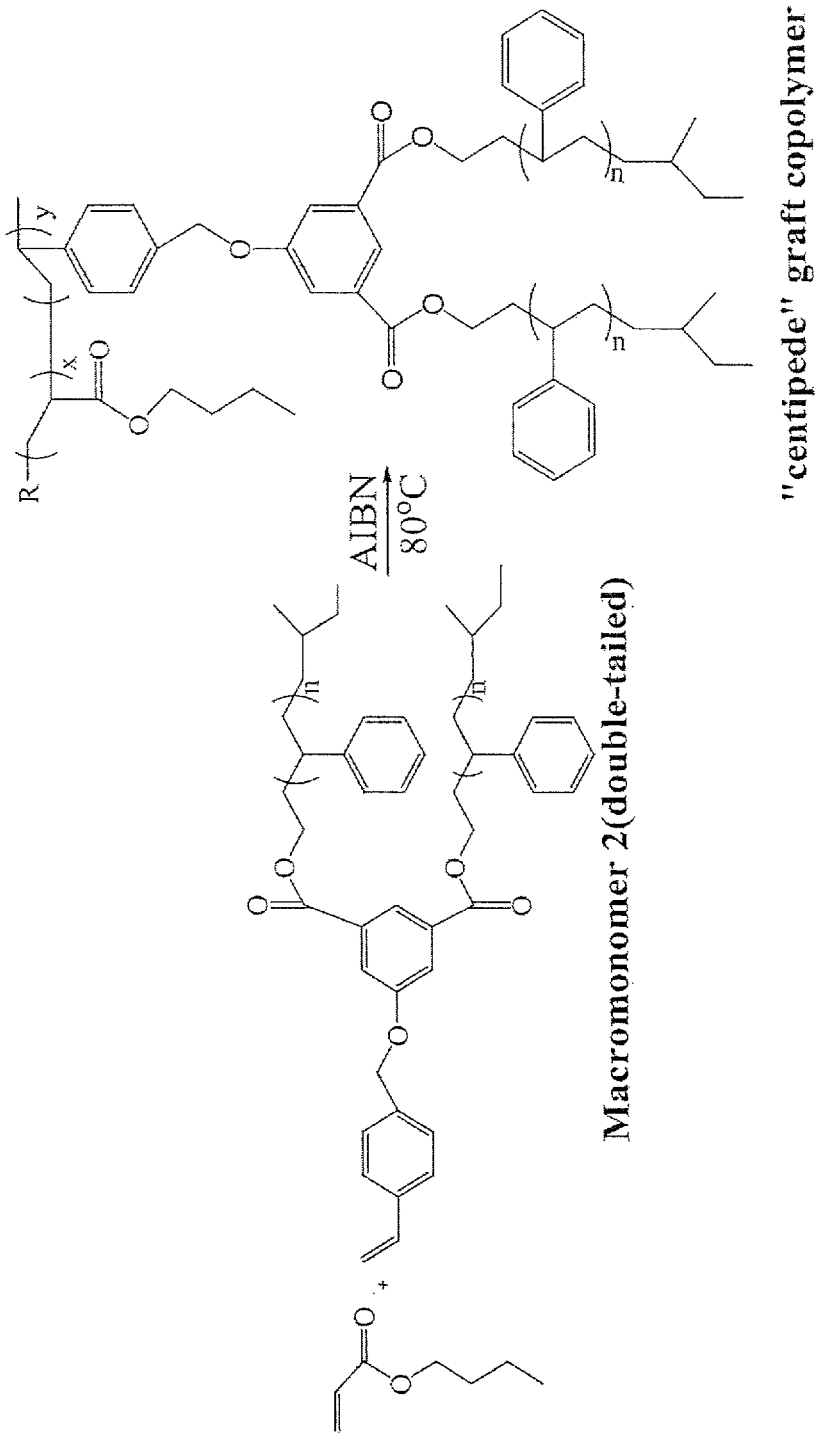
FIG. 13B is a schematic drawing showing a synthesis for a poly(n-butyl acrylate-graft-styrene) (PnBA-g-PS) centipede multigraft copolymer from a double-tailed polystyrene (PS) macromonomer (Macromonomer 2) and n-butyl acrylate (nBA) using free radical emulsion copolymerization according to an embodiment of the presently disclosed subject matter.

Synthesis of Poly(n-Butyl Acrylate-Graft-Styrene) Comb and Centipede Multigraft Copolymers Graft copolymers of poly(n-butyl acrylate) and polystyrene were synthesized by miniemulsion polymerization using polystyrene macromonomers. Briefly polystyrene macromonomer, nBA, HD, and AIBN were mixed together under sonication in an ice bath until a homogeneous mixture was obtained. The mixture was added into an SDBS aqueous solution, and a homogeneous emulsion was obtained under sonication in an ice bath for 5 minutes. The emulsion was then transferred to a 50 mL three-neck round-bottom flask equipped with a magnetic stirrer, $N_2$ inlet, and a reflux condenser. Polymerization was carried out at 80° C. under a $N_2$ atmosphere with stirring. After eight hours, a sample was withdrawn for analysis of the conversion of nBA and for particle size analysis. The copolymer was obtained via demulsification using sodium chloride and purified by dissolution in THF (three times) and precipitation with methanol. The copolymer was dried under vacuum at 30° C. for 24 hours. The graft copolymers were further purified by fractionation to remove unreacted macromonomer. Synthetic routes to comb and centipede multigraft copolymers are shown in FIGS. 13A and 13B. More particular amounts of starting materials and reagents for different batches of the copolymers are shown in Table 3. In Table 3, poly(nBA)-g-PS copolymers are given sample numbers of the format MG-X-x, wherein "MG" stands for "multigraft", the first number X is 3 for comb and 4 for centipede architecture, and the second number x, is the batch number. "Cony" refers to conversion of nBA as determined by gravimetric analysis. Latex particle size was determined by DLS.

TABLE 3

Reagents for Graft Copolymers of PS and nBA.

| Sample | SDBS (mg) | HD (mg) | DI water (g) | nBA (g) | macro-PS (g) | AIBN (mg) | Conv (nBA) (%) | Latex particle size (nm) |
|---|---|---|---|---|---|---|---|---|
| MG-3-1 | 32.1 | 35.3 | 10.05 | 1.6100 | 0.2403 | 26.4 | 52 | 116 |
| MG-3-2 | 31.7 | 34.8 | 10.21 | 1.6156 | 0.2201 | 27.8 | 64 | 109 |
| MG-3-3 | 34.3 | 33.3 | 10.08 | 1.6058 | 0.253 | 27.1 | 22 | 108 |
| MG-3-4 | 34.0 | 34.0 | 10.05 | 1.6252 | 0.1558 | 25.5 | 68 | 106 |
| MG-4-1 | 33.7 | 35.9 | 10.09 | 1.6103 | 0.4032 | 25.9 | 50 | 88 |
| MG-4-2 | 33.1 | 35.6 | 10.17 | 1.222 | 0.4084 | 25.3 | 39 | 117 |

Figure 14:
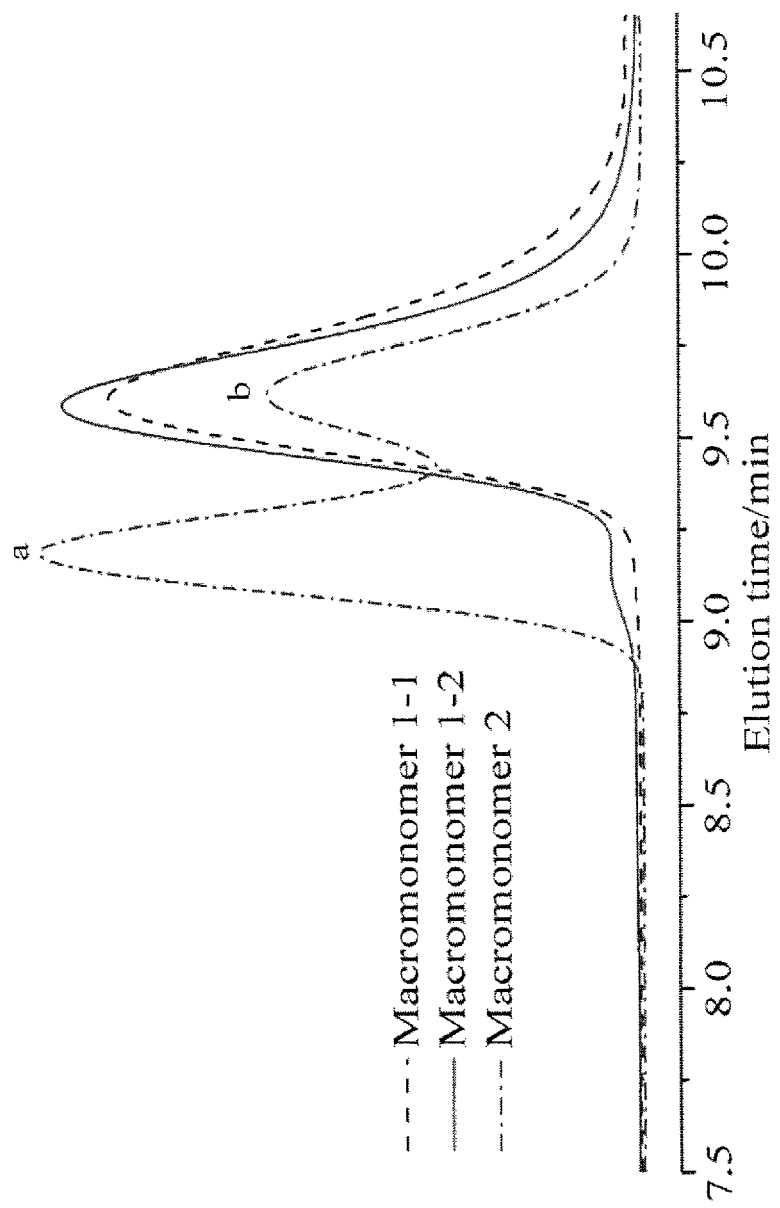
FIG. 14 is a graph showing the size exclusion chromatography (SEC) chromatograms for two single-tailed polystyrene (PS) macromonomers, Macromonomer 1-1 (dashed lined) and Macromonomer 1-2 (solid line) and for a double-tailed PS macromonomer, Macromonomer 2 (dotted and dashed line). The SEC chromatogram for Macromonomer 2 is bimodal; the ratio of integration area of peaks "a" and "b" is 42 percentage and 58 percentage.

Discussion: SEC curves of the PS macromonomers used to prepare the p(nBA)-g-PS copolymers are shown in FIG. 14, while the molecular weights and PDIs are shown below in Table 4. The SEC curves of two single-tailed macromonomers 1-1 and 1-2, both prepared as shown in FIG. 2B, are unimodal. These macromonomers also have narrow molecular weight distribution. However, the SEC curve of double-tailed macromonomer 2 is bimodal, and the ratios of integration area of the two peaks are 42% and 58%. Thus, it is believed that the yield of the macromonomer with double tails was 58%. It also appears that residual hydroxyl-terminated polystyrene or single-tailed macromonomer (or both) are present in macromonomer 2.

Figure 15A:
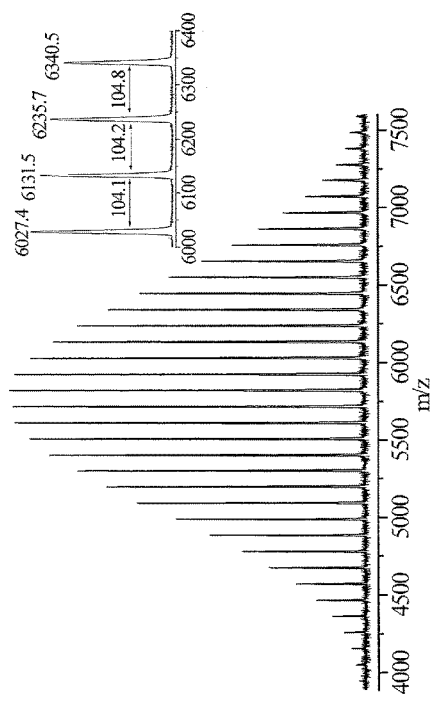
FIG. 15A is a matrix-assisted laser desorption/ionization-time of flight (MALDI-TOF) mass spectrum of the polystyrene (PS) macromonomer Macromonomer 1-1 described for FIG. 14.

The macromonomers were characterized using MALDI-TOF MS. FIG. 15A shows the MALDI-TOF mass spectrum of macromonomer 1-1. The calculated Mn and PDI of macromonomer 1-1 from the MALDI-TOF mass spectrum are 5465 g/mol and 1.02, respectively. A representative monoisotopic mass peak at m/z 6131.5 corresponds to the 57-mer.

Figure 15B:
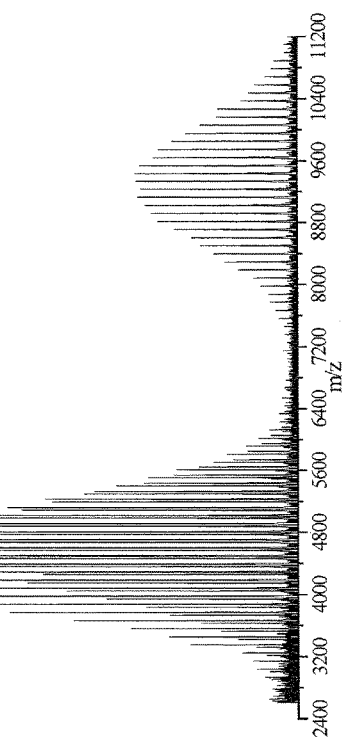
FIG. 15B is a matrix-assisted laser desorption/ionization-time of flight (MALDI-TOF) mass spectrum of the polystyrene (PS) macromonomer Macromonomer 2 described for FIG. 14.
Figure 16A:
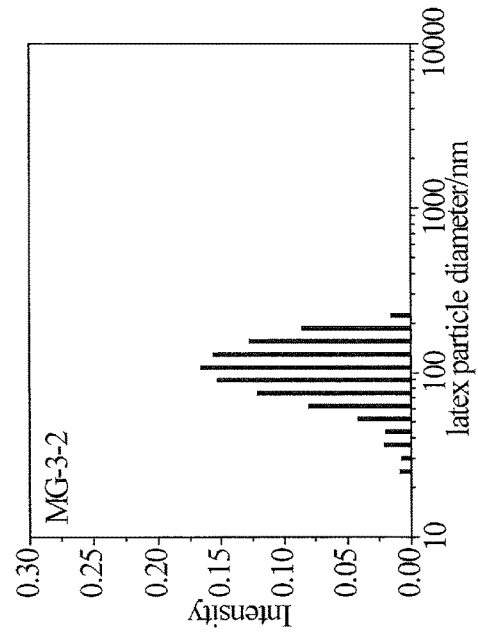
FIG. 16A is a graph showing the latex particle size distribution of a poly(n-butyl acrylate-graft-styrene) (PnBA-g-PS) comb multigraft copolymer, MG-3-1, comprising about 32 weight percentage polystyrene, measured by dynamic light scattering (DLS).
Figure 16B:
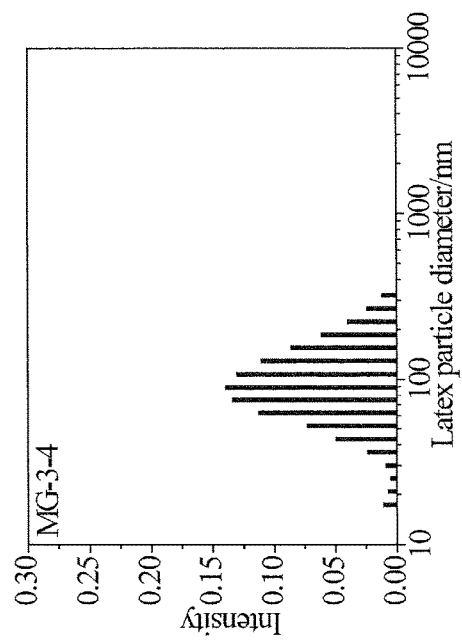
FIG. 16B is a graph showing the latex particle size distribution of a poly(n-butyl acrylate-graft-styrene) (PnBA-g-PS) comb multigraft copolymer, MG-3-2, comprising about 26 weight percentage polystyrene, measured by dynamic light scattering (DLS).
Figure 16C:
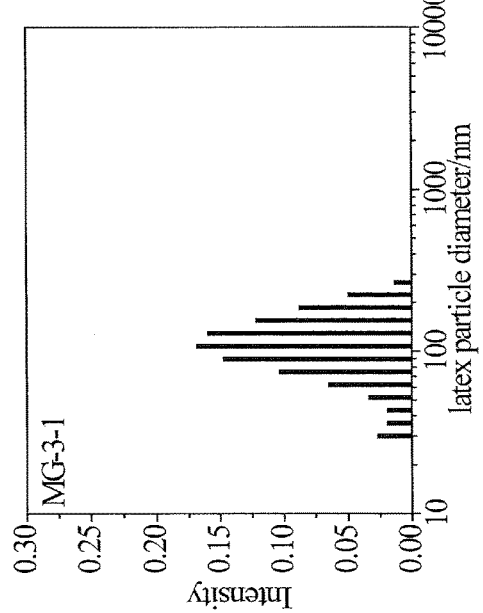
FIG. 16C is a graph showing the latex particle size distribution of a poly(n-butyl acrylate-graft-styrene) (PnBA-g-PS) comb multigraft copolymer, MG-3-3, comprising about 41 weight percentage polystyrene, measured by dynamic light scattering (DLS).
Figure 16D:
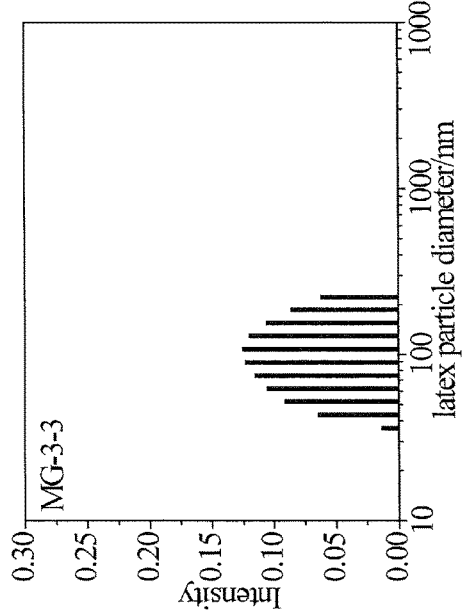
FIG. 16D is a graph showing the latex particle size distribution of a poly(n-butyl acrylate-graft-styrene) (PnBA-g-PS) comb multigraft copolymer, MG-3-4, comprising about 15 weight percentage polystyrene, measured by dynamic light scattering (DLS).
Figures 16E, 16F:
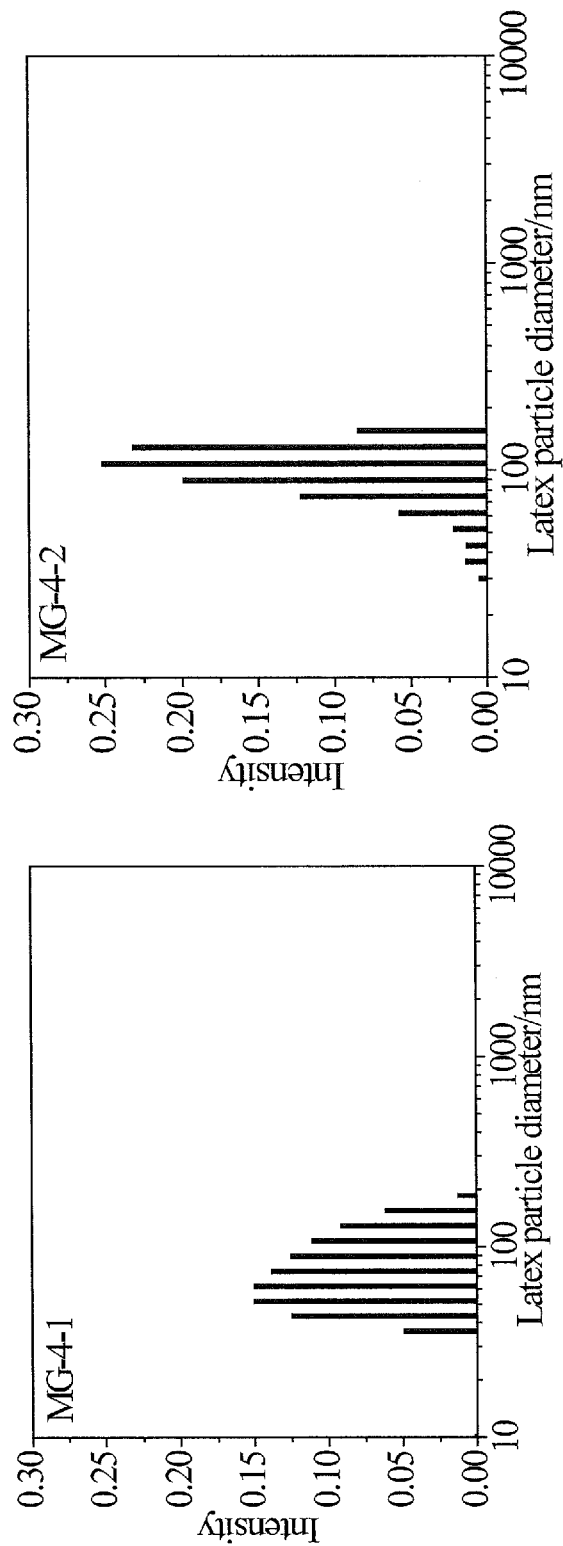
FIG. 16E is a graph showing the latex particle size distribution of a poly(n-butyl acrylate-graft-styrene) (PnBA-g-PS) centipede multigraft copolymer, MG-4-1, comprising about 30 weight percentage polystyrene, measured by dynamic light scattering (DLS).
FIG. 16F is a graph showing the latex particle size distribution of a poly(n-butyl acrylate-graft-styrene) (PnBA-g-PS) centipede multigraft copolymer, MG-4-2, comprising about 43 weight percentage polystyrene, measured by dynamic light scattering (DLS).

FIG. 15B shows the MALDI-TOF mass spectrum of macromonomer 2. The spectrum has three peaks, confirming the presence of residual hydroxyl-terminated polystyrene and single-tailed macromonomer. The calculated Mn and PDI of double-tailed macromonomer are 9267 g/mol and 1.01, respectively.

TABLE 4

Molecular weights and polydispersity indices of PS macromonomers used to prepare P(nBA)-g-PS copolymers.

| Sample | Peak a Mn (g/mol) | Peak a $M_w$ (g/mol) | PDI | Peak b Mn (g/mol) | Peak b $M_w$ (g/mol) | PDI | Purity (%) |
|---|---|---|---|---|---|---|---|
| Macromonomer 1-1 | — | — | — | 5600 | 5880 | 1.05 | 100 |
| Macromonomer 1-2 | — | — | — | 6200 | 6572 | 1.06 | 100 |
| Macromonomer 2 | 10451 | 10657 | 1.02 | 5550 | 5750 | 1.04 | 58 |

The size and distribution of latex particles obtained from miniemulsion polymerizations were characterized by DLS. FIGS. 16A-16F show that the latex particles are homogeneous with narrow size distributions. The mean particle diameters (see Table 3) were from 85 nm to 120 nm.

Figures 17A, 17B:
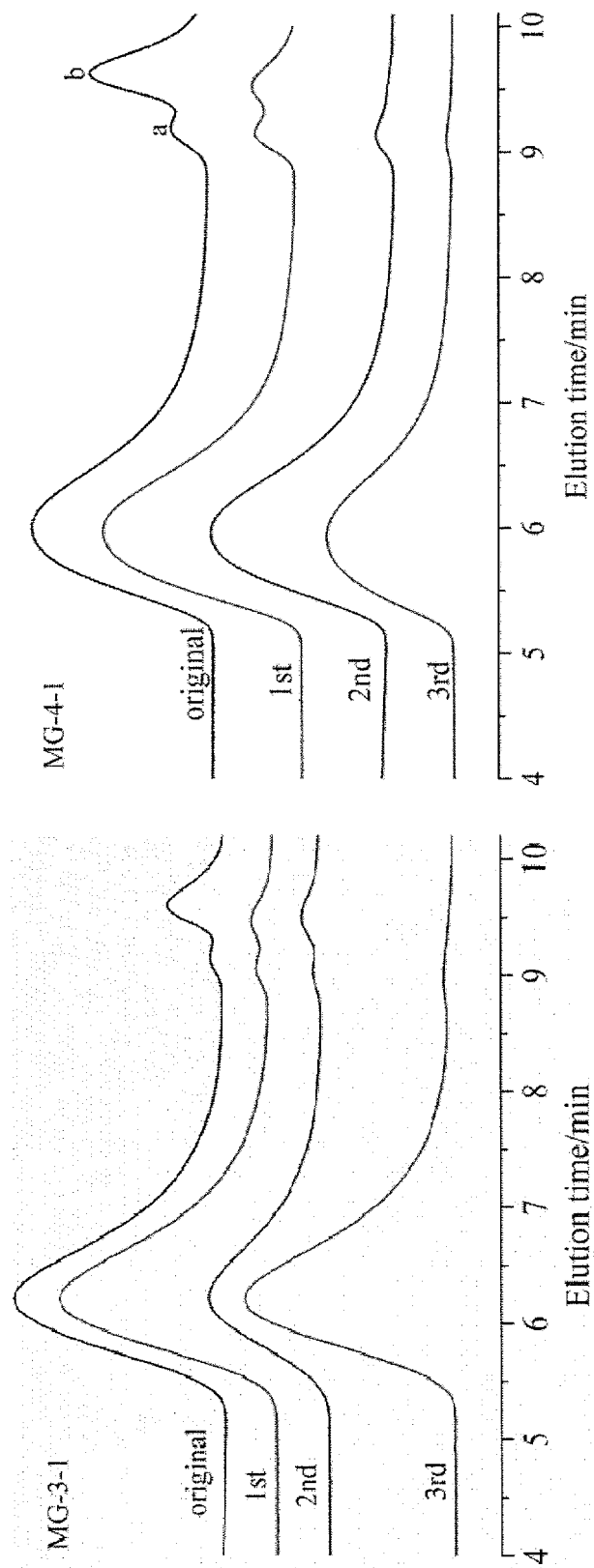
FIG. 17A is a graph showing the size exclusion chromatography (SEC) traces for a poly(n-butyl acrylate-graft-styrene) (PnBA-g-PS) comb multigraft copolymer, MG-3-1, as synthesized via radical initiated emulsion copolymerization (original), and after a first ($1^{st}$), second ($2^{nd}$) or third ($3^{rd}$) fractionation.
FIG. 17B is a graph showing the size exclusion chromatography (SEC) traces for a poly(n-butyl acrylate-graft-styrene) (PnBA-g-PS) centipede multigraft copolymer, MG-4-1, as synthesized via radical initiated emulsion copolymerization (original), or after a first ($1^{st}$), second ($2^{nd}$) or third ($3^{1d}$) fractionation. Peaks "a" and "b" in the upper trace correspond to the polystyrene macromonomer, Macromonomer 2.

The molecular weights and molecular weight distributions of "comb" and "centipede" graft copolymers were characterized by SEC. FIGS. 17A and 17B show the SEC overlays of the chromatogram for MG-3-1 and MG4-1 before and after fractionation. The peaks for higher molecular weight species, as well as a peak for the macromonomer can be seen. Residual PS macromonomer reflects the less reactive nature of the macromonomer species in copolymerization due to steric effects. The residual macromonomer appears to be removed after three fractionations. Moreover, the area ratio of peak a to peak b decreased in the original SEC curve for MG-4-1 compared to the SEC curve of macromonomer 2. Thus, it appears that most of the macromonomer with the double tails copolymerized with nBA.

Figure 18A:
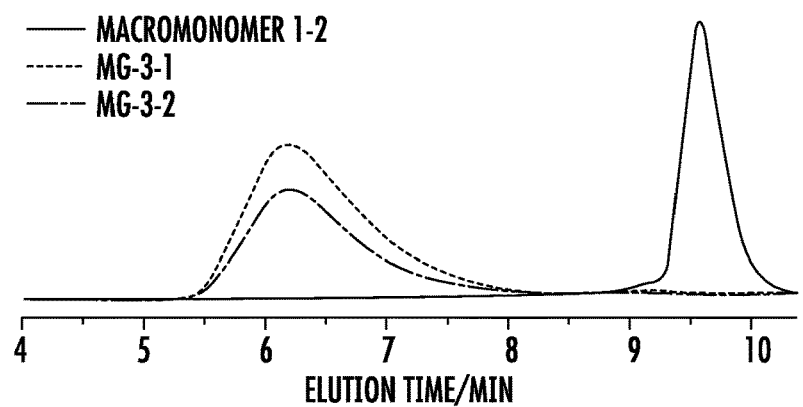
FIG. 18A is a graph showing the size exclusion chromatography (SEC) traces for a single-tailed polystyrene macromonomer, Macromonomer 1-2 (solid line), and for two poly(n-butyl acrylate-graft-styrene) (PnBA-g-PS) comb multigraft copolymers, MG-3-1 (dashed line) and MG-3-2 (dashed and dotted line), prepared from Macromonomer 1-2. The traces for the copolymers were taken after purification via fractionation.
Figure 18B:
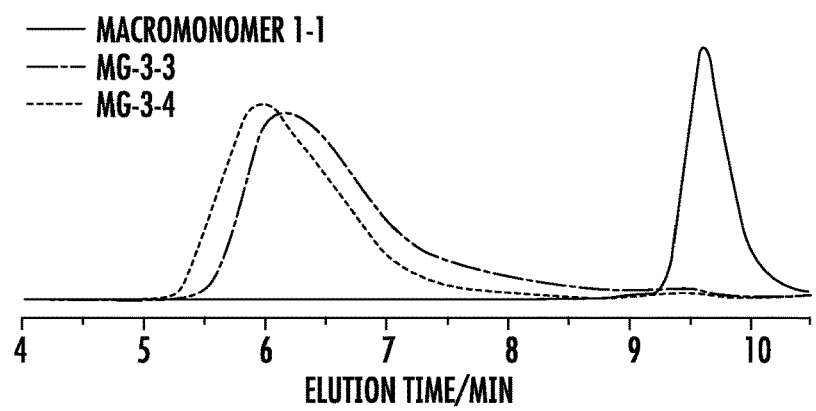
FIG. 18B is a graph showing the size exclusion chromatography (SEC) traces for a single-tailed polystyrene macromonomer, Macromonomer 1-1 (solid line), and for two poly(n-butyl acrylate-graft-styrene) (PnBA-g-PS) comb multigraft copolymers, MG-3-3 (dashed and dotted line) and MG-3-4 (dashed line), prepared from Macromonomer 1-1. The traces for the copolymers were taken after purification via fractionation.
Figure 18C:
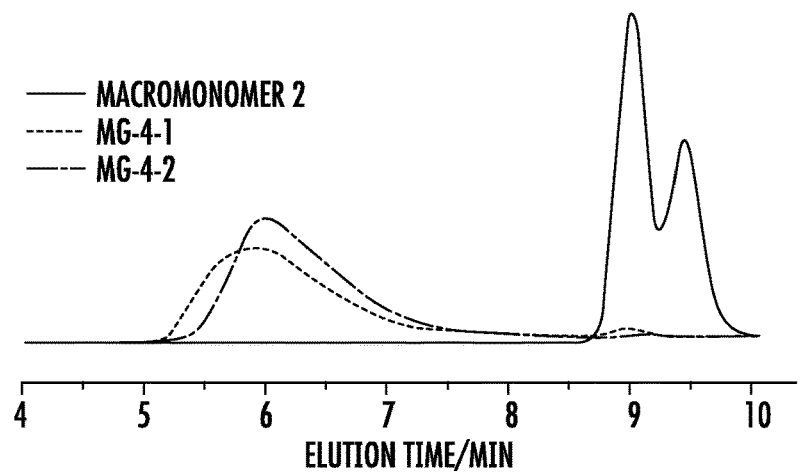
FIG. 18C is a graph showing the size exclusion chromatography (SEC) traces for a double-tailed polystyrene macromonomer, Macromonomer 2 (solid line), and for two poly(n-butyl acrylate-graft-styrene) (PnBA-g-PS) centipede multigraft copolymers, MG-4-1 (dashed line) and MG-4-2 (dashed and dotted line), prepared from Macromonomer 2. The traces for the copolymers were taken after purification via fractionation.

FIGS. 18A-18C show the SEC curves after fractionation of all the P(nBA)-g-PS samples together with the SEC curves of the corresponding PS macromonomer for comparison. The average molecular weights of the multigraft copolymers as measured by SEC are shown in Table 5. For all of the samples, the non-polymerized macromonomers were removed by fractionation. Multigraft copolymers with different molecular weights, compositions, and different side chain lengths were obtained by altering the macromonomer and the ratio of nBA to macromonomer used in the polymerization. See Table 3, above.

TABLE 5

Molecular characteristics of P(nBA)-g-PS multigraft copolymers.

| Sample | Mn (g/mol) | Mw (g/mol) | PDI | PS (wt %) | $T_{5d}$ (° C.) | Tg (° C.) | Number of branch points/ molecule |
|---|---|---|---|---|---|---|---|
| MG-3-1 | 422,900 | 872,100 | 2.1 | 32 | 358 | −32 | 21.8 |
| MG-3-2 | 455,400 | 888,200 | 2.0 | 26 | 358 | −38 | 19.1 |
| MG-3-3 | 213,600 | 598,000 | 2.8 | 41 | 370 | −25 | 15.6 |
| MG-3-4 | 459,400 | 1,148,500 | 2.5 | 15 | 363 | −42 | 12.3 |
| MG-4-1 | 588,300 | 1,350,900 | 2.3 | 30 | 361 | −35 | — |
| MG-4-2 | 406,300 | 1,211,600 | 3.0 | 43 | 366 | −13 | — |

Figure 19:
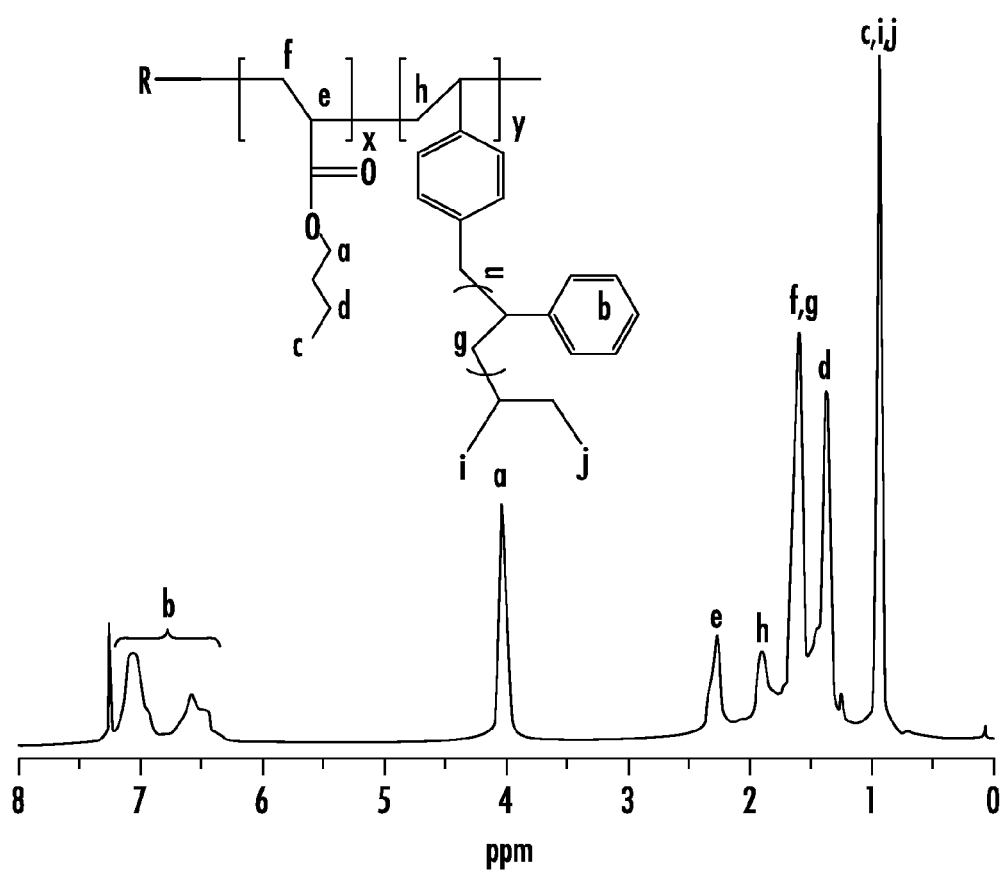
FIG. 19 is a proton nuclear magnetic resonance ($^1$H-NMR) spectrum of a poly(n-butyl acrylate-graft-styrene) (PnBA-g-PS) comb multigraft copolymer, i.e., MG-3-1, described in FIG. 16A. Proton assignments are indicated by the lower case letters in the spectrum and the structure in the upper left hand of the spectrum.

$^1$H-NMR was used to confirm the structure of the multigraft copolymers. FIG. 19 shows the $^1$H-NMR of MG-3-1. In FIG. 19, signals at 0.91 to 0.95 ppm were assigned to the alpha-methyl protons (cH, iH, jH) of syndiotactic, atactic, and isotactic structure, respectively. The signals at 1.36 to 1.41 ppm are ascribed to protons (dH) of different conformation of methylene in the PnBA segments. The signals at 1.58-1.61 ppm are assigned to methylene protons (fH, gH)

in PnBA and PS segments. The peaks at 1.89 ppm and 2.28 ppm are assigned to the methylene protons (aH) of the methylene ester from the nBA unit. The peaks as 6.2-7.2 ppm were assigned to the phenyl protons (bH) of the PS segment. The compositions of graft copolymers were calculated from the $^1$H-NMR spectra according to the integral areas of protons from PS and PnBA (aH and bH).

The thermal properties of the multigraft copolymers were evaluated using TGA and DSC. The decomposition temperatures of 5% weight loss ($T_{5d}$) for the samples are shown in Table 5. The $T_{5d}$ for the samples was 358-370° C., which is similar to the decomposition temperature of 5% weight loss of Kraton™ SIS triblock copolymer. See Peng et al., Journal of Elastomers and Plastics, 2011, 43, 369.

Figure 20:
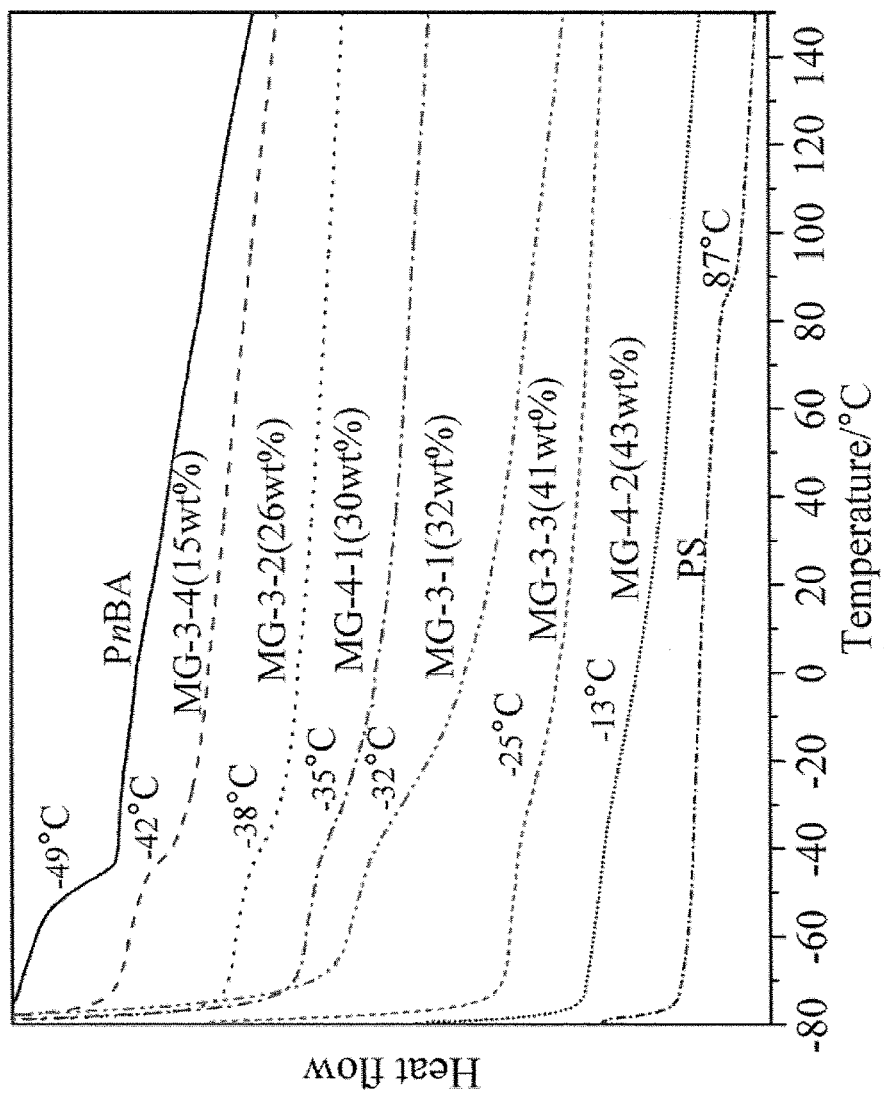
FIG. 20 is a graph showing the differential scanning calorimetry (DSC) thermograms for, from top to bottom, a poly(n-butyl acrylate) (PnBA) homopolymer, a poly(n-butyl acrylate-graft-styrene) (PnBA-g-PS) comb multigraft copolymer having about 15 weight percentage (%) polystyrene (MG-3-4), a PnBA-g-PS comb multigraft copolymer having about 26 weight % polystyrene (MG-3-2), a PnBA-g-PS centipede multigraft copolymer having about 30 weight % polystyrene (MG-4-1), a PnBA-g-PS comb multigraft copolymer having about 32 weight % polystyrene (MG-3-1), a PnBA-g-PS comb multigraft copolymer having about 41 weight % polystyrene (MG-3-3), a PnBA-g-PS centipede multigraft copolymer having about 43 weight % polystyrene (MG-4-2), and a polystyrene macromonomer (PS). The glass transition temperature ($T_g$s) for each polymer is indicated next to the thermograms.

FIG. 20 summarizes DSC curves for the samples. The DSC curves for PnBA homopolymer synthesized by emulsion polymerization and PS macromonomer are also shown in FIG. 20 for comparison. The $T_g$s of PnBA homopolymer and PS were –49° C. and 87° C., respectively. The DSC curves of the multigraft copolymers displayed only one $T_g$, which was between the $T_g$ of PnBA homopolymer and PS macromonomer. The $T_g$s of the graft copolymers increased with increasing weight content of PS, regardless of the comb or centipede architecture or side chain length. Similar results have been observed with other graft copolymers. See Gacal et al., Macromolecules, 2006, 39, 5330; and Jianq et al., Polymer, 2007, 48, 7029. Without being bound to any one theory, it is believed that the rigid PS chains limit the mobility of the graft copolymer and/or that it is difficult to detect all $T_g$s via DSC despite the microphase separation inside the graft copolymer. Additionally or alternatively, the PDI can lead to dissolution of PS short side chains inside neighboring PnBA microdomains, affecting individual $T_g$.

Figure 21B:
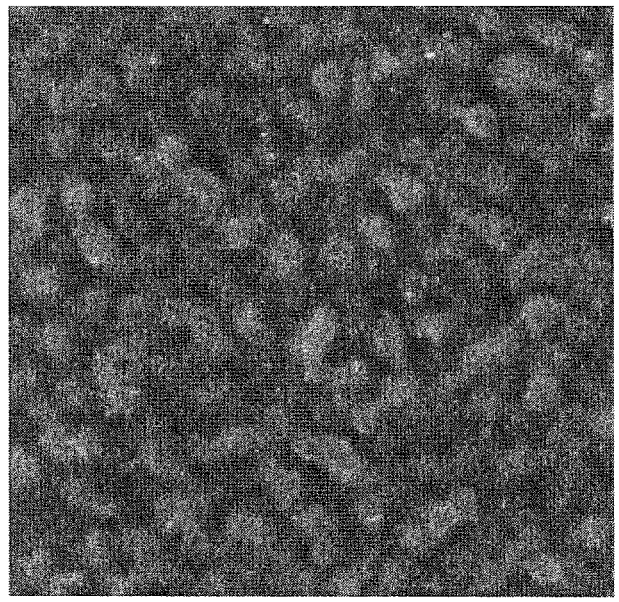
FIG. 21B is an atomic force microscope (AFM) phase image of a thin film of a poly(n-butyl acrylate-graft-styrene) centipede graft copolymer, i.e., MG-4-1, comprising about 30 weight percentage polystyrene.
Figure 21A:
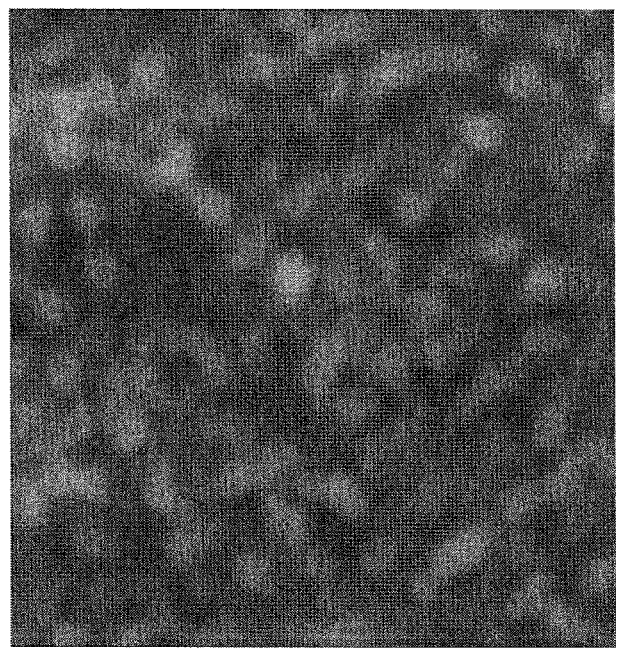
FIG. 21A is an atomic force microscope (AFM) height image of a thin film of a poly(n-butyl acrylate-graft-styrene) centipede graft copolymer, i.e., MG-4-1, comprising about 30 weight percentage polystyrene.
Figure 22B:
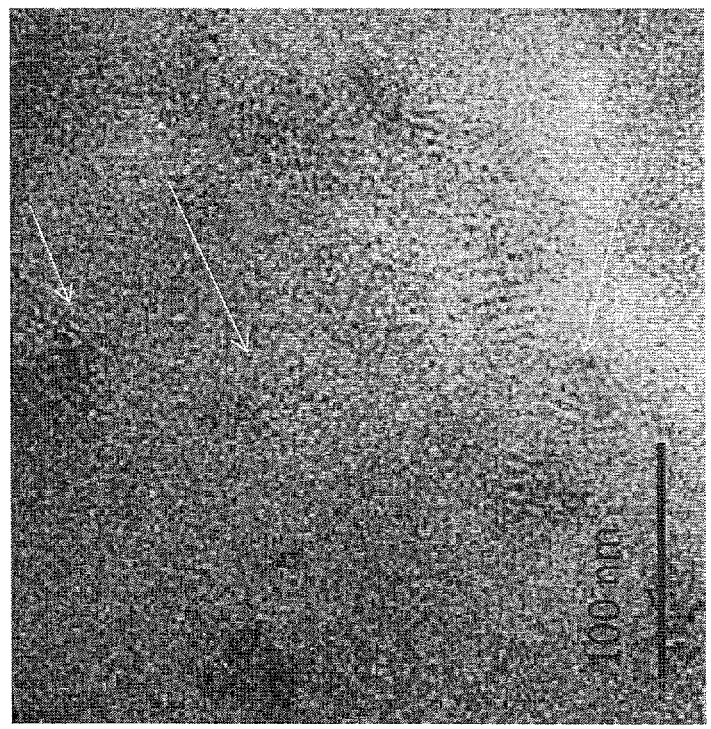
FIG. 22B is a transmission electron microscope (TEM) image of a thin film of a poly(n-butyl acrylate-graft-styrene) centipede graft copolymer, i.e., MG-4-1, comprising about 30 weight percentage polystyrene. The scale bar in the lower left hand corner of the image corresponds to 100 nanometers.
Figure 22A:
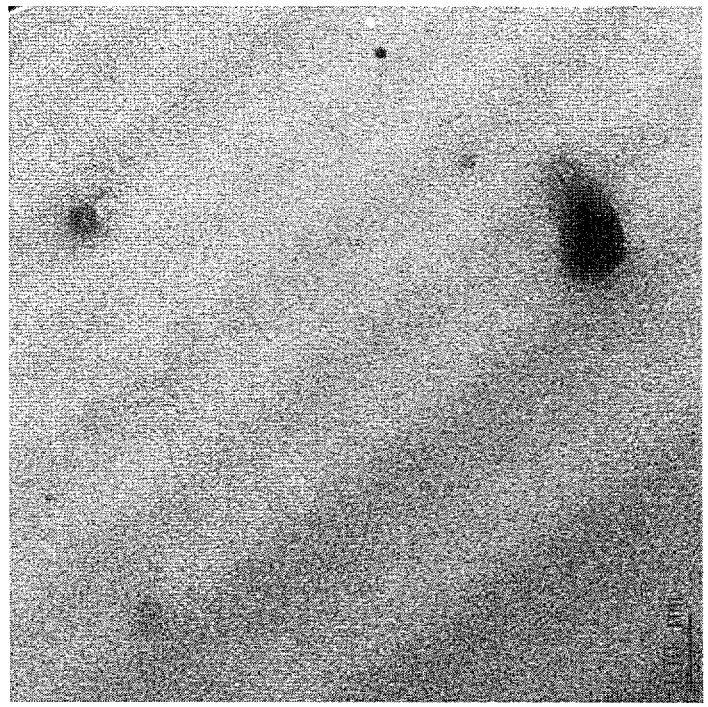
FIG. 22A is a transmission electron microscope (TEM) image of a thin film of a poly(n-butyl acrylate-graft-styrene) comb graft copolymer, i.e., MG-3-3, comprising about 41 weight percentage polystyrene. The scale bar in the lower left hand corner of the image corresponds to 100 nanometers. The arrows point toward areas of lamellar morphology.

The microphase separation of the comb and centipede multigraft copolymers was studied via AFM and TEM. FIGS. 21A and 21B show the AFM height and phase images of MG-4-1, but the morphology is distorted. Without being bound to any one theory, this can be ascribed to broad molecular weight distribution and the many branch points of MG-4-1. From the TEM images shown in FIGS. 22A and 22B, it appears that thin films of the centipede MG-4-1 and the comb MG-3-3 copolymers can form lamellar morphology, but with relatively poor long range order.

Figure 23A:
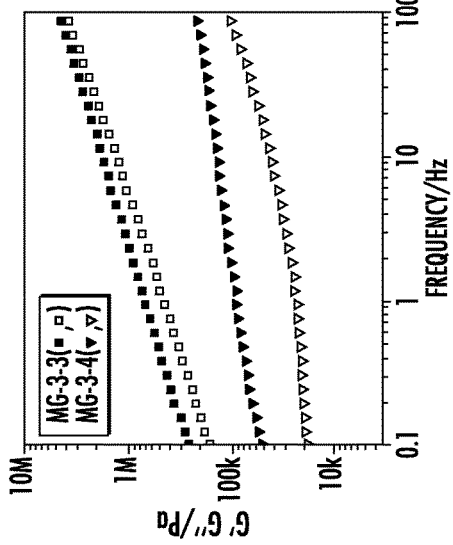
FIG. 23A a graph showing the storage modulus (G', filled symbols) and loss modulus (G", open symbols) in pascals (Pa) for poly(n-butyl acrylate-graft-styrene) (PnBA-g-PS) comb multigraft copolymer having about 32 weight percentage (%) polystyrene (MG-3-1, filled and open squares) and for PnBA-g-PS comb multigraft copolymer having about 26 weight % polystyrene (MG-3-2, filled and open triangles) as a function of frequency (in Hertz, Hz).
Figure 23B:
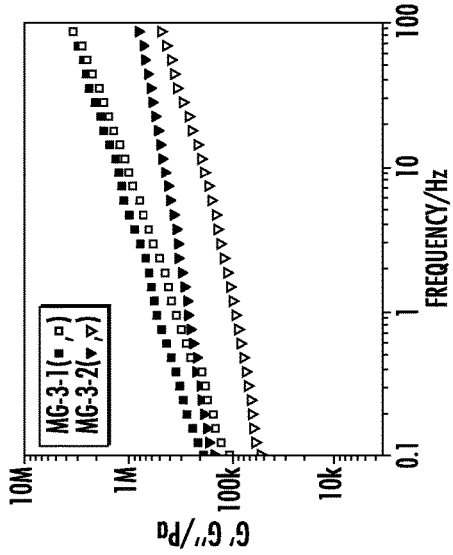
FIG. 23B a graph showing the storage modulus (G', filled symbols) and loss modulus (G", open symbols) in pascals (Pa) for poly(n-butyl acrylate-graft-styrene) (PnBA-g-PS) comb multigraft copolymer having about 41 weight percentage (%) polystyrene (MG-3-3, filled and open squares) and for PnBA-g-PS comb multigraft copolymer having about 15 weight % polystyrene (MG-3-4, filled and open triangles) as a function of frequency (in Hertz, Hz).
Figure 23C:
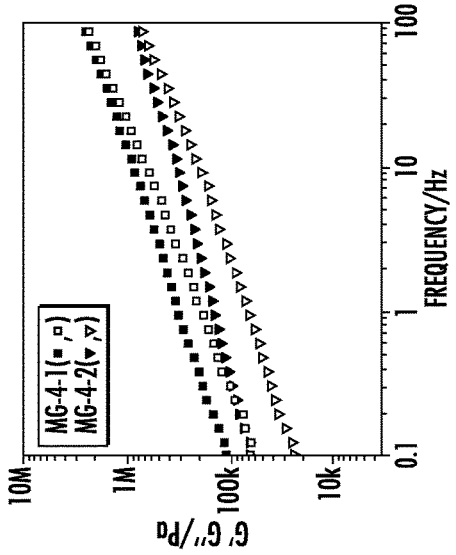
FIG. 23C a graph showing the storage modulus (G', filled symbols) and loss modulus (G", open symbols) in pascals (Pa) for poly(n-butyl acrylate-graft-styrene) (PnBA-g-PS) centipede multigraft copolymer having about 43 weight percentage (%) polystyrene (MG-4-2, filled and open squares) and for PnBA-g-PS centipede multigraft copolymer having about 30 weight % polystyrene (MG-4-1, filled and open triangles) as a function of frequency (in Hertz, Hz).

FIGS. 23A-23C show storage modulus G' and loss modulus G" for comb and centipede multigraft copolymers as a function of frequency at room temperature. G' is larger than G" over the frequency range probed for each sample. Thus, it appears that the multigraft copolymers exhibit elastic properties at room temperature. Furthermore, G' increases with increasing frequency. Without being bound to any one theory, it is believed that this can be attributed to the timescale being adequate for entangled chains to relax, which reduces the modulus, at low frequency. However, the entangled polymer chains have less time for reorientation at higher frequency, resulting in higher G' values.

Figure 24A:
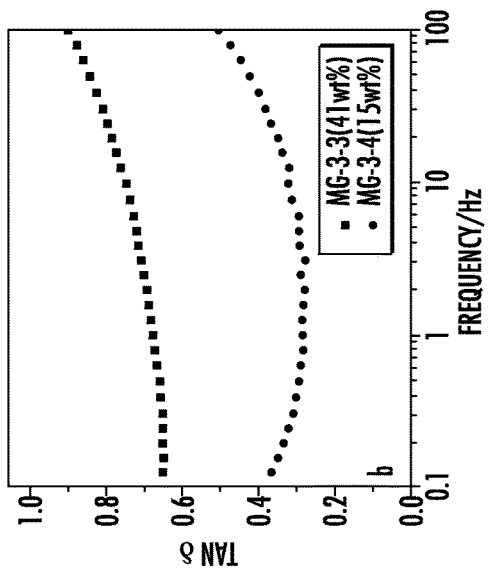
FIG. 24A a graph of tan S versus frequency (in Hertz, Hz) for a poly(n-butyl acrylate-graft-styrene) (PnBA-g-PS) comb multigraft copolymer having about 32 weight percentage (%) polystyrene (MG-3-1, filled squares) and for a PnBA-g-PS comb multigraft copolymer having about 26 weight % polystyrene (MG-3-2, filled circles) as a function of frequency (in Hertz, Hz).
Figure 24B:
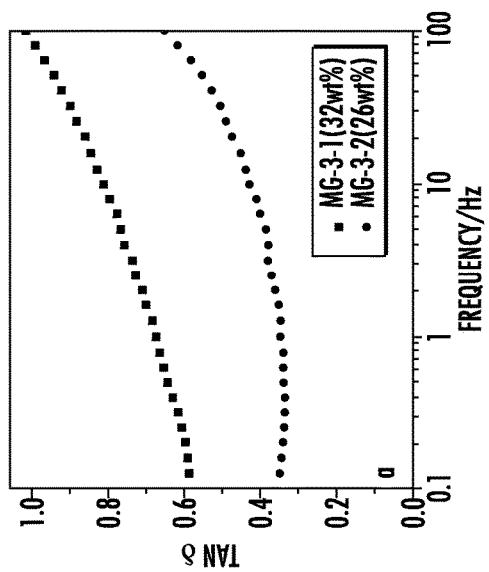
FIG. 24B a graph of tan δ versus frequency (in Hertz, Hz) for a poly(n-butyl acrylate-graft-styrene) (PnBA-g-PS) comb multigraft copolymer having about 41 weight percentage (%) polystyrene (MG-3-3, filled squares) and for a PnBA-g-PS comb multigraft copolymer having about 15 weight % polystyrene (MG-3-4, filled circles) as a function of frequency (in Hertz, Hz).
Figure 24C:
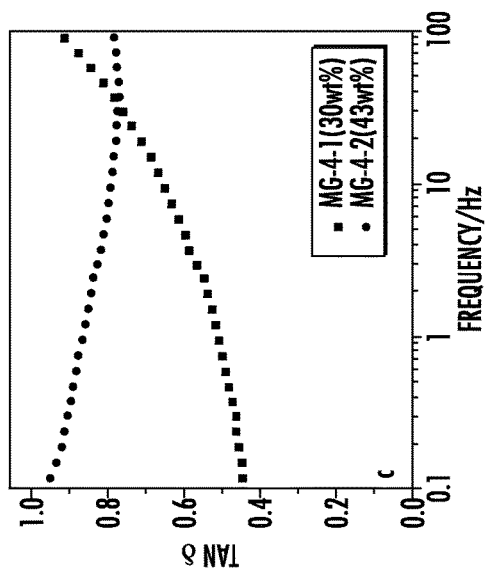
FIG. 24C a graph of tan S versus frequency (in Hertz, Hz) for a poly(n-butyl acrylate-graft-styrene) (PnBA-g-PS) centipede multigraft copolymer having about 30 weight percentage (%) polystyrene (MG-4-1, filled squares) and for a PnBA-g-PS centipede multigraft copolymer having about 43 weight % polystyrene (MG-4-2, filled circles) as a function of frequency (in Hertz, Hz).

FIGS. 24A-24C show tan δ for comb and centipede multigraft copolymers as a function of frequency. From FIGS. 24A and 24B, it appears that the tan δ of the comb multigraft copolymers (MG-3-1, MG-3-2, MG-3-3, and MG-3-4) increases with increasing frequency, indicating that the elastic properties of the multigraft copolymers decrease with increasing frequency. The tan S of MG-3-2 and MG-3-4 are lower than that of MG-3-1 and MG-3-3, respectively. Thus, it would appear that the elastic properties of MG-3-2 and MG-3-4 are better than that of MG-3-1 an MG-3-3. PnBA segments in multigraft copolymers are elastic at room temperature, but PS segments are glassy at room temperature. Thus, decreasing the weight content of PS in the multigraft copolymers can be beneficial for improving the elastic properties of multigraft copolymers. In addition, the weight content of PS in multigraft copolymers can affect the morphology in microphase separation and further affect the mechanical properties. When the weight content of PS in the multigraft copolymer is low, e.g., 15 wt % as in MG-3-4, the material becomes tacky, suggesting that, in some embodiments, the presently disclosed materials can have application as adhesives. As shown in FIG. 24C, the tan δ of MG-4-1 is lower than that of MG-4-2 in the frequency range of 0.1-32 Hz. Therefore, it would appear that the elastic property of MG-4-1 is better than that of MG-4-2.

Figure 25:
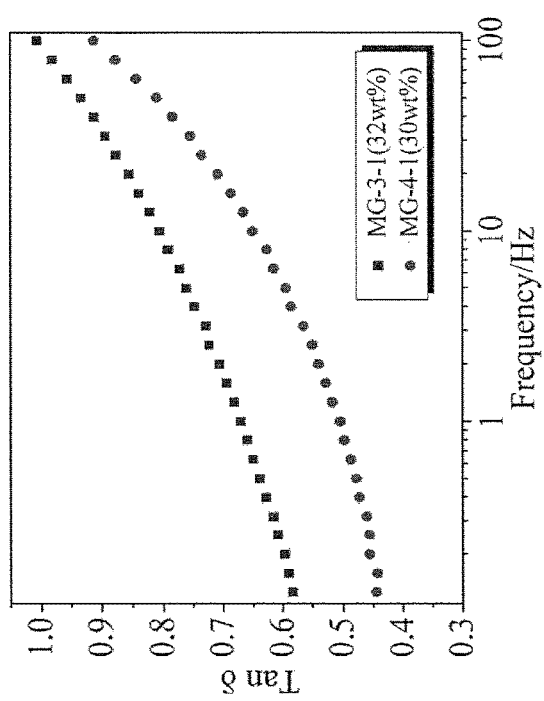
FIG. 25 a graph of tan δ versus frequency (in Hertz, Hz) for a poly(n-butyl acrylate-graft-styrene) (PnBA-g-PS) comb multigraft copolymer having about 32 weight percentage (%) polystyrene (MG-3-1, filled squares) and for a PnBA-g-PS centipede multigraft copolymer having a similar weight % polystyrene, i.e., about 30 weight % polystyrene (MG-4-1, filled circles) as a function of frequency (in Hertz, Hz).
Figure 26:
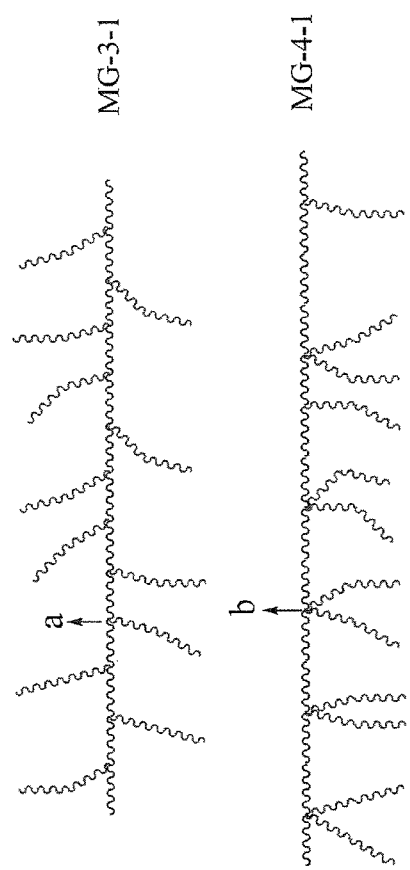
FIG. 26 is a schematic drawing comparing the structure of the comb multigraft copolymer, MG-3-1, described for FIG. 25, having a single side chain attached to branch point a, and the structure of the centipede multigraft copolymer, MG-4-1, described for FIG. 25, having two side chains attached to branch point b.

FIG. 25 compares tan δ of comb MG-3-1 and centipede MG-4-1 with similar weight content of PS (32 wt % and 30 wt %). From FIG. 25, it appears that the elastic properties of MG-4-1 with centipede structure are better than those of comb multigraft copolymer MG-3-1. Without being bound to any one theory, this is attributed to the different chain structures in MG-3-1 and MG-4-1. FIG. 26 shows possible chain structures for MG-4-1 and MG-3-1. Based on the structure of the double-tailed PS macromonomer used to prepare MG-4-1, two side chains can be the same branch point of the centipede structure (see b in FIG. 26), allowing the side chains to be in more domains when microphase separation occurs in MG-4-1.

To summarize, single-tail and double-tail PS macromonomers were synthesized by high vacuum anionic polymerization and Steglich esterification. The copolymerization of each macromonomer and nBA was carried out via miniemulsion polymerization, resulting in comb and centipede multigraft copolymers with high molecular weights and different PS content. The latex particles of the multigraft copolymers were homogeneous, having diameters between about 85-120 nm, as characterized by DLS. The molecular weights of the copolymers were analyzed by SEC, providing Mns of 210,000-588,300 g/mol. The weight contents of PS in the combs and centipedes were 15-43 wt % as calculated by $^1$H-NMR. The thermal properties of the multigraft copolymers were characterized by TGA and DSC. The microphase separation of the multigraft copolymers was observed by AFM and TEM. The rheological properties indicated that comb and centipede multigraft copolymers have elastic properties when the weight content of PS is 26-32 weight %. However, centipede copolymers can possess better elastic property than comb copolymers of a similar PS weight content. Overall, the emulsion polymerization preparation appears well-suited to the synthesis of high molecular weight multigraft copolymers having a large number of branch points.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method of preparing a multigraft copolymer, said method comprising:
   (a) providing a macromonomer comprising one or more polymeric chains attached to a polymerizable terminal group, wherein the one or more polymeric chains comprise constitutional units from at least a first monomer, wherein the first monomer comprises a vinyl group;
   (b) preparing an emulsion comprising the macromonomer, a second monomer, and a polymerization initiator; and (c) copolymerizing the macromonomer and the second monomer to form the multigraft copolymer;
further wherein providing the macromomonomer comprises:
(i) providing the first monomer;
(ii) polymerizing the first monomer via anionic polymerization to provide a carbanion-containing polymeric chain;
(iii) terminating the anionic polymerization by contacting the carbanion-containing polymeric chain with an epoxide and a protic solvent to provide a hydroxyl-terminated polymeric chain; and
(iv) esterifying the hydroxyl group of the hydroxyl-terminated polymeric chain by contacting it with a vinyl-substituted carboxylic acid to provide a single-chain macromonomer or with a vinyl-substituted dicarboxylic acid to provide a double-chain macromonomer.

2. The method of claim 1, wherein polymerizing the first monomer via anionic polymerization comprises contacting the first monomer with an alkyl lithium reagent or a Grignard reagent in a non-polar organic solvent at a temperature of between about 20 degrees Celsius and about 25 degrees Celsius to initiate anionic polymerization.

3. The method of claim 1, wherein the first monomer is selected from the group consisting of a styrene, a-methylstryene, ethene, vinylchloride, vinyl pyridine, and cyclohexadiene.

4. The method of claim 1, wherein
esterifying the hydroxyl group of the hydroxyl-terminated polymeric chain comprises contacting the hydroxyl-terminated polymeric chain with 4-vinylbenzoic acid to provide the single-chain macromonomer; or contacting the hydroxyl-terminated polymeric chain with 5-(4-vinylbenzyloxy)isophthalic acid to provide the double-chain macromonomer; further wherein the esterifying is performed in the presence of a carbodiimide and dimethylaminopyridine (DMAP) in a solvent, wherein the solvent is tetrahydrofuran (THF), at a temperature between about 5 degrees Celsius and about 0 degrees Celsius.

5. The method of claim 1, wherein preparing the emulsion comprises adding the macromonomer and the second monomer to an organic solvent to prepare a homogeneous solution; adding the homogeneous solution to an aqueous solution comprising one or more surfactants to provide a mixture; and agitating the mixture to provide a homogeneous emulsion, wherein preparing the emulsion further comprises adding a polymerization initiator to one or both of the homogeneous solution and the mixture.

6. The method of claim 1, wherein the second monomer is selected from isoprene and an alkyl acrylate.

7. The method of claim 1, wherein the polymerization initiator comprises a radical initiator and copolymerizing the macromonomer and the second monomer comprises heating the emulsion prepared in step (b).

8. The method of claim 7, wherein the heating comprises heating the emulsion to a temperature between about 50 degrees Celsius and about 90 degrees Celsius for about eight hours.

9. The method of claim 1, further comprising drying and/or purifying the multigraft copolymer.

10. A multigraft copolymer prepared according to the method of claim 1, wherein providing a macromonomer in step (a) comprises providing a double-chain macromonomer.

11. The multigraft copolymer of claim 10, wherein the multigraft copolymer comprises a rubbery polymeric main chain and a plurality of glassy or semi-crystalline polymeric side chains, wherein the main chain comprises a plurality of randomly spaced branch points and wherein each of the plurality of glassy or semi-crystalline polymeric side chains is attached to the main chain at one of the plurality of randomly spaced branch points.

12. The multigraft copolymer of claim 11, wherein the second monomer is n-butyl acrylate and the rubbery polymeric main chain comprises poly(n-butyl acrylate).

13. The multigraft copolymer of claim 11, wherein the first monomer is styrene and the glassy or semi-crystalline polymeric side chains comprise polystyrene.

14. A thermoplastic elastomer comprising the multigraft copolymer of claim 10.

15. An adhesive comprising the multigraft copolymer of claim 10.

16. A random multigraft copolymer comprising a poly(alkyl acrylate) main chain and a plurality of glassy or semi-crystalline polymeric side chains, wherein said main chain comprises a plurality of randomly spaced branch points, and wherein each of the plurality of polymeric side chains is attached to the main chain at one of the plurality of randomly spaced branch points, wherein the copolymer comprises a centipede architecture, and wherein the poly(alkyl acrylate) main chain is poly(methyl acrylate), poly(propyl acrylate), poly(n-butyl acrylate), poly(pentyl acrylate) or poly(hexyl acrylate).

17. The random multigraft copolymer of claim 16, wherein the copolymer has a weight-average molecular mass ($M_w$) greater than about 500,000 grams per mole (g/mol).

18. The random multigraft copolymer of claim 16, wherein the copolymer has a $M_w$ of about 1,000,000 g/mol or more.

19. The random multigraft copolymer of claim 16, wherein the copolymer comprises between about 15 and about 43 weight % polystyrene.

20. The random multigraft copolymer of claim 16, wherein the copolymer comprises between about 26 and about 32 weight % polystyrene.

21. The random multigraft copolymer of claim 16, wherein the copolymer has a glass transition temperature ($T_g$) of between about −13 degrees C. (° C.) and about −42° C.

22. The random multigraft copolymer of claim 16, wherein the copolymer has at least about 12 branch points per molecule.

23. The random multigraft copolymer of claim 16, wherein the copolymer has between about 15 and about 22 branch points per molecule.

24. The random multigraft copolymer of claim 16, wherein the poly(alkyl acrylate) main chain is poly(n-butyl acrylate).

25. The random multigraft copolymer of claim 16, wherein the polymeric side chains comprise polystyrene.

26. A thermoplastic elastomer comprising the random multigraft copolymer of claim 16.

27. An adhesive comprising the random multigraft copolymer of claim 16.

28. A multigraft copolymer prepared according to the method of claim 1, wherein said multigraft copolymer has a weight-average molecular mass ($M_w$) of at least about 1,000,000 grams per mole (g/mol).

29. A multigraft copolymer prepared according to the method of claim 1, wherein said multigraft copolymer has at least about 15 branch points per molecule.

30. A multigraft copolymer prepared according to the method of claim 1, wherein esterifying the hydroxyl group of the hydroxyl-terminated polymeric chain is performed by contacting it with a vinyl-substituted aryl carboxylic acid.

* * * * *